United States Patent
Nakajima et al.

(12) United States Patent (10) Patent No.: US 7,852,791 B2
Nakajima et al. (45) Date of Patent: Dec. 14, 2010

(54) WIRELESS COMMUNICATION APPARATUS AND METHOD

(75) Inventors: Tetsu Nakajima, Yokohama (JP);
Tomoko Adachi, Urayasu (JP);
Masahiro Takagi, Tokyo (JP); Tomoya Tandai, Tokyo (JP); Yoriko Utsunomiya, Tokyo (JP); Toshihisa Nabetani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 747 days.

(21) Appl. No.: 11/847,852

(22) Filed: Aug. 30, 2007

(65) Prior Publication Data

US 2008/0002615 A1 Jan. 3, 2008

Related U.S. Application Data

(63) Continuation of application No. PCT/JP2006/306985, filed on Mar. 27, 2006.

(30) Foreign Application Priority Data

Jun. 17, 2005 (JP) ............... 2005-178584

(51) Int. Cl.
*H04B 1/44* (2006.01)
*H04L 12/28* (2006.01)
*H04J 3/16* (2006.01)

(52) U.S. Cl. .................. 370/282; 370/401; 370/437

(58) Field of Classification Search ......... 370/229–231, 370/235, 282, 395.21, 400, 401, 437
See application file for complete search history.

(56) References Cited

U.S. PATENT DOCUMENTS 6,266,334 B1 * 7/2001 Duckwall ............... 370/397

| 2002/0071448 | A1 | 6/2002 | Cervello et al. |
| 2005/0153735 | A1* | 7/2005 | Morioka et al. .......... 455/553.1 |
| 2005/0163058 | A1* | 7/2005 | Nabetani et al. ............ 370/252 |
| 2006/0092871 | A1 | 5/2006 | Nishibayashi et al. |

(Continued)

FOREIGN PATENT DOCUMENTS

EP 1 601 126 A2 11/2005

(Continued)

OTHER PUBLICATIONS

IEEE802.11-04/889r6, "TGn Sync Proposal Technical Specification", Chap. 7, Sec. 1, "Aggregation Exchange Sequences and Related Rules", and Chap. 9, Sec. 2, "Example Aggregation Exchanges" XP002347780, May 18, 2005, 138 pages.

(Continued)

*Primary Examiner*—Hong Cho
(74) *Attorney, Agent, or Firm*—Oblon, Spivak, McClelland, Maier & Neustadt, L.L.P.

(57) ABSTRACT

A wireless communication apparatus performs bi-directional communication with an initiator. The apparatus is allocated an allocation period for data transmission from the initiator. The apparatus includes means for generating a first physical frame including an acknowledgement frame with respect to data received from the initiator, and generating a second physical frame in which a plurality of transmission data frames addressed to the initiator are aggregated. The apparatus also includes means for transmitting the first physical frame at a first transmission rate and the second physical frame at a second transmission rate, during the allocation period.

28 Claims, 25 Drawing Sheets

U.S. PATENT DOCUMENTS

2006/0221879 A1   10/2006   Nakajima et al.

FOREIGN PATENT DOCUMENTS

| JP | 2004-40373 | 2/2004 |
| JP | 2007-511972 | 5/2007 |
| WO | WO 2004/064330 | 7/2004 |
| WO | WO 2005/039127 A1 | 4/2005 |
| WO | WO 2005/050942 A1 | 6/2005 |
| WO | WO 2005/067217 | 7/2005 |

OTHER PUBLICATIONS

IEEE 802.11-05/0149r2, WWise Proposal: High Throughput extension to the 802.11 Standard, Chap. 9, Sec. 1-6 "HTP Burst Transmission Overview", and Chap. 9 Sec. 2 "DCF", March 2005, 2 pages.
U.S. Appl. No. 11/744,253, filed May 4, 2007 Nakajima et al.

* cited by examiner

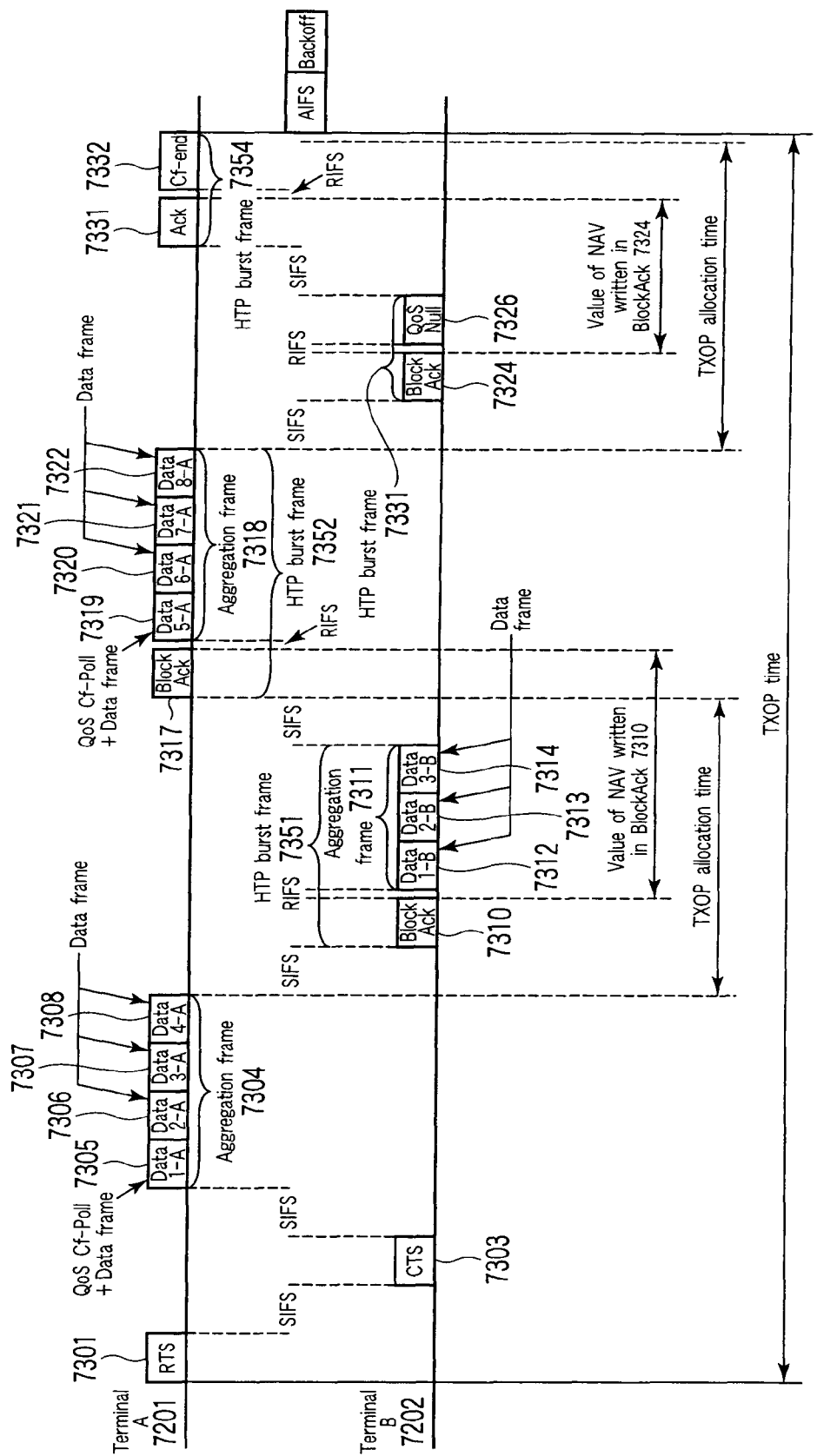
F I G. 17

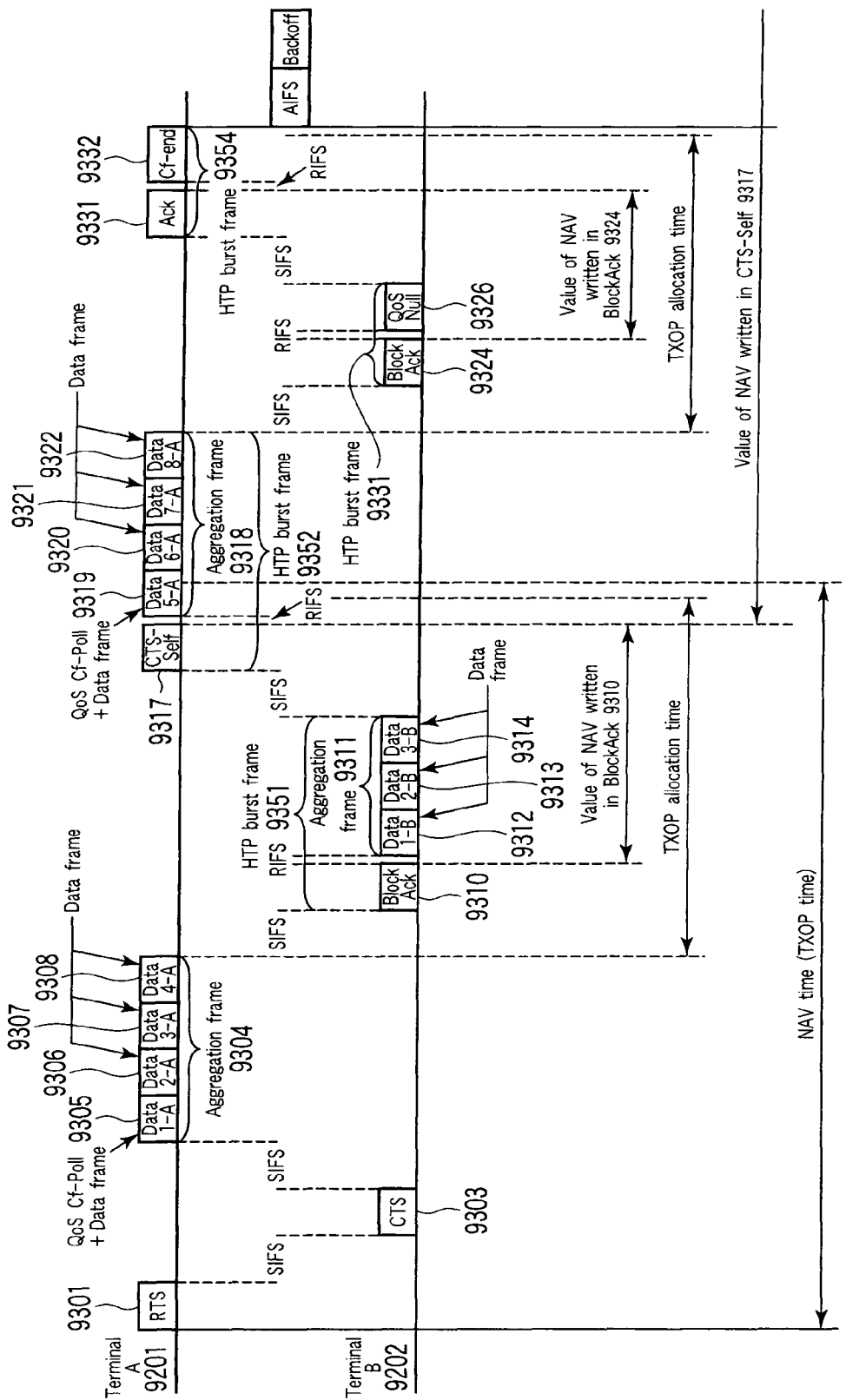
F I G. 22

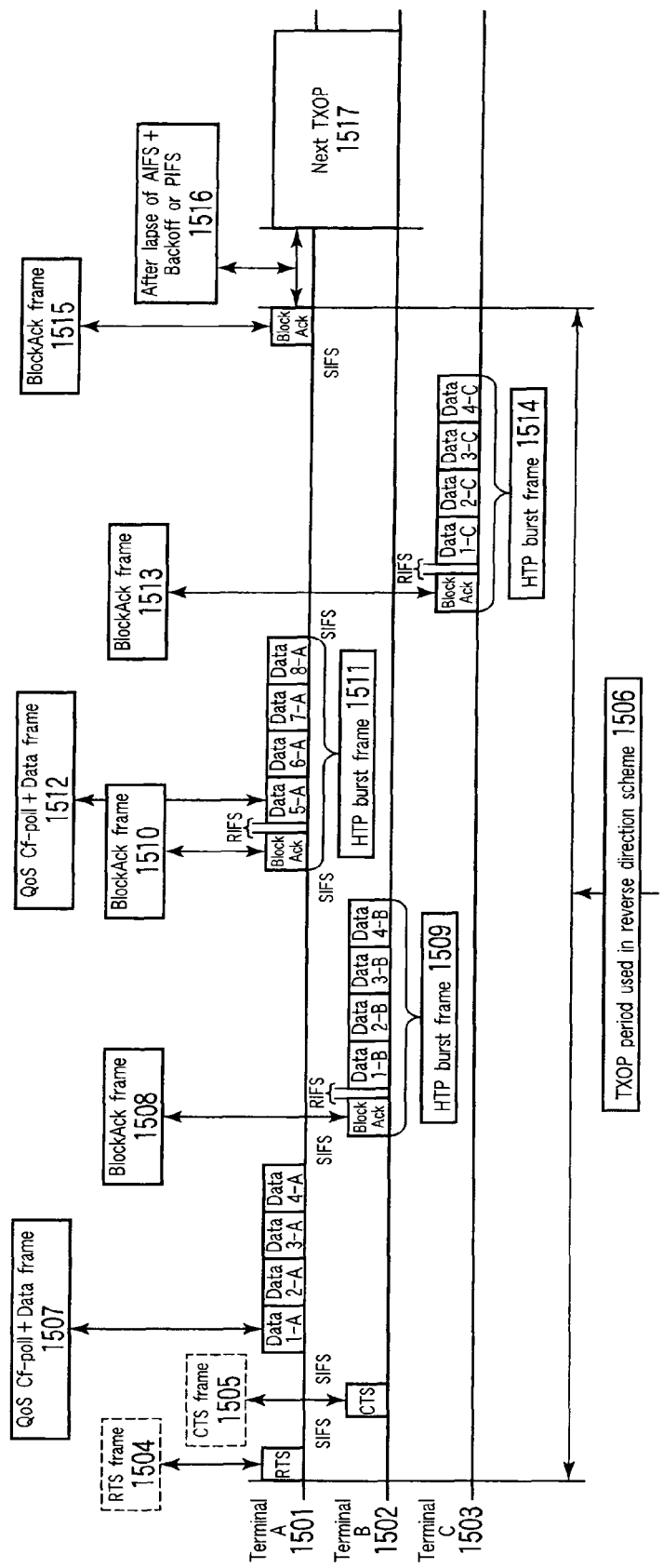
F I G. 24

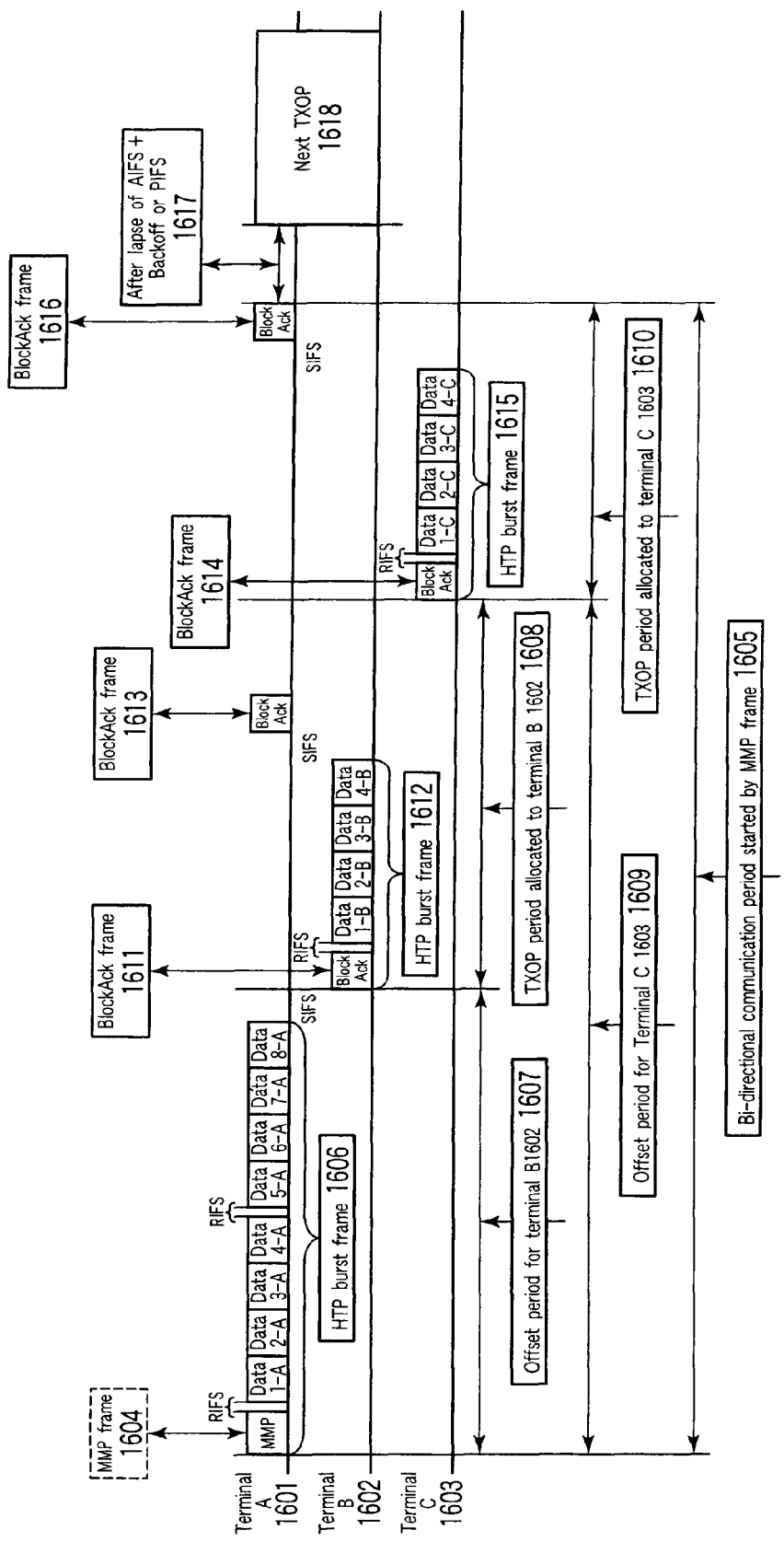
F I G. 25

WIRELESS COMMUNICATION APPARATUS AND METHOD

CROSS-REFERENCE TO RELATED APPLICATIONS

This is a Continuation Application of PCT Application No. PCT/JP2006/306985, filed Mar. 27, 2006, which was published under PCT Article 21(2) in English.

This application is based upon and claims the benefit of priority from prior Japanese Patent Application No. 2005-178584, filed Jun. 17, 2005, the entire contents of which are incorporated herein by reference.

BACKGROUND OF THE INVENTION

1. Field of the Invention

The present invention relates to implementing a wireless communication scheme which is robust even in a poor wireless propagation environment in a wireless communication system including wireless communication devices such as cellular phones and wireless LANs which perform transmission/reception of data through wireless medium.

2. Description of the Related Art

According to wireless LAN specification IEEE 802.11e which has realized enhancement associated with the Quality of Service (QoS) of a Medium Access Control (MAC) layer with respect to the IEEE 802.11 standard specifications, as methods of acquiring a transmission opportunity (TXOP) period during which a transmitting-side communication apparatus (initiator) can transmit data, the Enhanced Distributed Channel Access (EDCA) scheme and the HCF Controlled Channel Access (HCCA) scheme are available. (See IEEE 802.11e Draft 13.0 and IEEE P802.11e/D13.0, January 2005.)

In IEEE 802.11n directed to faster transmission, a plurality of aggregation methods such as Aggregated-MAC Protocol Data Unit (A-MPDU) and High-throughput PHY (HTP) burst have been proposed to reduce the overhead existing between the respective frames in transmitting/receiving operation in IEEE 802.11e.

According to A-MPDU, an aggregation frame obtained by combining a plurality of MAC frames with one Physical Layer (PHY) frame with one field identifying each MAC frame being attached to the head of each frame is transmitted. (See TGn Sync Proposal Technical Specification, IEEE 802.11-04/889r6, May 2005.)

In HTP Burst, PHY frames are transmitted at intervals of a Reduced Interframe Space (RIFS), which is shorter than a Short Interframe Space (SIFS) period used for a conventional burst transmission technique. According to HTP Burst, when frames are to be transmitted to a plurality of receiving-side communication apparatuses (responders) at different transmission rates or with different transmission powers, the RIFS time is provided between the respective PHY frames to transmit the respective PHY frames at different transmission rates or with different transmission powers. (See TGn Sync Proposal Technical Specification, IEEE 802.11-04/889r6, May 2005, and WWiSE Proposal: High throughput extension to the 802.11 Standard, IEEE 802.11-05/0149r2, March 2005.)

In IEEE 802.11n, there has been proposed a method of improving transmission efficiency by a technique of performing bi-directional communication based on a piggyback technique during a TXOP time, acquired by an initiator, by making the initiator which has acquired the TXOP time allocate part of the TXOP time (TXOP allocation time) to a responder, i.e., a Reverse Direction (RD) scheme.

In IEEE 802.11n, when A-MPDU is used for the RD scheme (in which an initiator performs bi-directional communication with a responder by the piggyback technique during the TXOP time acquired by the EDCA scheme or the HCCA scheme), the initiator transmits an Initiator Aggregation Control (IAC) frame, and the responder returns a Responder Aggregation Control (RAC) frame the SIFS time after the transmission of the frame, thus performing IAC-RAC frame exchange. If the RD scheme is used on the assumption that such IAC-RAC frame exchange is performed, the initiator transmits, to the responder, an IAC frame in which information indicating the use of the RD scheme during an acquired TXOP time is written. Upon receiving the IAC frame and being notified of the information indicating that the RD scheme is used for communication in the TXOP time, the responder transmits an RAC frame addressed to the initiator after writing, in the frame, the number of data frames which the responder can transmit when part of the TXOP time is allocated, and a transmission data rate. The initiator determines an Reverse Direction Grant (RDG) duration as part of the TXOP time to be allocated to the responder from the number of data frames and the transmission data rate which are written in an RAC frame. The initiator writes the determined RDG duration in the IAC frame, attaches the IAC frame to the head of an aggregation frame to be transmitted, and transmits the aggregation frame the SIFS time after the completion of the reception of the previous RAC frame.

In this case, a data frame acknowledgement method (Ack-Policy) is a BlockAck scheme. If the immediate BlockAck scheme (in which upon receiving an acknowledgement request frame (BlockAck request frame), the responder transmits an acknowledgement frame (BlockAck frame) after the lapse of the SIFS time) defined in IEEE 802.11e is used as this BlockAck scheme, a BlockAckRequest frame is also combined with the end of an aggregation frame to be transmitted from the initiator. (Note, however, that in the Implicit Block Ack scheme proposed in IEEE 802.11n, BlockAckRequest is omitted.)

In the above case, when the SIFS time elapses after the reception of the aggregation frame from the initiator, the responder must transmit receiving statuses through a block Ack frame. In the RD scheme, when a block Ack frame is to be returned from the responder after the lapse of the SIFS time, the responder transmits an aggregation frame which is combined with a plurality of data frames and a block Ack frame like the piggyback technique. The time taken for the transmission of this aggregation frame must not exceed the RDG duration written in the IAC frame. When requesting an RDG duration in transmitting an aggregation frame, the responder inserts, in an RAC frame, the number of data frames ready for transmission (i.e., frames scheduled to be transmitted this time) and a transmission data rate, and returns the frame upon attaching it to the head of an aggregation frame to be transmitted this time. (See TGn Sync Proposal Technical Specification, IEEE 802.11-04/889r6, May 2005.)

In the above RD scheme, however, since a BlockAck frame and a BlockAckRequest frame are combined with data frames to be transmitted as one PHY frame, the data frames, the BlockAck frame, and the BlockAckRequest frame are transmitted at the same transmission rate. For this reason, the probability of transmission errors due to a deterioration in the wireless propagation environment or the occurrence of collisions becomes almost the same as in the data frames, the BlockAck frame, and BlockAckRequest frame.

In general, since the transmission error probability increases when a high transmission rate is used, the transmission rate of an aggregation frame needs to be decreased to increase the transmission success probabilities of a BlockAck frame and BlockAckRequest frame. Decreasing the transmission rate, however, will increase the transmission length of an aggregation frame, resulting in a decrease in throughput.

BRIEF SUMMARY OF THE INVENTION

In contrast, as the transmission rate is increased to realize high-speed transmission/reception of data frames, the transmission success probability of BlockAck frames and BlockAckRequest frames decrease. As a consequence, an initiator or responder which has failed in receiving a BlockAck frame or a BlockAckRequest frame needs to retransmit it. This leads to excessive deterioration in communication efficiency, i.e., a great reduction in throughput. The present invention has been made to solve the above problem, and has as its object to increase the transmission success probability of frames used for acknowledgement, e.g., a BlockAck frame or a BlockAckRequest frame.

According to a one aspect of the present invention, there is provided a wireless communication apparatus performs bi-directional communication with an initiator. The apparatus is allocated an allocation period for data transmission from the initiator. The apparatus includes means for generating a first physical frame including an acknowledgement frame with respect to a plurality of data frames received from the initiator, and generating a second physical frame in which a plurality of transmission data frames addressed to the initiator are aggregated. The apparatus also includes means for transmitting the first physical frame at a first transmission rate and the second physical frame at a second transmission rate, during the allocation period.

BRIEF DESCRIPTION OF THE SEVERAL VIEWS OF THE DRAWING

FIG. 17 is a timing chart according to the fifth embodiment;

FIG. 22 is a timing chart according to the seventh embodiment;

FIG. 24 is a timing chart according to the 11th embodiment; and

FIG. 25 is a timing chart according to the 12th embodiment.

DETAILED DESCRIPTION OF THE INVENTION

First Embodiment

Figure 1:
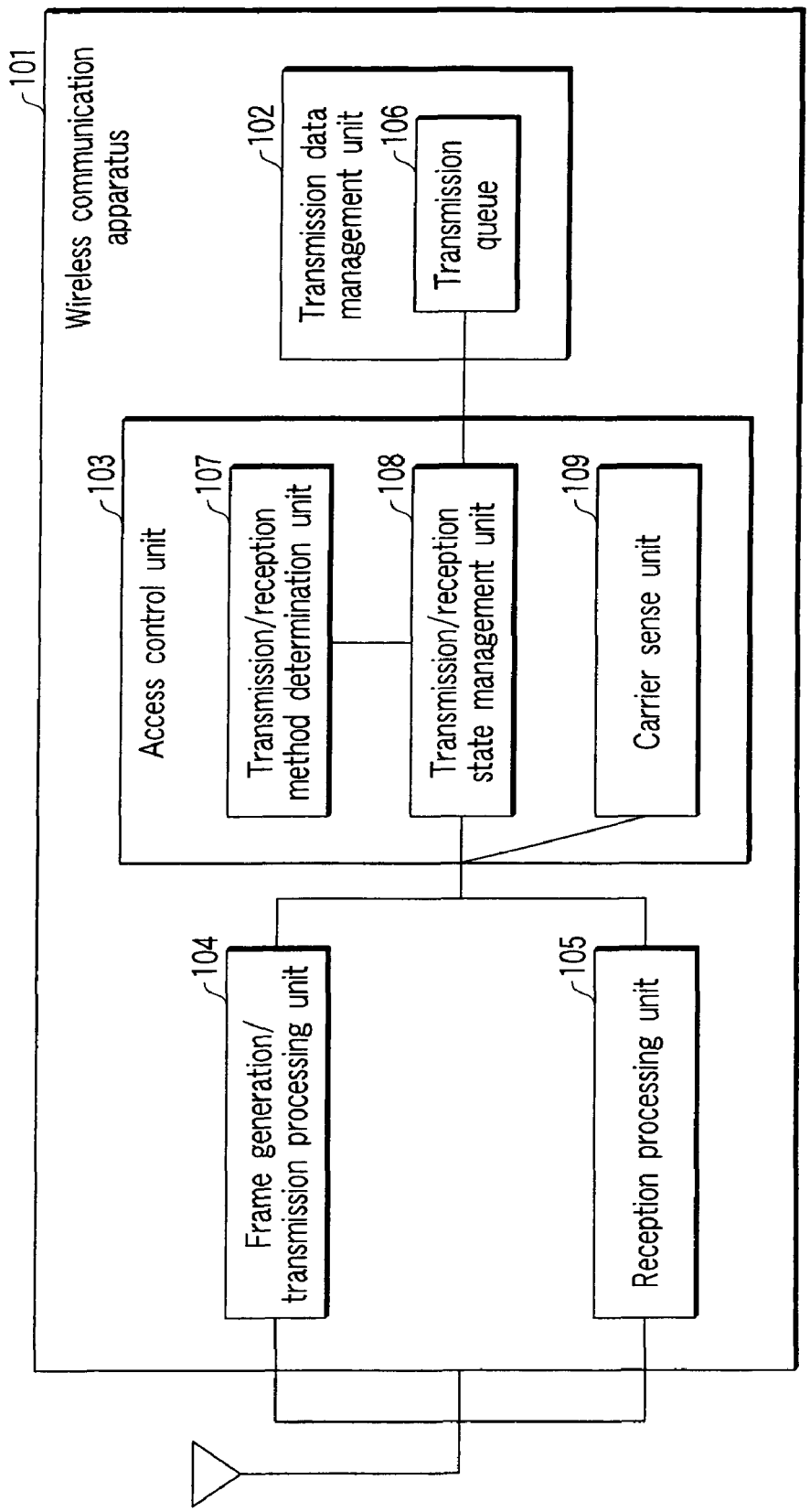
FIG. 1 is a block diagram of a wireless communication apparatus according to the first embodiment.

FIG. 1 is a block diagram associated with an example of a wireless communication apparatus 101 which supports the contents proposed in IEEE 802.11n wireless LAN communication specifications. That is, the following description will be made on the assumption that a high transmission rate in the Multiple Input, Multiple Output (MIMO) scheme proposed in IEEE 802.11n and the transmission scheme in which the frequency band is extended from the 20 MHz band to the 40 MHz band are supported.

Assume that the contents proposed in IEEE 802.11n described below include all the IEEE 802.11 standard specifications, IEEE 802.11a/b/g/e, and the like (including those regarded as amendments, recommended practices, and the like).

It is needless to say that IEEE 802.11n is an example, and the present invention can be applied to wireless communication schemes, in general.

The wireless communication apparatus 101 comprises a transmission data management unit 102, access control unit 103, frame generation/transmission processing unit 104, and reception processing unit 105.

The transmission data management unit 102 comprises a transmission queue 106 which buffers transmission data. The transmission data management unit 102 manages transmission data in the transmission queue 106.

The access control unit 103 performs access control such as frame transmission/reception processing and retransmission processing. The frames processed by the access control unit 103 include data (Data) frames including transmission data buffered in the transmission queue 106. In addition, these frames include control and management frames such as an acknowledgement frame (BlockAck frame or the like), IAC frame, RAC frame, RTS frame, and CTS frame. The access control unit 103 comprises a transmission/reception method determination unit 107, transmission/reception state management unit 108, and carrier sense unit 109.

The transmission/reception method determination unit 107 determines a transmission/reception method including an aggregation scheme, the Reverse Direction (RD) scheme, and the execution/nonexecution of RTS-CTS frame exchange.

The transmission/reception state management unit 108 performs access control such as transmission/reception timing management and retransmission processing associated with the transmission/reception method determined by the data transmission/reception method determination unit 107.

The carrier sense unit 109 monitors the reception processing unit 105 and performs virtual carrier sense processing which is set to Busy during the time indicated by the Network Allocation Vector (NAV) written in the duration field in a received frame, and carrier sense processing which is set to Busy when the reception power is larger than a predetermined value.

The frame generation/transmission processing unit 104 generates control frames and data frames. The frame generation/transmission processing unit 104 also performs transmission processing upon performing aggregation of frames.

The reception processing unit 105 performs reception processing such as identification processing of a reception frame and generation of an acknowledgement bitmap.

Figure 2:
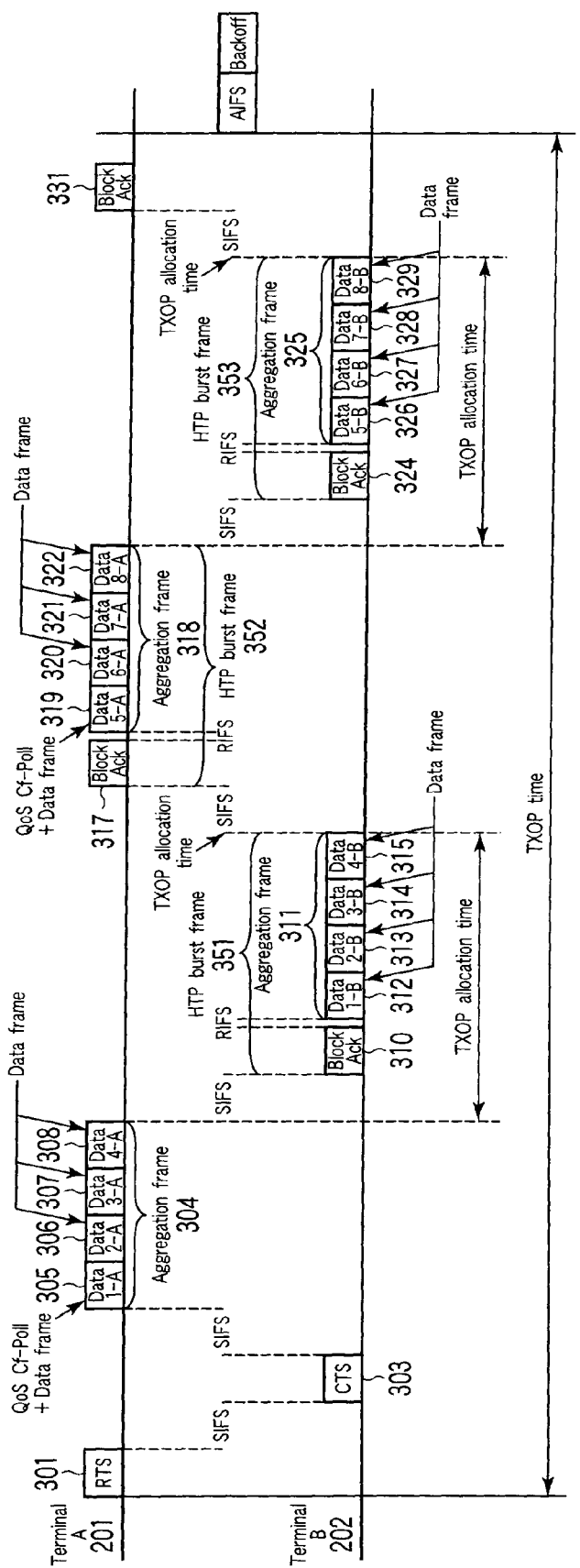
FIG. 2 is a timing chart according to the first embodiment.
Figure 3:
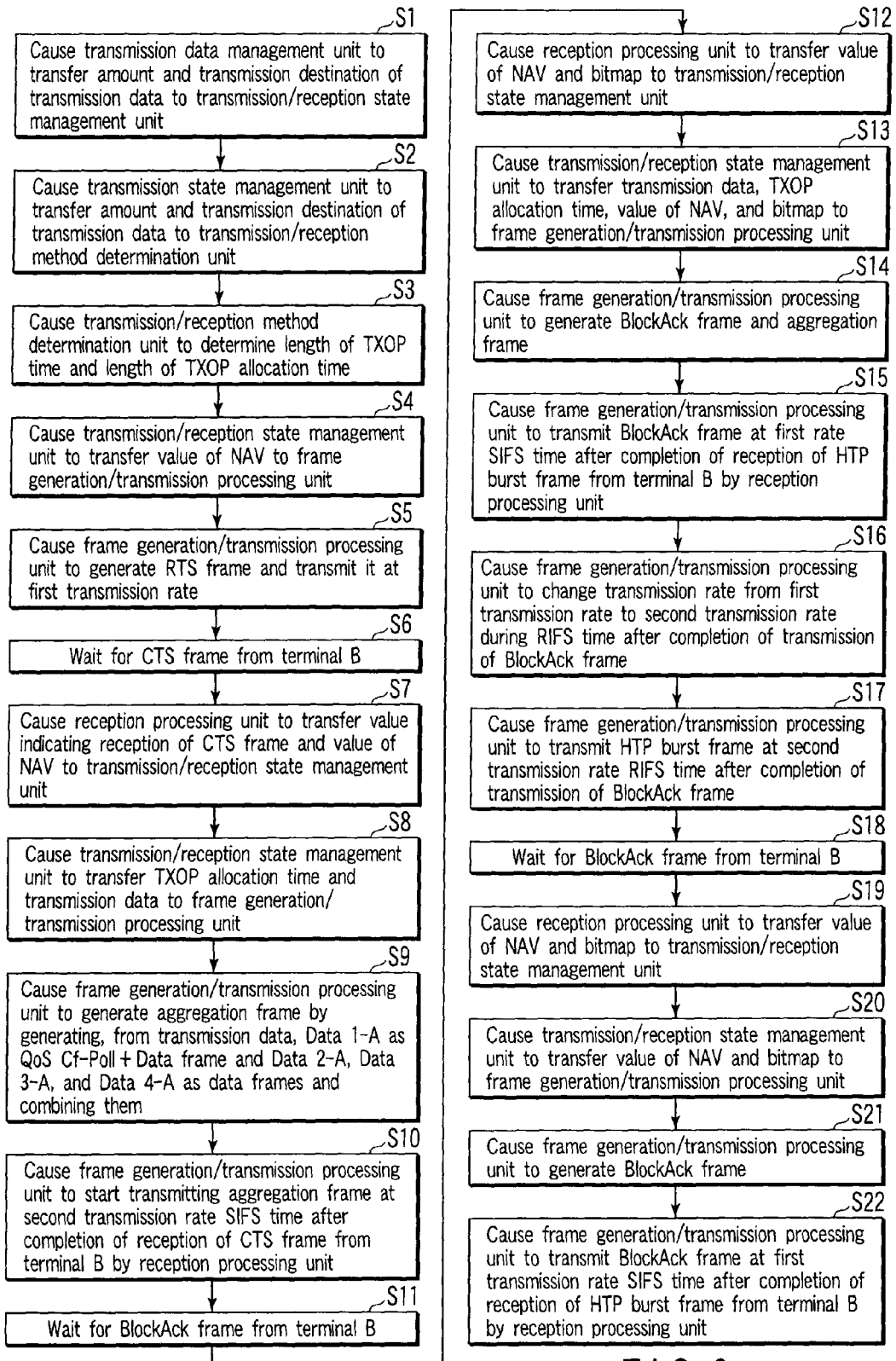
FIG. 3 is a flowchart associated with the operation of a terminal A in the first embodiment.
Figure 4:
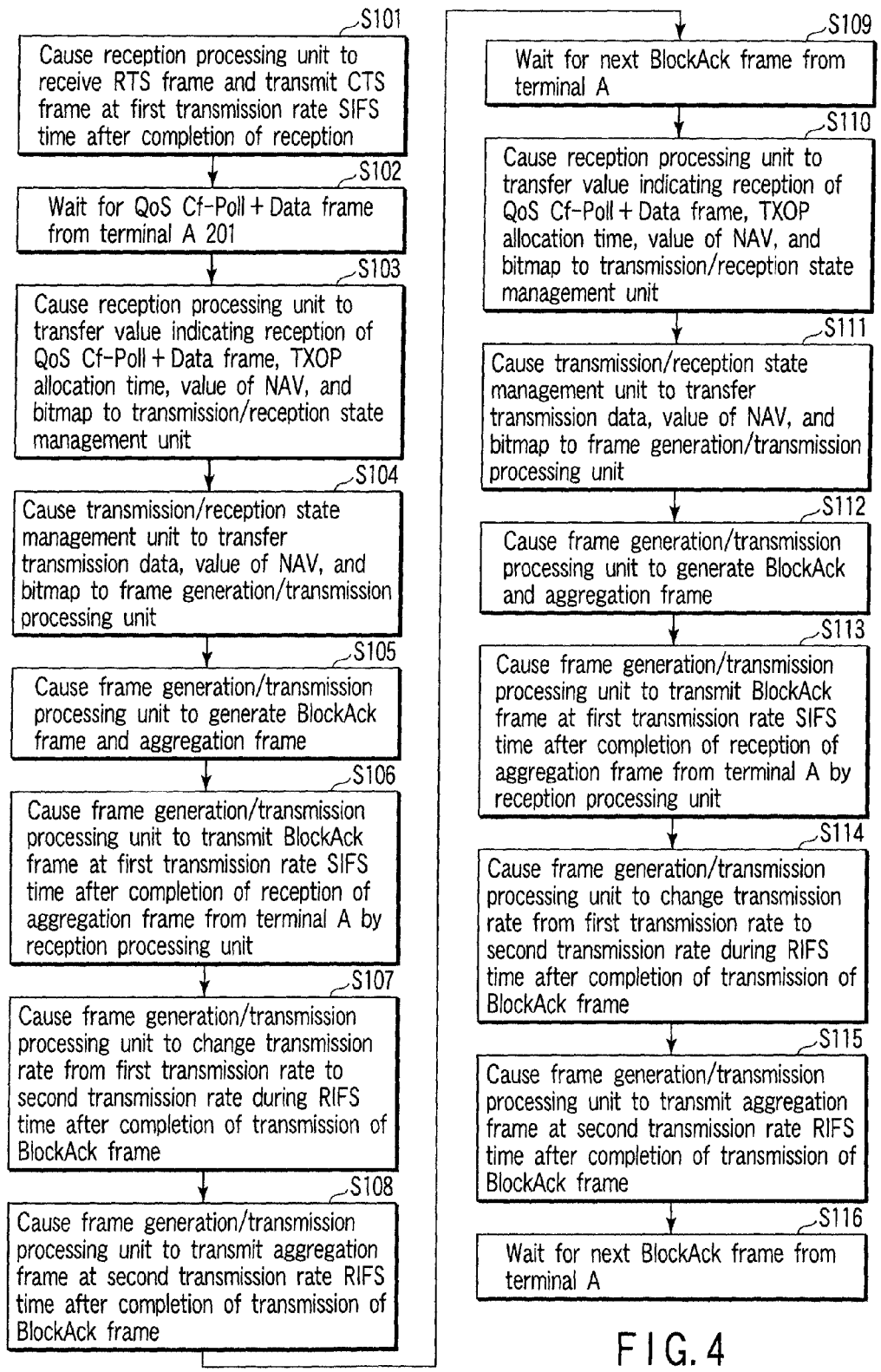
FIG. 4 is a flowchart associated with the operation of a terminal B in the first embodiment.

FIG. 2 is a timing chart for explaining a method of transmitting a BlockAck frame and a plurality of data frames at different transmission rates by using the HTP burst scheme in performing transmission/reception by the RD scheme. FIG. 3 is a flowchart associated with the operation of a terminal A 201. FIG. 4 is a flowchart associated with the operation of a terminal B 202.

Bi-directional communication will be described below on the assumption that all the transmission data from the terminal A 201 as an initiator are addressed to the terminal B 202 as a responder, and all the transmission data from the terminal B 202 are addressed to the terminal A 201. The terminal A 201 and the terminal B 202 each have the same arrangement as that of the wireless communication apparatus 101, and the constituent elements of each terminal are denoted by the same reference numerals as those in FIG. 1.

Figure 5:
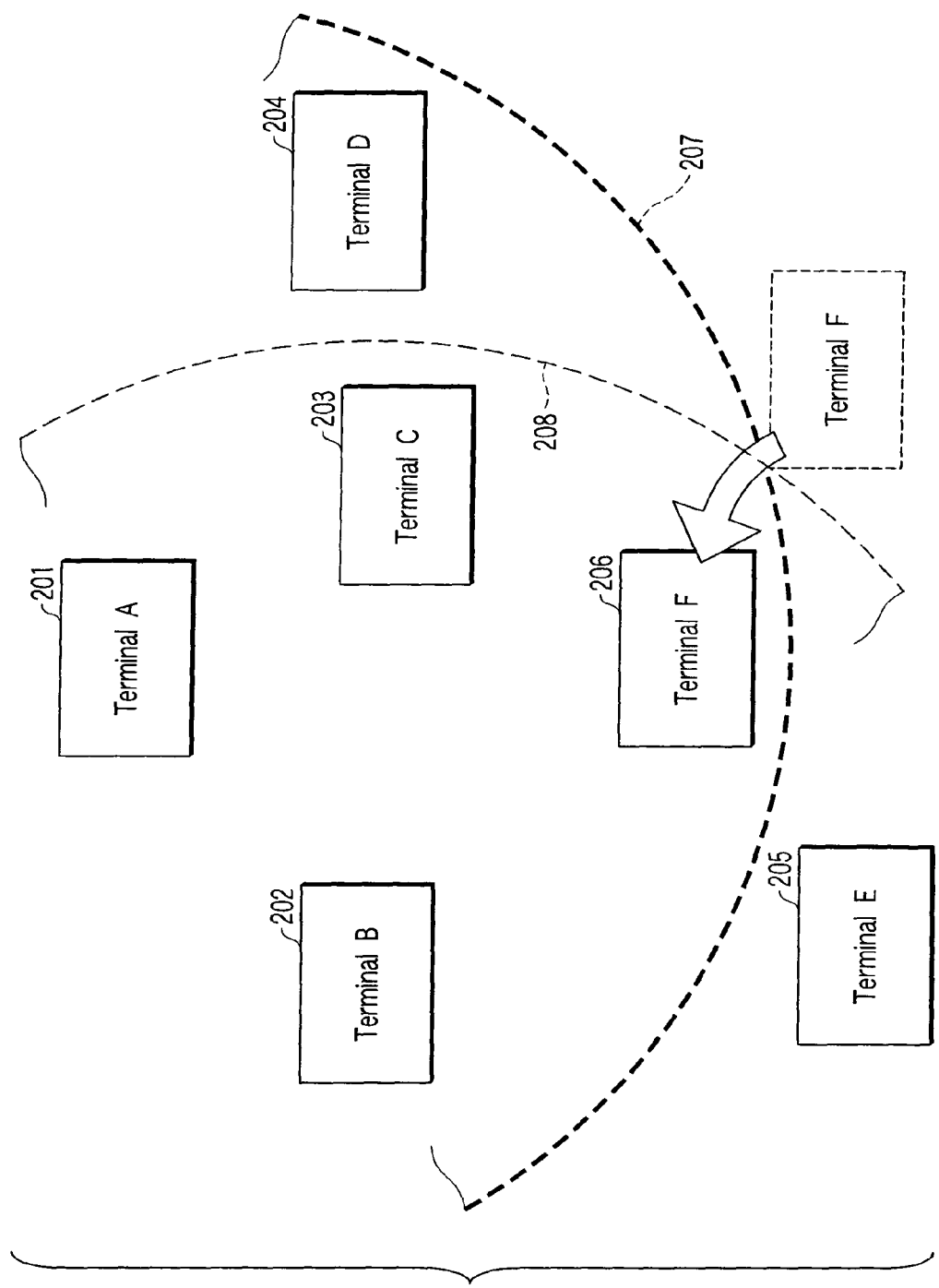
FIG. 5 is a view showing the positional relationship between terminals in the first embodiment.

In this bi-directional communication, as shown in FIG. 5, the wireless communication system to which the terminal A 201 and the terminal B 202 belong includes a terminal C 203, terminal D 204, terminal E 205, and terminal F 206 to which transmission data are not addressed, in addition to the terminal A 201 and the terminal B 202.

When the terminal A 201 and the terminal B 202 begin to perform bi-directional communication, the terminal C 203 is present in a range 207 in which transmission waves from the terminal A 201 can be received and a range 208 in which transmission waves from the terminal B 202 can be received.

When the terminal A 201 and the terminal B 202 begin to perform bi-directional communication, the terminal D 204 is present within the range 207 in which transmission waves from the terminal A 201 can be received but outside the range 208 in which transmission waves from the terminal B 202 can be received.

When the terminal A 201 and the terminal B 202 begin to perform bi-directional communication, the terminal E 205 is present outside the range 207 in which transmission waves from the terminal A 201 can be received but inside the range 208 in which transmission waves from the terminal B 202 can be received.

Assume that the terminal F 206 cannot receive transmission waves from the terminal A 201 and the terminal B 202 when the terminal A 201 and the terminal B 202 begin to perform bi-directional communication, but can receive transmission waves from the terminal A 201 and the terminal B 202 after the terminal A 201 and the terminal B 202 begin to perform bi-directional communication (i.e., after RTS-CTS exchange is complete).

Assume that the ImplicitBlockAckRequest scheme of the BlockAck schemes proposed in IEEE 802.11n is used as a data frame acknowledgement method (AckPolicy). In the BlockAck scheme, as an acknowledgement for a frame transmitted by a sender, a receiver transmits a BlockAck frame. In the ImplicitBlockAckRequest scheme, a sender does not transmit an acknowledgement request frame (BlockAckRequest frame) as a BlockAck frame transmission request.

Assume that the terminal A 201 performs management frame exchange such as association with the terminal B 202 in advance, and knows that the terminal B 202 supports the RD scheme, and the amount of data which the terminal B 202 wants to transmit to the terminal A 201.

Assume that negotiation based on the RD scheme is to be performed in this management frame exchange. In this case, both the terminal A 201 and the terminal B 202 are made to know that they will transmit two PHY frames with the RIFS time set therebetween after an aggregation frame 304 which the terminal A 201 transmits first, by writing the corresponding information in a management frame. Subsequently, the terminal A 201 and the terminal B 202 wait for two PHY frames with the RIFS time set therebetween in a standby state in communication based on the RD scheme.

It, however, may be defined such that when bi-directional communication based on the RD scheme is to be performed (without management frame exchange), two terminals will wait for two PHY frames with the RIFS time set therebetween.

It also may be defined that in a standby state in communication based on the RD scheme, two terminals will wait for three or more PHY frames with the RIFS time set therebetween.

Alternatively, when the terminal A 201 operates as a base station, it suffices to write, in a beacon frame transmitted from the terminal A 201, information indicating that two PHY frames with the RIFS time set therebetween are transmitted after the terminal A 201 transmits the first aggregation frame 304 if the RD scheme is used.

(1-1-1. Transmission of RTS Frame from Terminal A)

In the terminal A 201, when data is stored in the transmission queue 106 before the start of bi-directional communication, the transmission data management unit 102 transfers the priority, amount, and transmission destination of the stored transmission data to the transmission/reception state management unit 108 (step 1 in FIG. 3).

The transmission/reception state management unit 108 inquires the carrier sense unit 109, with respect to the received priority of the transmission data, about whether the transmission data can be transmitted. The carrier sense unit 109 monitors whether the reception power is equal to or more than a predetermined value (Idle) or not (Busy) (carrier sense processing). The carrier sense unit 109 also monitors whether a transmission band is reserved (virtual carrier sense processing). The transmission/reception state management unit 108 determines that transmission can be performed, if both the carrier sense result and the virtual carrier sense result obtained by the carrier sense unit 109 are Idle, and the period during which a transmission band is not reserved continues for an AIFS+Backoff time (Backoff may not be performed in some cases; ditto for the following). Upon determining that transmission can be performed, the transmission/reception state management unit 108 transfers the priority, amount, and transmission destination of the transmission data to the transmission/reception method determination unit 107 (step 2 in FIG. 3).

The transmission/reception method determination unit 107 determines the execution of the exchange of an RTS frame 301 and a CTS frame 303, the execution of bi-directional communication based on the RD scheme, the length (equal to the TXOP time in this embodiment) of the time (NAV time) of band reservation in the TXOP time, and the length of part of the TXOP time (TXOP allocation time) allocated to the terminal B 202 (step 3 in FIG. 3).

In this case, for example, the NAV time and the TXOP allocation time may be predetermined values or may be calculated by any calculation methods. A description of a calculation method to be used will be omitted because it is not relevant to embodiments of the present invention.

The transmission/reception state management unit 108 transfers the value of NAV to be written in the duration field of the RTS frame 301 to the frame generation/transmission processing unit 104 in accordance with the information determined by the transmission/reception method determination unit 107 (step 4 in FIG. 3). The value of NAV written in the RTS frame 301 is handled as a time to the TXOP limit used in the RD scheme.

The frame generation/transmission processing unit 104 generates the RTS frame 301 in which the received length of the TXOP time is written as the value of NAV in the duration field, and transmits the frame at the first transmission rate (step 5 in FIG. 3).

The first transmission rate is, for example, a transmission rate defined in 802.11a specifications or the basic rate. Alternatively, this rate is the lower transmission rate in 802.11n or the basic rate. If, for example, a terminal which does not support the 802.11n but supports 802.11a is located at a position where it can receive transmission waves from the terminal A 201 or the terminal B 202, the first transmission rate is the transmission rate defined in 802.1a. In contrast, if there is only a terminal which supports 802.11n at a position where it can receive transmission waves from the terminal A 201 or the terminal B 202, the first transmission rate is the lower transmission rate defined in 802.11n or the basic rate. If a terminal which does not support 802.11n exists, but band reservation has already been performed for the terminal which does not support 802.11n, the first transmission rate is the lower transmission rate defined in 802.11n or the basic rate. The RTS frame 301 addressed to the terminal B 202, which has been transmitted by the terminal A 201, is also received by the terminal C 203 or the terminal D 204. Upon determining that the received RTS frame 301 is address to the terminal B 202, the terminal C 203 and the terminal D 204 inhibit from performing communication using the corresponding Duration field for only the NAV time. As a result, for the terminal A 201, a transmission band can be reserved.

When the transmission of the RTS frame 301 is complete, the reception processing unit 105 waits for the CTS frame 303 from the terminal B 202 for only a time corresponding to the sum of the SIFS time and a 1 slot time. If the reception processing unit 105 cannot start receiving the CTS frame 303 within the time corresponding to the sum of the SIFS time and the 1-slot time, Backoff processing for the retransmission of the RTS frame 301 is started (step 6 in FIG. 3).

(1-1-2. Reception of RTS Frame and Transmission of CTS Frame by Terminal B)

The reception processing unit 105 of the terminal B 202 receives the RTS frame 301, and transmits the CTS frame 303 at the first transmission rate the SIFS time after the completion of the reception (step 101 in FIG. 4). The value obtained by subtracting the SIFS time and the time taken for the transmission of the CTS frame 303 from the value of NAV written in the RTS frame 301 is written as the value of NAV in the CTS frame 303 (since the length of each frame is known in advance and the transmission rate is determined in advance, the time taken for transmission is known). The RTS frame 301 and the CTS frame 303 are the same as those in general RTS-CTS exchange in IEEE 802.11 which are existing specifications, and hence the terminal B 202 does not know at this point of time that the terminal A 201 uses the RD scheme.

When the transmission of the CTS frame 303 is complete, the reception processing unit 105 waits for the reception of a data frame (step 102 in FIG. 4).

The terminal E 205 also receives the CTS frame 303 addressed to the terminal A 201 which has been transmitted from the terminal B 202. Upon determining that the received CTS frame 303 is addressed to the terminal A 201, the terminal E 205 inhibits itself from performing communication using the corresponding transmission band for a time corresponding to the value of NAV written in the CTS frame 303. As a consequence, for the terminal A 201, a transmission band reservation has been made.

(1-1-3. Reception of CTS Frame and Transmission of Aggregation Frame by Terminal A)

When the reception processing unit 105 receives the CTS frame 303 from the terminal B 202, the terminal A 201 transfers, to the transmission/reception state management unit 108, a value representing the reception of the CTS frame 303 and the value of NAV written in the CTS frame 303 (step 7 in FIG. 3).

The transmission/reception state management unit 108 extracts transmission data buffered in the transmission queue 106, and transfers the data to the frame generation/transmission processing unit 104, together with the TXOP allocation time determined by the transmission/reception method determination unit 107 (step 8 in FIG. 3).

The frame generation/transmission processing unit 104 generates, from the transmission data, Data 1-A 305 as a QoS Cf-Poll+Data frame, and Data 2-A 306, Data 3-A 307, Data 4-A 308 as data frames. In addition, the frame generation/transmission processing unit 104 generates the aggregation frame 304 by combining the Data 1-A 305, Data 2-A 306, Data 3-A 307, and Data 4-A 308 in the order named, with the Data 1-A 305 being the first frame, upon attaching a field for identifying each frame to its head (step 9 in FIG. 3).

A TXOP allocation time is written in the QoS control field of the Data 1-A 305 as a QoS Cf-Poll+Data frame. In this embodiment, the TXOP allocation time is the sum of the RIFS time, the time taken for the transmission of an aggregation frame 311 (to be described later), the SIFS time, and the time taken for the transmission of a BlockAck frame 310 with respect to the aggregation frame 304. The value obtained by subtracting the SIFS time and the time taken for the transmission of the aggregation frame 304 from the value of NAV written in the CTS frame 303 transmitted from the terminal B 202 is written, as the value of NAV, in each of the Data 1-A 305, Data 2-A 306, Data 3 A 307, and Data 4-A 308. This value of NAV indicates the length of the time from the completion of the transmission of the aggregation frame 304 to the end of the TXOP time.

The frame generation/transmission processing unit 104 starts to transmit the aggregation frame 304 the SIFS time after the completion of the reception of the CTS frame 303 from the terminal B 202 by the reception processing unit 105 (step 10 in FIG. 3). This transmission is performed at the second transmission rate higher than the first transmission rate. The second transmission rate is the higher transmission rate in the 802.11n specifications, e.g., a high rate based on MIMO technology.

When the transmission of the aggregation frame 304 is complete, the reception processing unit 105 waits for the BlockAck frame 310 from the terminal B 202 for only a time corresponding to the sum of the SIFS time and a 1-slot time. If the reception processing unit 105 cannot receive the BlockAck frame 310 within the time corresponding to the sum of the SIFS time and the 1-slot time, the reception processing unit 105 retransmits the aggregation frame 304 (step 11 in FIG. 3).

In this case, since the terminal A 201 knows that it uses the RD scheme, the terminal A 201 causes the reception processing unit 105 to wait for two PHY frames with the RIFS time set therebetween in a subsequent standby state.

(1-1-4. Reception of Aggregation Frame and Transmission of HTP Burst Frame by Terminal B)

The reception processing unit 105 of the terminal B 202 which has received the aggregation frame 304 transfers, to the transmission/reception state management unit 108, a value indicating the reception of a QoS Cf-Poll+Data frame, the TXOP allocation time written in the Data 1-A 305, and the value of NAV written in each of the Data 1-A 305, Data 2-A 306, Data 3-A 307, and Data 4-A 308. The reception processing unit 105 generates a bitmap for notifying a remote terminal of acknowledgement from the reception success/failure status of each of Data 1-B 312, Data 2 B 313, Data 3-B 314, and Data 4-B 315 transmitted from the terminal A 201, and transfers the bitmap to the transmission/reception state management unit 108 (step 103 in FIG. 4).

The terminal B 202 knows for the first time that the terminal A 201 will use the RD scheme, when receiving a QoS Cf-Poll+Data frame having the function of a poll frame notifying that the TXOP allocation time has been allocated. Upon determining that the RD scheme is used, the terminal B 202 transmits transmission data as a data frame which it wants to transmit to the terminal A 201 in the TXOP allocation time.

Upon determining that the terminal A 201 will use the RD scheme, the terminal B 202 causes the reception processing unit 105 to wait for two PHY frames with the RIFS time set therebetween in a subsequent standby state.

The transmission/reception state management unit 108 determines, from the value indicating the reception of the QoS Cf-Poll+Data frame, that the terminal A 201 is performing communication by the RD scheme. The transmission/reception state management unit 108 then extracts transmission data buffered in the transmission queue 106, and transfers the data to the frame generation/transmission processing unit 104, together with the TXOP allocation time, the value of NAV received from the reception processing unit 105, and a bitmap for notifying the remote terminal of acknowledgement (step 104 in FIG. 4). The amount of transmission data extracted from the transmission queue 106 will be described later.

The frame generation/transmission processing unit 104 generates an acknowledgement (BlockAck) frame with respect to the Data 1-A 305, Data 2-A 306, Data 3-A 307, and Data 4-A 308 transmitted from the terminal A 201 by using the bitmap for notifying the remote terminal of acknowledgement. The frame generation/transmission processing unit 104 also generates the Data 1-B 312, Data 2-B 313, Data 3-B 314, and Data 4-B 315 as data frames from the transmission data, and generates the aggregation frame 311 by combining the Data 1-B 312, Data 2-B 313, Data 3-B 314, and Data 4-B 315.

The frame generation/transmission processing unit 104 writes, as the value of NAV in the BlockAck frame 310, the value obtained by subtracting the SIFS time and the time taken for the transmission of a BlockAck frame 310 from the received value of NAV. This value of NAV indicates the length of the time from the completion of the transmission of the BlockAck frame 310 to the end of the TXOP time.

The frame generation/transmission processing unit 104 writes the value obtained by subtracting the RIFS time and the time taken for the transmission of the aggregation frame 311 from the value of NAV written in the BlockAck frame 310, as the value of NAV, in each of the Data 1-B 312, Data 2-B 313, Data 3-B 314, and Data 4-B 315. This value of NAV indicates the length of the time from the completion of the transmission of the aggregation frame 311 to the end of the TXOP time (step 105 in FIG. 4).

A frame obtained by inserting the RIFS time between a BlockAck frame and an aggregation frame will be referred to as an HTP burst frame hereinafter (to be described in detail in the 10th embodiment). The amount of transmission data which the transmission/reception state management unit 108 extracts from the transmission queue 106 and transfers to the frame generation/transmission processing unit 104 is defined such that the frame length of an HTP burst frame 351 does not exceed the TXOP allocation time written in the Data 1-A 305. The frame generation/transmission processing unit 104 starts to transmit the generated HTP burst frame 351 the SIFS time after the completion of the reception of the aggregation frame 304 transmitted from the terminal A 201 by the reception processing unit 105.

The transmission of the HTP burst frame 351 will be described in detail below. First of all, the transmission of the BlockAck frame 310 is started (step 106 in FIG. 4). Assume that the transmission rate of the BlockAck frame 310 is the first transmission rate.

The frame generation/transmission processing unit 104 waits for the start of the transmission of the aggregation frame 311 for only the RIFS time after the completion of the transmission of the BlockAck frame 310 (step 107 in FIG. 4). During this period, the frame generation/transmission processing unit 104 changes the transmission rate from the first transmission rate to the second transmission rate.

The frame generation/transmission processing unit 104 transmits the aggregation frame 311 at the second transmission rate the RIFS time after the completion of the transmission of the BlockAck frame 310 (step 108 in FIG. 4).

Upon completion of the transmission of the aggregation frame 311, the reception processing unit 105 waits for a frame from the terminal A 201 (step 109 in FIG. 4).

(1-1-5. Reception of HTP Burst Frame and Transmission of HTP Burst Frame by Terminal A)

The operation of the terminal A 201 will be described below in a case wherein when an HTP burst frame 351 is received, data to be transmitted to the terminal B 202 is stored in the transmission queue 106.

The reception processing unit 105 of the terminal A 201 which has received the HTP burst frame 351 generates a bitmap for notifying the remote terminal of acknowledgement from the reception success/failure status of each of the Data 1-B 312, Data 2-B 313, Data 3-B 314, and Data 4-B 315, and transfers the bitmap to the transmission/reception state management unit 108, together with the value of NAV written in each of the Data 1-B 312, Data 2-B 313, Data 3-B 314, and Data 4-B 315. The reception processing unit 105 also transfers the received bitmap written in the BlockAck frame 310 to the transmission/reception state management unit 108 (step 12 in FIG. 3).

Assume that in the received bitmap, a value indicating non-transmission is written in each of the Data 1-A 305, Data 2-A 306, Data 3-A 307, and Data 4-A 308. In this case, the transmission/reception state management unit 108 inserts the data frames in an aggregation frame 318 (to be described later) to retransmit them. The transmission/reception state management unit 108 also extracts transmission data buffered in the transmission queue 106, and transfers the data to the frame generation/transmission processing unit 104, together with the TXOP allocation time received from the transmission/reception method determination unit 107, the value of NAV received from the reception processing unit 105 and the transmission bitmap (step 13 in FIG. 3).

The frame generation/transmission processing unit 104 generates the BlockAck frame 317 with respect to the Data 1-B 312, Data 2-B 313, Data 3-B 314, and Data 4-B 315 transmitted from the terminal B 202 by using the received transmission bitmap. The frame generation/transmission processing unit 104 also generates the aggregation frame 318 including Data 5-A 319 as a QoS Cf-Poll+Data frame and the Data 5-A 319, Data 6-A 320, Data 7-A 321, and Data 8-A 322 as data frames. Note that if there are data frames to be retransmitted, the data frames to be retransmitted are attached before the data frames to be newly generated. If, however, there are many data frames to be retransmitted, the number of data frames to be newly generated is reduced or no new data frame is attached. In this case, the frame generation/transmission processing unit 104 writes, as the value of NAV in the BlockAck frame 317, the value obtained by subtracting the SIFS time and the time taken for the transmission of the BlockAck frame 317 from the value of NAV received from the reception processing unit 105. This value of NAV indicates the length of time from the completion of the transmission of the BlockAck frame 317 to the end of the TXOP time.

The frame generation/transmission processing unit 104 writes the TXOP allocation time in the Data 1-A 305 as a QoS Cf-Poll+Data frame.

The frame generation/transmission processing unit 104 writes the value obtained by subtracting the RIFS time and the time taken for the transmission of the aggregation frame 318 from the value of NAV written in the BlockAck frame 317, as the value of NAV, in each of the Data 5-A 319, Data 6-A 320, Data 7-A 321, and Data 8-A 322. This value of NAV indicates the length of the time from the completion of the transmission of the aggregation frame 318 to the end of the TXOP time (step 14 in FIG. 3). The frame generation/transmission processing unit 104 starts to transmit a generated HTP burst frame 352 the SIFS time after the completion of the reception of the HTP burst frame 351 transmitted from the terminal B 202 by the reception processing unit 105.

The transmission of the HTP burst frame 352 will be described in detail below. First of all, the transmission of the BlockAck frame 317 is started (step 15 in FIG. 3). Assume that the transmission rate of the BlockAck frame 317 is the first transmission rate.

The frame generation/transmission processing unit 104 waits for the start of the transmission of the aggregation frame 318 for only the RIFS time after the completion of the transmission of the BlockAck frame 317 (step 16 in FIG. 3). During this period, the frame generation/transmission processing unit 104 changes the transmission rate from the first transmission rate to the second transmission rate.

The frame generation/transmission processing unit 104 transmits the aggregation frame 318 at the second transmission rate the RIFS time after the completion of the transmission of the BlockAck frame 317 (step 17 in FIG. 3).

The terminal F 206 could not receive the RTS frame 301 transmitted from the terminal A 201 or the CTS frame 303 transmitted from the terminal B 202 because the terminal F 206 was in a state wherein it could not receive the frames when they were transmitted. When, however, the terminal F 206 receives either the BlockAck frame or the aggregation frame after it is set in a state wherein it can receive communication, the terminal F 206 knows the value of NAV written in the frame, and inhibits itself from performing communication using the corresponding transmission band for a time corresponding to the value of NAV. As a consequence, for the terminal A 201, a transmission band reservation can be made with respect to the terminal F 206.

Even if the terminal F 206 does not support 802.11n and an aggregation frame or a frame transmitted at a high transmission rate based on MIMO technology cannot be received, since the BlockAck frame 317 is transmitted before data frames at the first transmission rate at which even the terminal F 206 can receive the frame, the terminal F 206 can know, from the BlockAck frame 317, the address and the value of NAV of each of data frames transmitted as the aggregation frame 318 before the reception of each data frame. Knowing this address and the value of NAV allows the terminal F 206 to know that a band reservation has been made, together with the length of the reservation, even if the terminal cannot receive any data frame transmitted afterward.

When the transmission of the HTP burst frame 352 is complete, the reception processing unit 105 waits for a BlockAck frame 324 from the terminal A 201 for only a time corresponding to the sum of the SIFS time and a 1-slot time. If the reception processing unit 105 cannot receive the BlockAck frame 324 within the time corresponding to the sum of the SIFS time and the 1-slot time, the reception processing unit 105 retransmits the HTP burst frame 352 (step 18 in FIG. 3).

(1-1-6. Reception of HTP Burst Frame and Transmission of HTP Burst Frame by Terminal B)

The reception processing unit 105 of the terminal B 202 which has received two PHY frames with the RIFS time set therebetween, i.e., the HTP burst frame 352, generates a bitmap for notifying the remote terminal of acknowledgement from the reception success/failure status of each of the Data 5-A 319, Data 6-A 320, Data 7-A 321, and Data 8-A 322. The reception processing unit 105 transfers, to the transmission/reception state management unit 108, a value indicating the reception of a QoS Cf-Poll+Data frame, the TXOP allocation time written in the Data 5-A 319, the value of NAV written in each of Data 5-A 319, Data 6-A 320, Data 7-A 321, and Data 8-A 322, the bitmap for notifying the remote terminal of acknowledgement, and the bitmap written in the BlockAck frame 317 (step 110 in FIG. 4).

If a value indicating non-transmission of each of the Data 1-B 312, Data 2-B 313, Data 3-B 314, and Data 4-B 315 is written in the received bitmap, the transmission/reception state management unit 108 inserts the data frames in an aggregation frame 325 (to be described later) to retransmit them. The transmission/reception state management unit 108 also extracts transmission data buffered in the transmission queue 106, and transfers the data to the frame generation/transmission processing unit 104, together with the value of NAV received from the reception processing unit 105 and a bitmap for notifying the remote terminal of acknowledgement (step 111 in FIG. 4). The amount of transmission data extracted from the transmission queue 106 will be described later.

The frame generation/transmission processing unit 104 generates the BlockAck frame 324 with respect to the Data 5-A 319, Data 6-A 320, Data 7-A 321, and Data 8-A 322 transmitted from the terminal A 201 by using the bitmap for notifying the remote terminal of the acknowledgement.

The frame generation/transmission processing unit 104 generates Data 5-B 326, Data 6-B 327, Data 7-B 328, and Data 8-B 329 as data frames from the transmission data. The frame generation/transmission processing unit 104 generates the aggregation frame 325 by combining the Data 5-B 326, Data 6-B 327, Data 7-B 328, and Data 8-B 329 (step 112 in FIG. 4).

The frame generation/transmission processing unit 104 writes, as the value of NAV in the BlockAck frame 324, the value obtained by subtracting the SIFS time and the time taken for the transmission of the BlockAck frame 324 from the received value of NAV. This value of NAV indicates the length of the time from the completion of the transmission of the BlockAck frame 324 to the end of the TXOP time.

In addition, the frame generation/transmission processing unit 104 writes the value obtained by subtracting the RIFS time and the time taken for the transmission of the aggregation frame 325 from the value of NAV written in the BlockAck frame 324, as the value of NAV, in each of the Data 5-B 326, Data 6-B 327, Data 7-B 328, and Data 8-B 329. This value of NAV indicates the length of the time from the completion of the transmission of the aggregation frame 325 to the end of the TXOP time. The amount of transmission data which the transmission/reception state management unit 108 extracts from the transmission queue 106 and transfers to the frame generation/transmission processing unit 104 is defined such that the frame length of the HTP burst frame obtained by inserting the RIFS time between the BlockAck frame 324 and the aggregation frame 325 does not exceed the TXOP allocation time written in the Data 5-A 319 as a QoS Cf-Poll+Data frame. If, however, there are data frames to be retransmitted, the number of data frames to be generated in this case is decreased accordingly. That is, the amount of transmission data which the transmission/reception state management unit 108 extracts from the transmission queue 106 and transfers to the frame generation/transmission processing unit 104 is defined such that the frame length of an HTP burst frame 353 formed by the BlockAck frame 324, the RIFS time, and the aggregation frame 325 does not exceed the TXOP allocation time.

The frame generation/transmission processing unit 104 starts to transmit the generated HTP burst frame 353 the SIFS time after the completion of the reception of the HTP burst frame transmitted from the terminal A 201 by the reception processing unit 105.

The transmission of the HTP burst frame 353 will be described in detail. First of all, the transmission of the Block-Ack frame 324 is started (step 113 in FIG. 4). Assume that the transmission rate of the BlockAck frame 324 is the first transmission rate.

The frame generation/transmission processing unit 104 waits for the start of the transmission of the aggregation frame 325 for only the RIFS time after the completion of the transmission of the BlockAck frame 324 (step 114 in FIG. 4). During this period, the frame generation/transmission processing unit 104 changes the transmission rate from the first transmission rate to the second transmission rate.

The frame generation/transmission processing unit 104 transmits the aggregation frame 325 at the second transmission rate the RIFS time after the completion of the transmission of the BlockAck frame 324 (step 115 in FIG. 4).

When the transmission of the HTP burst frame 353 is complete, the reception processing unit 105 waits for a frame from the terminal A 201 (step 116 in FIG. 4).

(1-1-7. Reception of HTP Burst Frame and Transmission of BlockAck Frame by Terminal A)

The operation of the terminal A 201 at the end of the NAV time will be described in a case wherein when the HTP burst frame 353 is received, there is no data to be transmitted to the terminal B 202 in the transmission queue 106 and there is no data frame to be retransmitted or transmission cannot be continued any longer near the end of the TXOP time.

The reception processing unit 105 of the terminal A 201 which has received two PHY frames with the RIFS time set therebetween, i.e., the HTP burst frame 353, generates a bitmap indicating acknowledgement from the reception success/failure status of each of the Data 5 B 326, Data 6-B 327, Data 7-B 328, and Data 8-B 329, and transfers the bitmap to the transmission/reception state management unit 108, together with the value of NAV written in each of the Data 5-B 326, Data 6-B 327, Data 7-B 328, and Data 8-B 329. The reception processing unit 105 also transfers the received bitmap written in the BlockAck frame 324 to the transmission/reception state management unit 108 (step 19 in FIG. 3).

The transmission/reception state management unit 108 checks the transmission success/failure of each of the Data 5-A 319, Data 6-A 320, Data 7-A 321, and Data 8-A 322 from the received bitmap. The transmission/reception state management unit 108 transfers the value of NAV received from the reception processing unit 105 to the frame generation/transmission processing unit 104 (step 20 in FIG. 3).

The frame generation/transmission processing unit 104 generates a BlockAck frame 331 with respect to the Data 5-B 326, Data 6-B 327, Data 7-B 328, and Data 8-B 329 transmitted from the terminal B 202 by using the received bitmap.

The frame generation/transmission processing unit 104 writes, as the value of NAV in the BlockAck frame 331, the value obtained by subtracting the SIFS time and the time taken for the transmission of the BlockAck frame 331 from the value of the NAV received from the reception processing unit 105. This value of NAV indicates the length of the time from the completion of the transmission of the BlockAck frame 331 to the end of the TXOP time (step 21 in FIG. 3).

The frame generation/transmission processing unit 104 starts to transmit the generated BlockAck frame 331 the SIFS time after the completion of the reception of the HTP burst frame 353 transmitted from the terminal A 201 by the reception processing unit 105 (step 22 in FIG. 3). Assume that the transmission rate of the BlockAck frame 331 is the first transmission rate.

(1-1-8. End of TXOP Time)

When a time corresponding to the value of NAV written in the BlockAck frame 331 transmitted from the terminal A 201 elapses after the end of the transmission of the BlockAck frame 331, the band reservation is released, and the bi-directional communication between the terminal A 201 and the terminal B 202 is terminated. When this bi-directional communication is terminated, the reception processing unit 105 of each of the terminal A 201 and the terminal B 202 stops waiting for two PHY frames with the RIFS time set therebetween, and is set in the general standby state. When this bi-directional communication is to be further performed, the above processing is performed again from the sequence of "1-1-1" after the lapse of the AIFS+Backoff time since the release of the band reservation. Alternatively, when bi-directional communication like that in this embodiment or general communication is to be performed with another terminal, the above processing is performed again from the sequence of "1-1-1" after the lapse of the AIFS+Backoff time since the release of the band reservation, assuming that another terminal is the terminal B 202.

As described above, according to this embodiment, control frames (BlockAck frame, or the like) are transmitted at a low transmission rate, and data frames are transmitted at a high transmission rate.

Transmission at a low transmission rate can suppress the occurrence of transmission errors due to noise and the like. Transmission at a high transmission rate makes it possible to perform high-speed transmission.

The present invention can satisfy both the requirement to suppress responders from issuing retransmission requests due to failures of reception of control frames (BlockAck frame, BlockAckRequest frame, or the like) and the requirement to realize high-speed transmission of data frames.

Assume that the terminal A 201 and terminal B 202 in this embodiment use the 40-MHz frequency band as a combination of two 20-MHz frequency bands like that proposed in IEEE 802.11n as a frequency band for the transmission of data instead of the conventional 20-MHz frequency band used in IEEE 802.11a/b/g and the like. In this case, general transmission data are transmitted with the 40-MHz frequency band, and frames in which the value of NAV is written, e.g., the RTS frame 301, the CTS frame 303, and the BlockAck frames 305, 310, 317, 324, and 331 are transmitted as frames in the 20-MHz band upon switching the transmission frequency band to the 20-MHz band on the PHY layer of the digital processing unit while the 40-MHz frequency band of the analog unit is kept unchanged. This makes it possible to notify the value of NAV to a terminal which uses only the 20-MHz band like that in IEEE 802.11a/b/g and the like.

Assume that there is no need to notify a wireless communication apparatus which uses the 20-MHz band of NAV by using a control frame because there is no terminal which uses only the 20-MHz band or NAV has already been set for a terminal which uses only the MHz band. In this case, decreasing the transmission rate of a BlockAck frame to the lower transmission rate in the 40-MHz band makes it possible to increase the possibility that the BlockAck frame will reach all the terminals in the wireless communication system. In addition, this embodiment has exemplified the case wherein the value of NAV is notified by RTS-CTS frame exchange, i.e., transmitting the RTS frame 301 from the terminal A 201 and transmitting the CTS frame 303 from the terminal B 202. However, the method of notifying the value of NAV is not limited to this. Obviously, an HTP burst frame like that in this embodiment can also be transmitted in a method of transmitting an aggregation frame after the lapse of the SIFS time during which so-called IAC-RAC frame exchange is performed or a CTS-self frame is transmitted.

If a band reservation has been made by NAV from a base station in the HCCA time as in communication by the HCCA scheme, the RD scheme may be started from the transmission of an aggregation frame without performing RTS-CTS frame exchange.

This embodiment has also exemplified the case wherein the TXOP allocation time is written in a QoS Cf-Poll+Data frame. However, the QoS Cf-Poll+Data frame may be divided into a QoS Cf-Poll frame and a data frame, and the TXOP allocation time may be written in the QoS control field of the QoS Cf-Poll frame.

In addition, this embodiment has exemplified bi-directional communication between the terminal A 201 and the terminal B 202. However, no problem arises even if the terminal A 201 or the terminal B 202 is a base station or a terminal station. If, however, the terminal A 201 is a base station, when an RTS frame is to be transmitted after a reserved transmission band is released, an access may be made by the EDCA scheme in which an access is started the AIFS+Backoff time after the release of the band. Alternatively, an access may be made by the HCCA scheme in which an RTS frame, QoS Cf-Poll frame, or data frame is transmitted after the lapse of the RIFS time.

First Modification of First Embodiment

In the first embodiment, the terminal A 201 writes the TXOP allocation time in a QoS Cf-Poll+Data frame. That is, the terminal A 201 notifies the terminal B 202 of the TXOP allocation time. The terminal B 202 transmits transmission data of an amount which does not exceed an amount corresponding to the allocated TXOP allocation time.

However, the terminal B 202 may be designed to transmit transmission data as much as it wants to transmit regardless of the TXOP allocation time.

In such a case, the terminal A 201 need not write the TXOP allocation time in a QoS Cf-Poll+Data frame. It suffices to arbitrarily set the amount of transmission data which the transmission/reception state management unit 108 extracts from the transmission queue 106 and transfers to the frame generation/transmission processing unit 104 in step 105 or 112 in FIG. 4.

Even in this arrangement, the terminal A 201 can receive transmission data without any problem because only the length of an aggregation frame transmitted the RIFS time after a BlockAck frame transmitted from the terminal B 202 changes. As a consequence, the terminal A 201 need not calculate the TXOP allocation time.

Second Modification of First Embodiment

Figure 6:
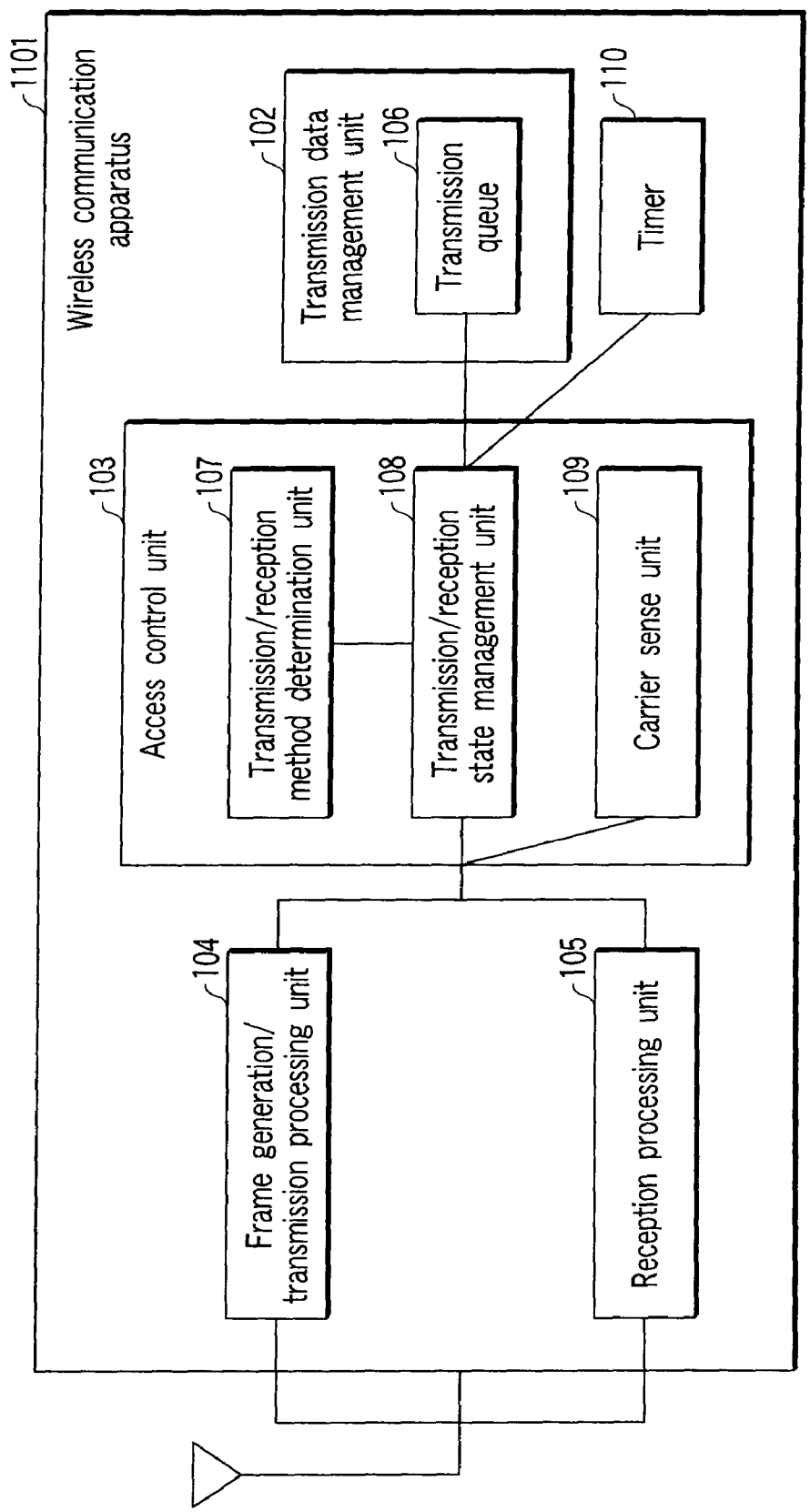
FIG. 6 is a block diagram of a wireless communication apparatus according to the second modification of the first embodiment.
Figure 7:
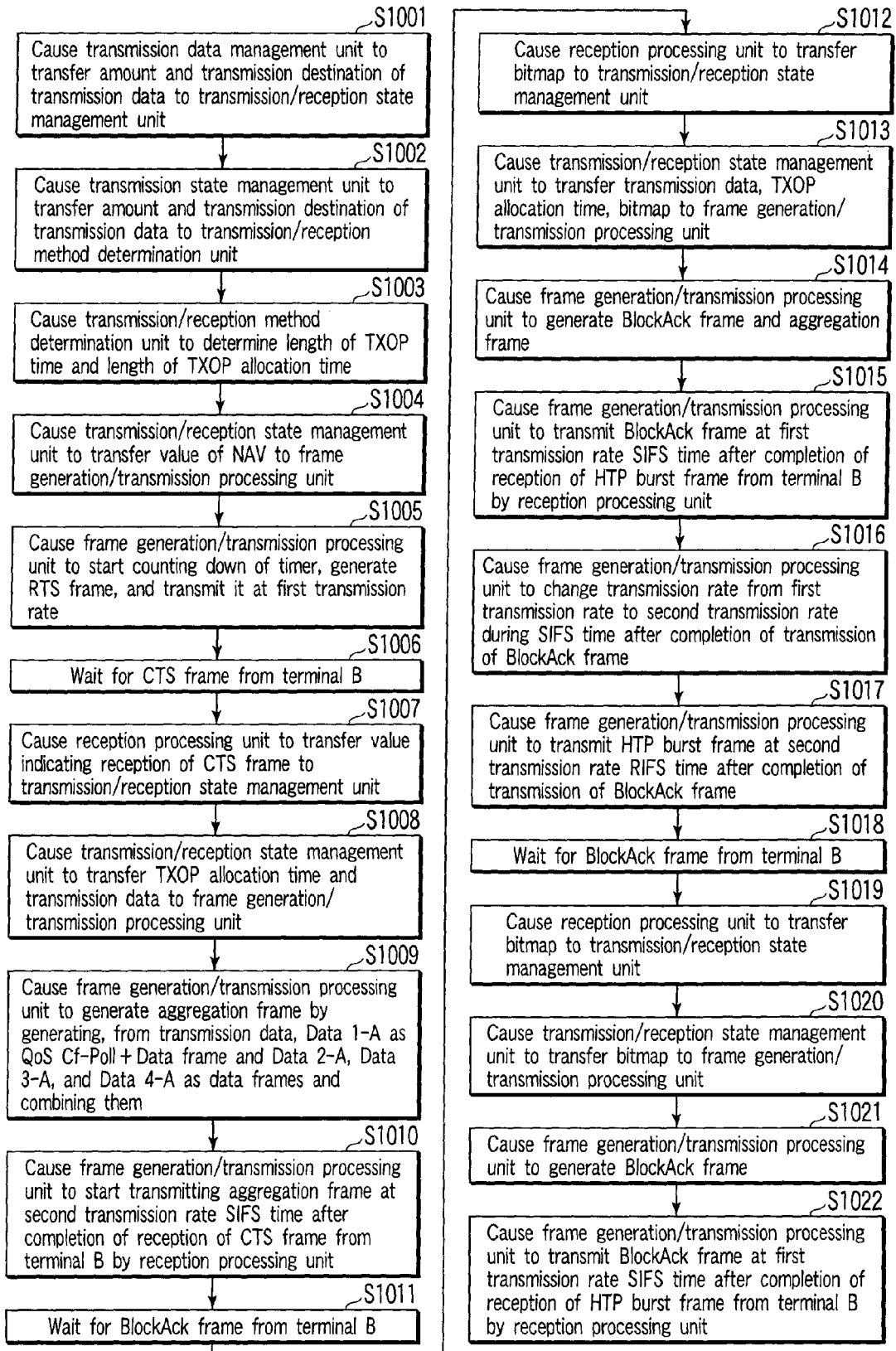
FIG. 7 is a flowchart associated with the operation of the terminal A according to the second modification of the first embodiment.
Figure 8:
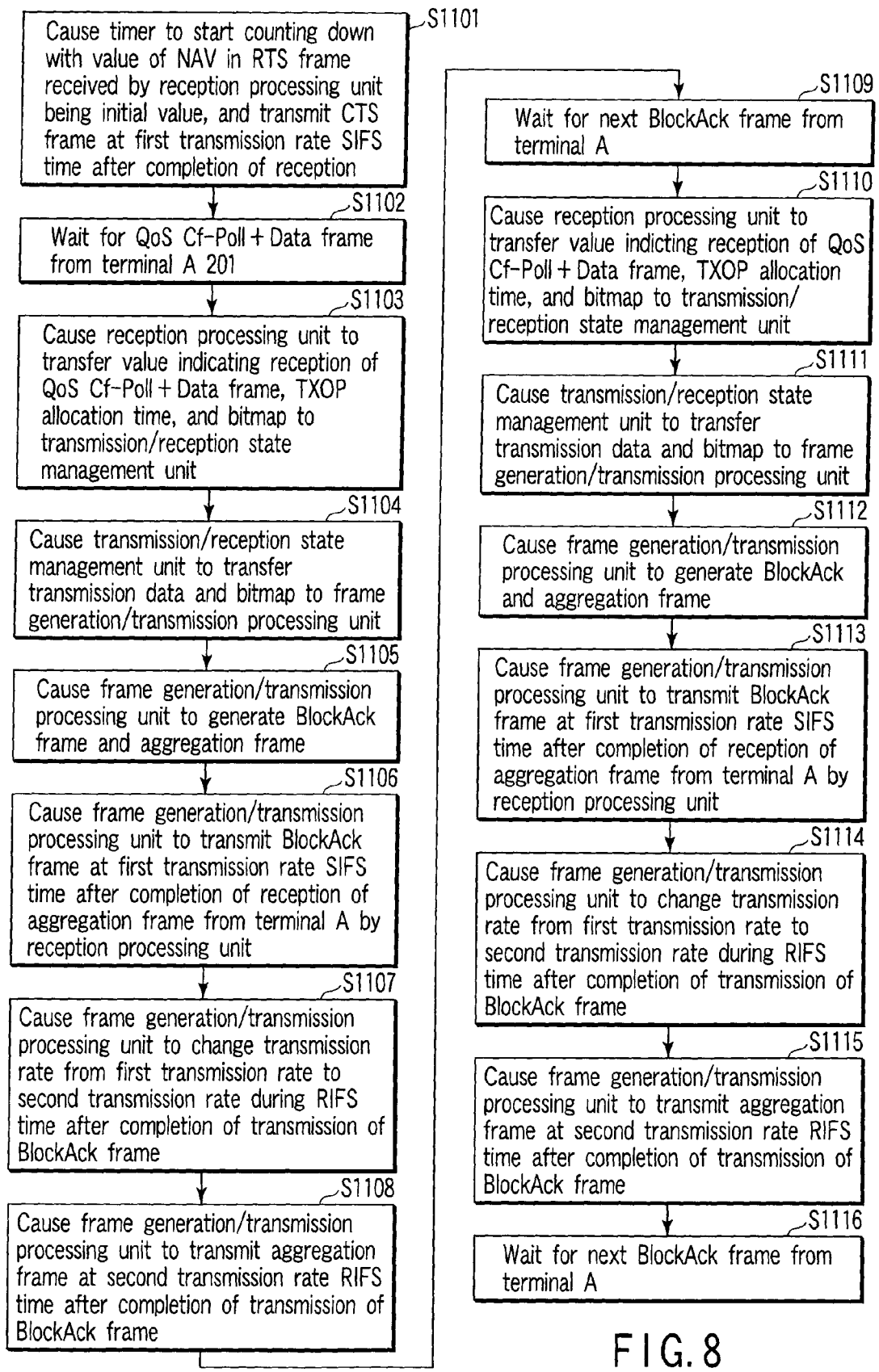
FIG. 8 is a flowchart associated with the operation of the terminal B according to the second modification of the first embodiment.

FIG. 6 is a block diagram showing an example of a wireless communication apparatus 1101 according to the second modification. FIG. 7 is a flowchart associated with the operation of a terminal A 201. FIG. 8 is a flowchart associated with the operation of a terminal B 202.

The first embodiment has exemplified the case wherein the terminal A 201 and the terminal B 202 each use, as the value of NAV to be written in a frame which the terminal is to transmit, the value obtained by subtracting the time taken for the transmission of a frame from the self terminal, the SIFS time, and the time taken for the next transmission of a BlockAck frame from the remote terminal from the value of NAV written in a control frame or data frame received from the remote terminal.

This modification will exemplify an arrangement in which the value obtained by subtracting the time taken for the transmission of a frame from the self terminal, the SIFS time, and the time taken for the next transmission of a BlockAck frame from a remote terminal from the remaining time to the end of the NAV time counted by a timer 110 is used as the value of NAV to be written in a frame which the self terminal is to transmit.

Assume that the terminal A 201 and the terminal B 202 each have the same arrangement as that of a wireless communication apparatus 1101 to be described next.

The wireless communication apparatus 1101 comprises the timer 110 in addition to the arrangement of the wireless communication apparatus 101 shown in FIG. 1. The timer 110 provides the transmission/reception state management unit 108 with the information of the remaining time to a given time.

Other arrangements are the same as those of the wireless communication apparatus 101 in FIG. 1.

(1-3-1. Transmission of RTS Frame from Terminal A)

Steps 1001 to 1004 in FIG. 7 are the same as step 1 to step 4 in FIG. 3.

The frame generation/transmission processing unit 104 generates the RTS frame 301 written in a duration field by using the length of the received TXOP allocation time as the value of NAV, and transmits the frame at the first transmission rate. When the transmission of the RTS frame 301 is started, the timer 110 starts to count down with the value of NAV being the initial value (step 1005 in FIG. 7).

Step 1006 following this operation is the same as step 6 in FIG. 3.

(1-3-2. Reception of RTS Frame and Transmission of CTS Frame by Terminal B)

The timer 110 of the terminal B 202 starts to count down with the value of NAV in the RTS frame 301 received by the reception processing unit 105 being an initial value.

The reception processing unit 105 transmits the CTS frame 303 at the first transmission rate the SIFS time after the completion of the reception of the RTS frame 301 (step 1101 in FIG. 8). The value obtained by subtracting the SIFS time and the time taken for the transmission of the CTS frame 303 from the remaining time to the end of the NAV time which is counted by the timer 110 is written as the value of NAV in the CTS frame 303.

Step 1102 following this operation is the same as step 102 in FIG. 4.

(1-3-3. Reception of CTS Frame and Transmission of Aggregation Frame by Terminal A)

When the reception processing unit 105 receives the CTS frame 303 from the terminal B 202, the terminal A 201 transfers a value indicating the reception of the CTS frame 303 to the transmission/reception state management unit 108 (step 1007 in FIG. 7).

Step 2008 following this operation is the same as step 8 in FIG. 3.

The frame generation/transmission processing unit 104 generates, from the transmission data, the Data 1-A 305 as a QoS Cf-Poll+Data frame, and the Data 2-A 306, Data 3-A 307, and Data 4-A 308 as data frames. In addition, the frame generation/transmission processing unit 104 generates the aggregation frame 304 by combining the Data 1-A 305, Data 2-A 306, Data 3-A 307, and Data 4-A 308 in the order named, with the Data 1-A 305 being the first frame, upon attaching a field for identifying each frame to its head (step 1009 in FIG. 7).

The TXOP allocation time is written in the Data 1 A 305 as a QoS Cf-Poll+Data frame. The value obtained by subtracting the SIFS time and the time taken for the transmission of the aggregation frame 304 from the remaining time to the end of the NAV time which is counted by the timer 110 is written, as the value of NAV, in each of the Data 1-A 305, Data 2-A 306, Data 3-A 307, and Data 4-A 308.

Steps 1010 and 1011 following this operation are the same as steps 10 and 11 in FIG. 3.

(1-3-4. Reception of Aggregation Frame and Transmission of HTP Burst Frame by Terminal B)

The reception processing unit 105 of the terminal B 202 which has received the aggregation frame 304 transfers, to the transmission/reception state management unit 108, a value indicating the reception of the QoS Cf-Poll+Data frame and the TXOP allocation time written in the Data 1-A 305. The reception processing unit 105 also generates a bitmap for notifying the remote terminal of acknowledgement from the reception success/failure status of each of the Data 1-B 312, Data 2-B 313, Data 3-B 314, and Data 4-B 315 transmitted from the terminal A 201, and transfers the bitmap to the transmission/reception state management unit 108 (step 1103 in FIG. 8).

The transmission/reception state management unit 108 determines from the value indicating the reception of the QoS Cf-Poll+Data frame that a terminal A 201 is performing communication by the RD scheme. A transmission/reception state management unit 108 extracts transmission data buffered in the transmission queue 106, and transfers the data to the frame generation/transmission processing unit 104, together with the TXOP allocation time and the bitmap (step 1104 in FIG. 8).

The frame generation/transmission processing unit 104 generates the BlockAck frame 310 with respect to the Data 1-A 305, Data 2-A 306, Data 3-A 307, and Data 4-A 308 transmitted from the terminal A 201 by using the bitmap. The frame generation/transmission processing unit 104 also generates the Data 1-B 312, Data 2-B 313, Data 3-B 314, and Data 4-B 315 as data frames from the transmission data. The frame generation/transmission processing unit 104 then generates the aggregation frame 311 by combining the Data 1-B 312, Data 2-B 313, Data 3-B 314, and Data 4-B 315.

At this time, the frame generation/transmission processing unit 104 writes, as the value of NAV in the BlockAck frame 310, the value obtained by subtracting the SIFS time and the time taken for the transmission of the BlockAck frame 310 from the remaining time to the end of the NAV time which is counted by the timer 110. This value of NAV indicates the length of the time from the completion of the transmission of the BlockAck frame 310 to the end of the TXOP time.

The frame generation/transmission processing unit 104 writes the value obtained by subtracting the RIFS time and the time taken for the transmission of the aggregation frame 311 from the value of NAV written in the BlockAck frame 310, as the value of NAV, in each of the Data 1-B 312, Data 2-B 313, Data 3-B 314, and Data 4-B 315 (step 1105 in FIG. 8).

Steps 1106 to 1109 following this operation are the same as steps 106 to 109 in FIG. 4.

(1-3-5. Reception of HTP Burst Frame and Transmission of HTP Burst Frame by Terminal A)

The reception processing unit 105 of the terminal A 201 which has received the HTP burst frame 351 generates a bitmap indicating acknowledgement from the reception success/failure status of each of the Data 1 B 312, Data 2-B 313, Data 3-B 314, and Data 4-B 315, and transfers the bitmap to the transmission/reception state management unit 108 (step 1012 in FIG. 7).

The transmission/reception state management unit 108 extracts transmission data buffered in the transmission queue 106, and transfers the data to the frame generation/transmission processing unit 104, together with the TXOP allocation time received from the transmission/reception method determination unit 107 and the bitmap received from the reception processing unit 105 (step 1013 in FIG. 7).

The frame generation/transmission processing unit 104 generates the BlockAck frame 317 with respect to the Data 1-B 312, Data 2-B 313, Data 3-B 314, and Data 4-B 315 transmitted from the terminal B 202 by using the received bitmap. The frame generation/transmission processing unit 104 also generates, from the transmission data, the aggregation frame 318 including the Data 5-A 319 as a QoS Cf-Poll+ Data frame, and the Data 5-A 319, Data 6-A 320, Data 7-A 321, and Data 8-A 322 as data frames.

In this case, the frame generation/transmission processing unit 104 writes, as the value of NAV in the BlockAck frame 317, the value obtained by subtracting the SIFS time and the time taken for the transmission of the BlockAck frame 317 from the remaining time to the end of the TXOP time which is counted by the timer 110. The frame generation/transmission processing unit 104 writes the TXOP allocation time in the Data 1-A 305 as a QoS Cf-Poll+Data frame. The frame generation/transmission processing unit 104 writes the value obtained by subtracting the RIFS time and the time taken for the transmission of the aggregation frame 318 from the value of NAV written in the BlockAck frame 317, as the value of NAV, in each of the Data 5-A 319, Data 6-A 320, Data 7-A 321, and Data 8-A 322 (step 1014 in FIG. 7).

Steps 1015 to 1018 following this operation are the same as steps 15 to 18 in FIG. 3.

(1-3-6. Reception of HTP Burst Frame and Transmission of HTP Burst Frame by Terminal B)

The reception processing unit 105 of a terminal B 202 which has received the two PHY frames with the RIFS time set therebetween, i.e., the HTP burst frame 352, generates a bitmap indicating acknowledgement from the reception success/failure status of each of the Data 5-A 319, Data 6-A 320, Data 7-A 321, and Data 8-A 322. The reception processing unit 105 transfers a value indicating the reception of the QoS Cf-Poll+Data frame and the generated bitmap to the transmission/reception state management unit 108 (step 1110 in FIG. 8).

The transmission/reception state management unit 108 extracts transmission data buffered in the transmission queue 106, and transfers the data to the frame generation/transmission processing unit 104, together with the bitmap received from the reception processing unit 105 (step 1111 in FIG. 8).

The frame generation/transmission processing unit 104 generates the BlockAck frame 324 with respect to the Data 5-A 319, Data 6-A 320, Data 7-A 321, and Data 8-A 322 transmitted from the terminal A 201 by using the bitmap. The frame generation/transmission processing unit 104 generates the Data 5-B 326, Data 6 B 327, Data 7-B 328, and Data 8-B 329 as data frames from the transmission data. The frame generation/transmission processing unit 104 then generates the aggregation frame 325 by combining the Data 5-B 326, Data 6-B 327, Data 7-B 328, and Data 8-B 329.

At this time, the frame generation/transmission processing unit 104 writes, as the value of NAV in the BlockAck frame 324, the value obtained by subtracting the SIFS time and the time taken for the transmission of the BlockAck frame 324 from the remaining time to the end of the NAV time which is counted by the timer 110.

The frame generation/transmission processing unit 104 also writes the value obtained by subtracting the RIFS time and the time taken for the transmission of the aggregation frame 325 from the value of NAV written in the BlockAck frame 324, as the value of NAV, in each of the Data 5-B 326, Data 6-B 327, Data 7-B 328, and Data 8-B 329 (step 1112 in FIG. 8).

Steps 1113 to 1116 following this operation are the same as steps 113 to 116 in FIG. 4.

(1-3-7. Reception of HTP Burst Frame and Transmission of BlockAck Frame by Terminal A)

The reception processing unit 105 of the terminal A 201 which has received the two PHY frames with the RIFS time set therebetween, i.e., the HTP burst frame 353, generates a bitmap indicating acknowledgement from the reception success/failure status of each of the Data 1-B 312, Data 2-B 313, Data 3-B 314, and Data 4-B 315, and transfers the bitmap to the transmission/reception state management unit 108 (step 1019 in FIG. 7).

The transmission/reception state management unit 108 transfers the bitmap received from the reception processing unit 105 to the frame generation/transmission processing unit 104 (step 1019 in FIG. 7).

The frame generation/transmission processing unit 104 generates the BlockAck frame 331 with respect to the Data 5-B 326, Data 6-B 327, Data 7-B 328, and Data 8-B 329 transmitted from the terminal B 202 by using the received bitmap.

The frame generation/transmission processing unit 104 writes, as the value of NAV in the BlockAck frame 331, the value obtained by subtracting the SIFS time and the time taken for the transmission of the BlockAck frame 331 from the value of NAV received from the reception processing unit 105.

The frame generation/transmission processing unit 104 then writes, as the value of NAV in the BlockAck frame 331, the value obtained by subtracting the SIFS time and the time taken for the transmission of the BlockAck frame 331 from the remaining time to the end of the NAV time which is counted by the timer 110 (step 1020 in FIG. 7).

Steps 1021 and 1022 following this operation are the same as steps 21 and 22 in FIG. 3.

(1-3-8. End of TXOP Allocation Time)

When the timer 110 of the terminal B 202 finishes counting down, the band reservation is released, and the bi-directional communication between the terminal A 201 and the terminal B 202 is terminated. When this bi-directional communication is to be further performed, the above processing is performed again from the sequence of "1 1-1" after the lapse of the AIFS+Backoff time since the release of the band reservation.

As described above, the value obtained by subtracting the time taken for the transmission of a frame from the self terminal from the remaining time to the end of the NAV time which is counted by the timer 110 is set as the value of NAV to be written in a frame which the self terminal transmits. This allows the self terminal to reliably recognize the end of the NAV time even in the presence of an error in a control frame or data frame received from the remote terminal.

Third Modification of First Embodiment

Figure 9:
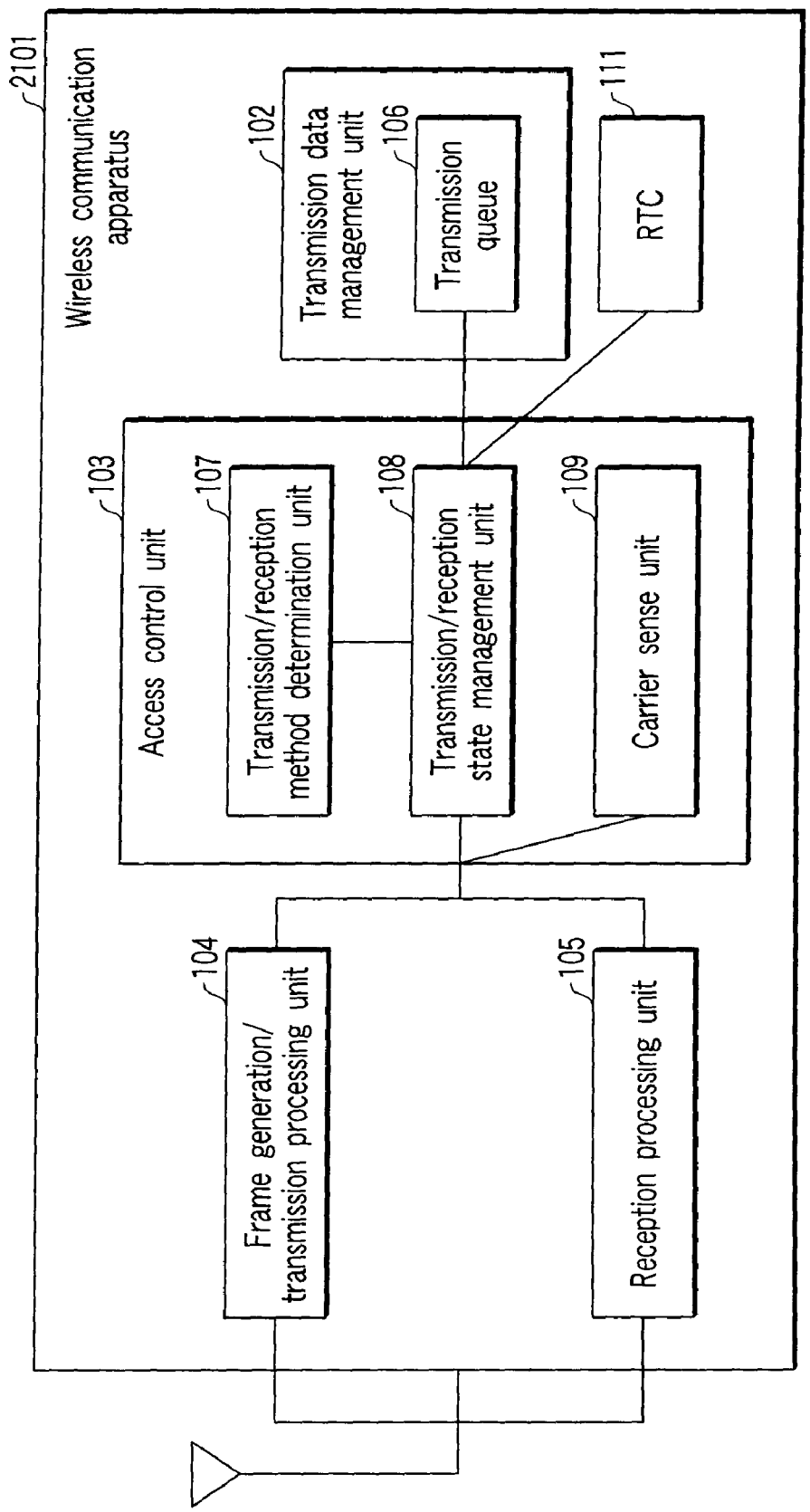
FIG. 9 is a block diagram of a wireless communication apparatus according to the third modification of the first embodiment.
Figure 10:
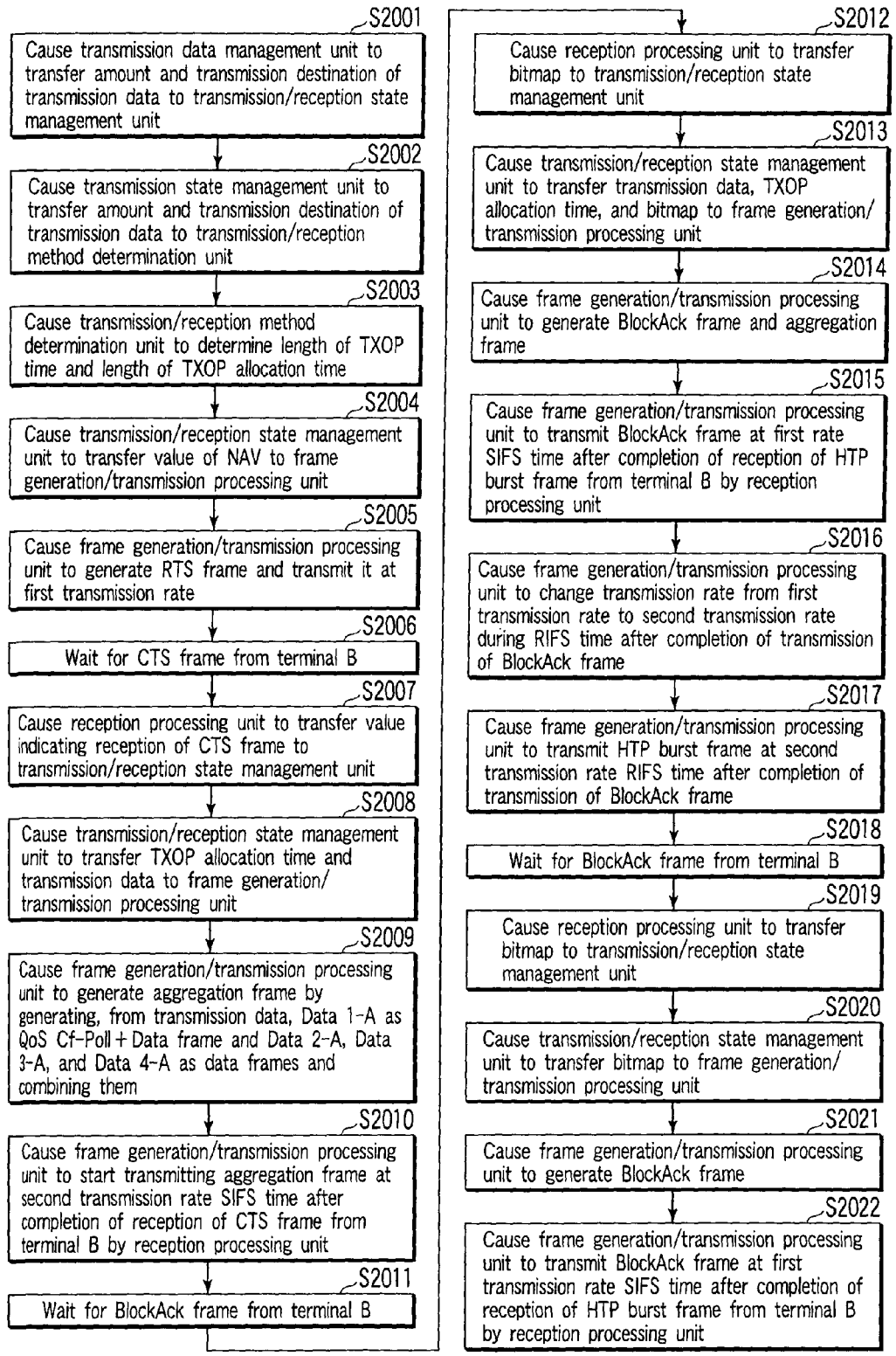
FIG. 10 is a flowchart associated with the operation of the terminal A according to the third modification of the first embodiment.
Figure 11:
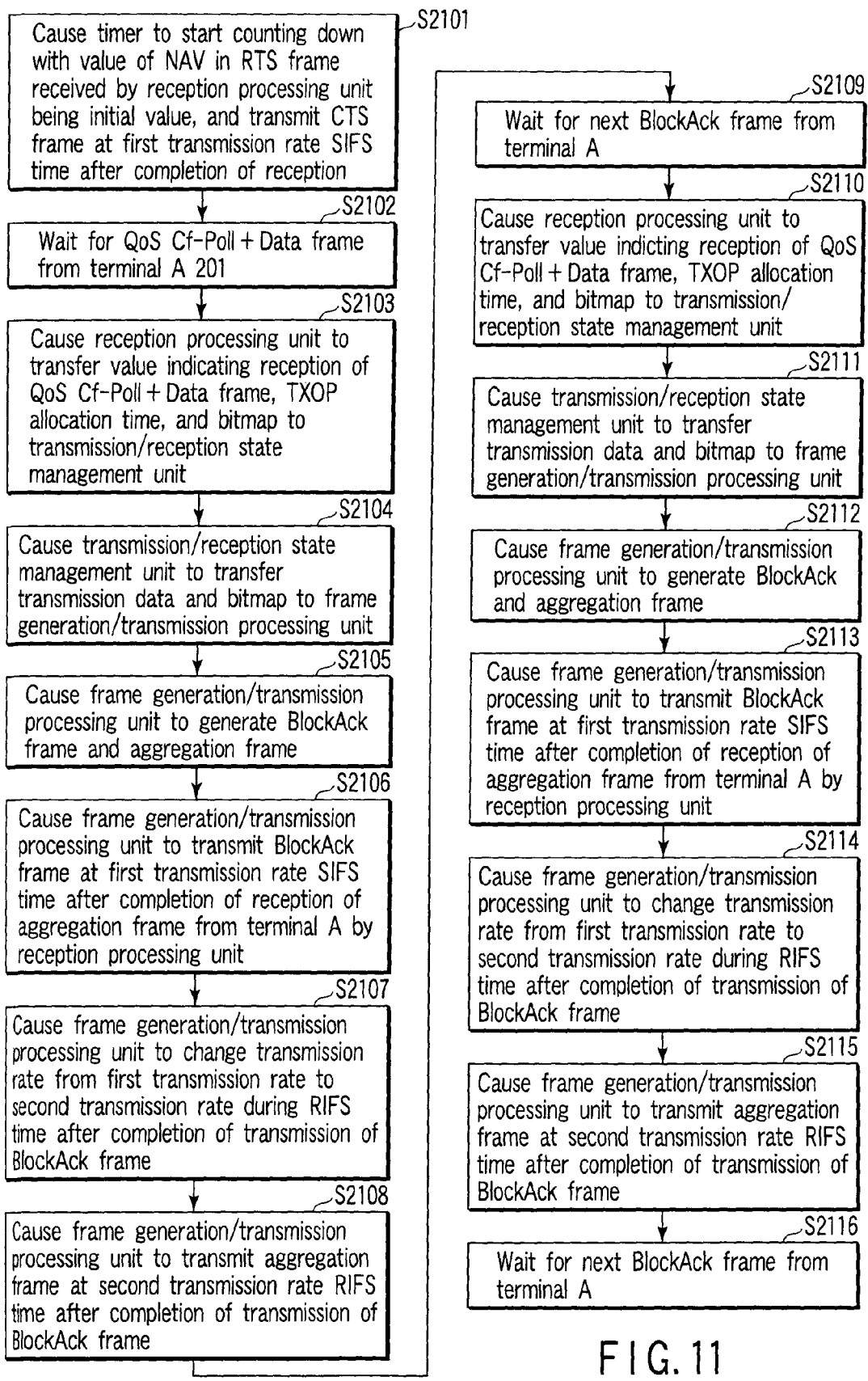
FIG. 11 is a flowchart associated with the operation of the terminal B according to the third modification of the first embodiment.

FIG. 9 is a block diagram associated with an example of a wireless communication apparatus 2101 according to the third modification. FIG. 10 is a flowchart associated with the operation of the terminal A 201. FIG. 11 is a flowchart associated with the operation of the terminal B 202.

The first embodiment has exemplified the case wherein the terminal A 201 and the terminal B 202 each use, as the value of NAV to be written in a frame which the self terminal is to transmit, the value obtained by subtracting the time taken for the transmission of a frame from the self terminal, the SIFS time, and the time taken for the next transmission of a Block-Ack frame from the remote terminal from the value of NAV written in a control frame or data frame received from the remote terminal.

This modification will exemplify an arrangement in which the value of NAV is calculated from the time supplied by an RTC (Real Time Clock) 111. More specifically, in this arrangement to be described below, the end time of the NAV time is recorded in advance by using the time information obtained from the RTC 111, and the value obtained by subtracting, from the recorded time, the transmission start time of a frame from the self terminal, the SIFS time, and the time taken for the next transmission of a BlockAck frame transmitted from the remote terminal is set as the value of NAV to be written in the frame to be transmitted from the self terminal.

Bi-directional communication will be described below on the assumption that all the transmission data from the terminal A 201 as an initiator are addressed to the terminal B 202 as a responder, and all the transmission data from the terminal B 202 are addressed to the terminal A 201.

Assume that the terminal A 201 and the terminal B 202 each have the same arrangement as that of the wireless communication apparatus 2101 to be described next.

The wireless communication apparatus 2101 comprises the RTC 111 in addition to the arrangement of the wireless communication apparatus 101 shown in FIG. 1. The RTC 111 provides the transmission/reception state management unit 108 with time information.

Other arrangements are the same as those of the wireless communication apparatus 101 in FIG. 1.

(1-4-1. Transmission of RTS Frame from Terminal A)

Steps 2001 to 2006 in FIG. 10 are the same as steps 1 to 3 in FIG. 3.

(1-4-2. Reception of RTS Frame and Transmission of CTS Frame by Terminal B)

The transmission/reception state management unit 108 of the terminal B 202 stores the value of NAV in the RTS frame 301 received by the reception processing unit 105 as the end time of the NAV time. The reception processing unit 105 transmits the CTS frame 303 at the first transmission rate the SIFS time after the completion of the reception of the RTS frame 301 (step 2101 in FIG. 11). The value obtained by subtracting the estimated completion time of the transmission of the CTS frame 303 from the end time of the NAV time is written as the value of NAV in the CTS frame 303. The estimated completion time of the transmission of the CTS frame 303 is calculated from the time obtained from the RTC 111 and the time taken for the transmission of the CTS frame 303.

Step 2102 following this operation is the same as step 102 in FIG. 4.

(1-4-3. Reception of CTS Frame and Transmission of Aggregation Frame by Terminal A)

When the reception processing unit 105 receives the CTS frame 303 from the terminal B 202, the terminal A 201 transfers a value indicating the reception of the CTS frame 303 to the transmission/reception state management unit 108 (step 2007 in FIG. 10).

Step 2008 following this operation is the same as step 8 in FIG. 3.

The frame generation/transmission processing unit 104 generates, from the transmission data, the Data 1-A 305 as a QoS Cf-Poll+Data frame and the Data 2-A 306, Data 3-A 307, and Data 4-A 308 as data frames. In addition, the frame generation/transmission processing unit 104 generates the aggregation frame 304 by combining the Data 1-A 305, Data 2-A 306, Data 3-A 307, and Data 4-A 308 in the order named, with the Data 1-A 305 being the first frame, upon attaching a field for identifying each frame to its head (step 2009 in FIG. 10). The TXOP allocation time is written in the Data 1-A 305 as a QoS Cf-Poll+Data frame. The value obtained by subtracting the transmission start time of the aggregation frame 304 and the time taken for the transmission of the aggregation frame 304 from the end time of the NAV time is written as the value of NAV in each of the Data 1-A 305, Data 2-A 306, Data 3-A 307, and Data 4-A 308. The transmission start time of the aggregation frame 304 is determined to be the SIFS time after the reception completion time of the CTS frame 303. Therefore, the transmission start time of the aggregation frame 304 can be calculated from the time obtained from the RTC 111.

Steps 2010 and 2011 following this operation are the same as steps 10 and 11 in FIG. 3.

(1-4-4. Reception of Aggregation Frame and Transmission of HTP Burst Frame by Terminal B)

The reception processing unit 105 of the terminal B 202 which has received the aggregation frame 304 transfers a value indicating the reception of the QoS Cf-Poll+Data frame and the TXOP allocation time written in the Data 1-A 305 to the transmission/reception state management unit 108. The reception processing unit 105 also generates a bitmap indicating acknowledgement from the reception success/failure status of each of the Data 1-B 312, Data 2-B 313, Data 3-B 314, and Data 4-B 315 transmitted from the terminal A 201, and transfers the bitmap to the transmission/reception state management unit 108 (step 2103 in FIG. 11).

The transmission/reception state management unit 108 determines from the value indicating the reception of the QoS Cf-Poll+Data frame that the terminal A 201 is performing communication by the RD scheme. The transmission/reception state management unit 108 extracts transmission data buffered in the transmission queue 106, and transfers the data to the frame generation/transmission processing unit 104, together with the TXOP allocation time and the bitmap (step 2104 in FIG. 11).

The frame generation/transmission processing unit 104 generates the BlockAck frame 310 with respect to the Data 1-A 305, Data 2-A 306, Data 3-A 307, and Data 4-A 308 transmitted from the terminal A 201 by using the bitmap. The frame generation/transmission processing unit 104 generates, from the transmission data, the Data 1-B 312, Data 2-B 313, Data 3-B 314, and Data 4-B 315 as data frames. The frame generation/transmission processing unit 104 generates the aggregation frame 311 by combining the Data 1-B 312, Data 2-B 313, Data 3-B 314, and Data 4-B 315.

The frame generation/transmission processing unit 104 writes, as the value of NAV in the BlockAck frame 310, the value obtained by subtracting the transmission start time of the BlockAck frame 310 and the time taken for the transmission of the BlockAck frame 310 from the end time of the NAV time.

The transmission start time of the BlockAck frame 310 is determined to be the SIFS time after the reception completion time of the aggregation frame 304. Therefore, the transmission start time of the BlockAck frame 310 can be calculated from the time obtained from the RTC 111.

The frame generation/transmission processing unit 104 writes the value obtained by subtracting the transmission start time of the aggregation frame 311 and the time taken for the transmission of the aggregation frame 311 from the end time of the NAV time, as the value of NAV, in each of the Data 1-B 312, Data 2-B 313, Data 3-B 314, and Data 4-B 315.

The transmission start time of the aggregation frame 311 is determined to be the SIFS time after the reception completion time of the aggregation frame 304. Therefore, the transmission start time of the aggregation frame 311 can be calculated from the time obtained from the RTC 111 (step 2105 in FIG. 11).

Steps 2106 to 2109 following this operation are the same as steps 106 to 109 in FIG. 4.

(1-4-5. Reception of HTP Burst Frame and Transmission of HTP Burst Frame by Terminal A)

The reception processing unit 105 of the terminal A 201 which has received an HTP burst frame generates a bitmap indicating acknowledgement from the reception success/failure status of each of the Data 1-B 312, Data 2-B 313, Data 3-B 314, and Data 4-B 315, and transfers the bitmap to the transmission/reception state management unit 108 (step 2012 in FIG. 10).

The transmission/reception state management unit 108 extracts transmission data buffered in the transmission queue 106, and transfers the data to the frame generation/transmission processing unit 104, together with the TXOP allocation time received from the transmission/reception method determination unit 107 and the bitmap received from the reception processing unit 105 (step 2013 in FIG. 10).

The frame generation/transmission processing unit 104 generates the BlockAck frame 317 with respect to the Data 1-B 312, Data 2-B 313, Data 3-B 314, and Data 4-B 315 transmitted from the terminal B 202 by using the received bitmap. The frame generation/transmission processing unit 104 generates, from the transmission data, the aggregation frame 318 including the Data 5-A 319 as a QoS Cf-Poll+Data frame and the Data 5-A 319, Data 6-A 320, Data 7-A 321, and Data 8-A 322 as data frames.

At this time, the frame generation/transmission processing unit 104 writes, as the value of NAV in the BlockAck frame 317, the value obtained by subtracting the transmission start time of the BlockAck frame 317 and the time taken for the transmission of the BlockAck frame 317 from the end time of the NAV time. The frame generation/transmission processing unit 104 writes the TXOP allocation time in the Data 1-A 305 as a QoS Cf Poll+Data frame. The transmission start time of the BlockAck frame 317 is determined to be the SIFS time after the reception completion time of the aggregation frame 311. Therefore, the transmission start time of the BlockAck frame 317 can be calculated from the time obtained from the RTC 111.

The frame generation/transmission processing unit 104 writes the value obtained by subtracting the transmission start time of the aggregation frame 318 and the time taken for the transmission of the aggregation frame 318 from the end time of the NAV time, as the value of NAV, in each of the Data 5-A 319, Data 6-A 320, Data 7-A 321, and Data 8-A 322. The transmission start time of the aggregation frame 318 is determined to be the SIFS time after the reception completion time of the aggregation frame 311. Therefore, the transmission start time of the aggregation frame 318 can be calculated from the time obtained from the RTC 111 (step 2014 in FIG. 10).

Steps 2015 to 2018 following this operation are the same as steps 15 to 18 in FIG. 3.

(1-4-6. Reception of HTP Burst Frame and Transmission of HTP Burst Frame by Terminal B)

The reception processing unit 105 of the terminal B 202 which has received an HTP burst frame generates a bitmap indicating acknowledgement from the reception success/failure status of each of the Data 5-A 319, Data 6-A 320, Data 7-A 321, and Data 8-A 322. The reception processing unit 105 transfers, to the transmission/reception state management unit 108, a value indicating the reception of the QoS Cf-Poll+Data frame, the TXOP allocation time written in the Data 5-A 319, and the generated bitmap (step 2110 in FIG. 11).

The transmission/reception state management unit 108 extracts transmission data buffered in the transmission queue 106, and transfers the data to the frame generation/transmission processing unit 104, together with the bitmap received from the reception processing unit 105 (step 2111 in FIG. 11).

The frame generation/transmission processing unit 104 generates the BlockAck frame 324 with respect to the Data 5-A 319, Data 6-A 320, Data 7-A 321, and Data 8-A 322 transmitted from the terminal A 201 by using the bitmap. The frame generation/transmission processing unit 104 also generates, from the transmission data, the Data 5-B 326, Data 6-B 327, Data 7-B 328, and Data 8-B 329 as data frames. The frame generation/transmission processing unit 104 then generates the aggregation frame 325 by combining the Data 5-B 326, Data 6-B 327, Data 7-B 328, and Data 8-B 329.

At this time, the frame generation/transmission processing unit 104 writes, as the value of NAV in the BlockAck frame 324, the value obtained by subtracting the transmission start time of the BlockAck frame 324 and the time taken for the transmission of the BlockAck frame 324 from the end time of the NAV time.

The transmission start time of the BlockAck frame 324 is determined to be the SIFS time after the reception completion time of the aggregation frame 318. Therefore, the transmission start time of the BlockAck frame 324 can be calculated from the time obtained from the RTC 111.

The frame generation/transmission processing unit 104 writes the value obtained by subtracting the transmission start time of the aggregation frame 325 and the time taken for the transmission of the aggregation frame 325 from the end time of the NAV time, as the value of NAV, in each of the Data 5-B 326, Data 6-B 327, Data 7-B 328, and Data 8-B 329. The transmission start time of the aggregation frame 325 is determined to be the SIFS time after the reception completion time of the aggregation frame 318. Therefore, the transmission start time of the aggregation frame 325 can be calculated from the time obtained from the RTC 111 (step 2112 in FIG. 11).

Steps 2113 to 2116 following this operation are the same as steps 113 to 116 in FIG. 4.

(1-4-7. Reception of HTP Burst Frame and Transmission of BlockAck Frame by Terminal A)

The reception processing unit 105 of the terminal A 201 which has received an HTP burst frame generates a bitmap indicating acknowledgement from the reception success/failure status of each of the Data 1-B 312, Data 2-B 313, Data 3-B 314, and Data 4-B 315, and transfers the bitmap to the transmission/reception state management unit 108 (step 2019 in FIG. 10).

The transmission/reception state management unit 108 transfers the bitmap received from the reception processing unit 105 to the frame generation/transmission processing unit 104 (step 2020 in FIG. 10).

The frame generation/transmission processing unit 104 generates the BlockAck frame 331 with respect to the Data 5-B 326, Data 6-B 327, Data 7-B 328, and Data 8-B 329 transmitted from the terminal B 202 by using the received bitmap. The frame generation/transmission processing unit 104 writes, as the value of NAV in the BlockAck frame 331, the value obtained by subtracting the transmission start time of the BlockAck frame 331 and the time taken for the transmission of the BlockAck frame 331 from the end time of the NAV time. The transmission start time of the BlockAck frame 331 is determined to be the SIFS time after the reception completion time of the aggregation frame 325. Therefore, the transmission start time of the BlockAck frame 331 can be calculated from the time obtained from the RTC 111 (step 2021 in FIG. 10).

Step 2021 following this operation is the same as step 22 in FIG. 3.

(1-4-8. End of TXOP Allocation Time)

When the NAV time expires, the band reservation is released, and the bi-directional communication between the terminal A 201 and the terminal B 202 is terminated. When this bi-directional communication is to be further performed, the above processing is performed again from the sequence of "1-1" after the lapse of the AIFS+Backoff time since the release of the band reservation.

As described above, the end time of the NAV time is recorded in advance by using the time information obtained from the RTC 111, and the value obtained by subtracting the transmission start time of a frame from the self terminal and the time taken for the transmission of the frame from the recorded time is set as the value of NAV to be written in the frame to be transmitted from the self terminal. This allows the terminal to reliably recognize the end of the NAV time even in the presence of an error in a control frame or data frame received from the remote terminal.

Fourth Modification of First Embodiment

Figure 12:
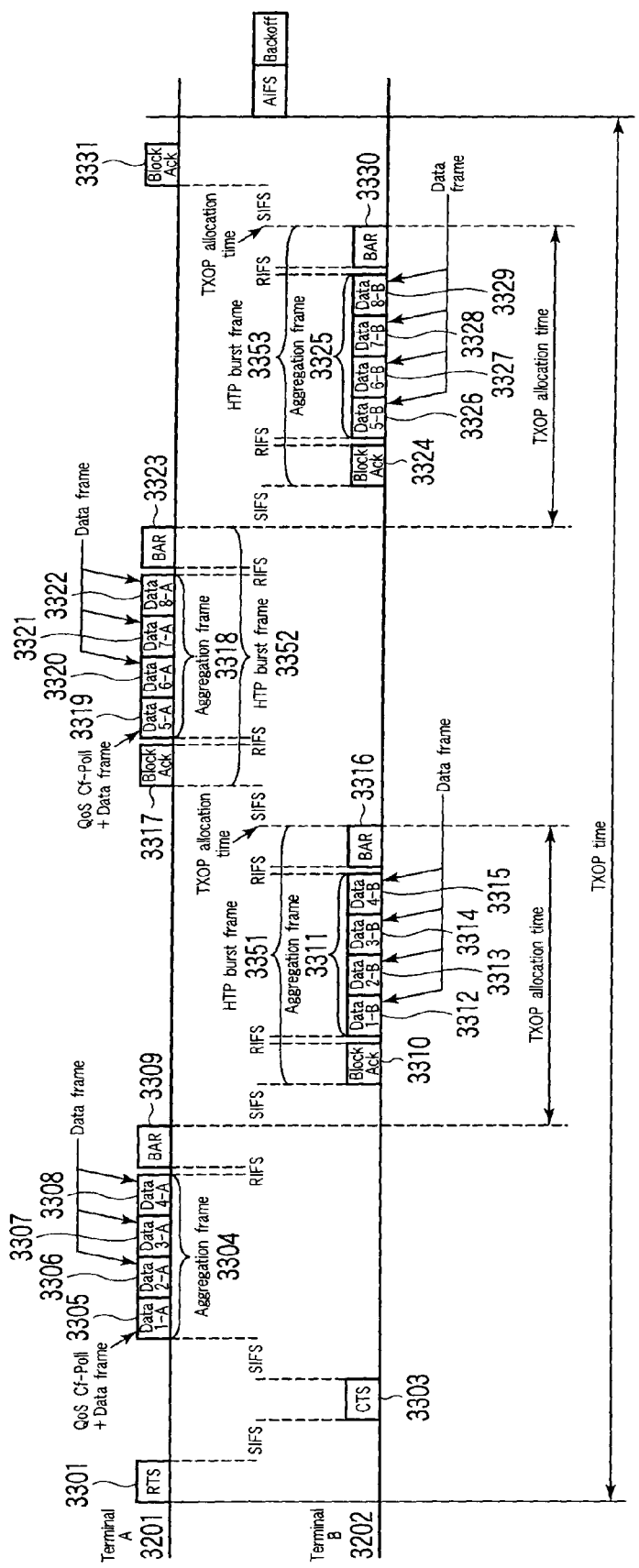
FIG. 12 is a timing chart according to the fourth modification of the first embodiment.

FIG. 12 is a timing chart in a case wherein a BlockAckRequest having a BAR (BlockAckRequest) frame attached to the end of an aggregation frame of data frames is used as a BlockAck scheme unlike in the first embodiment.

In this modification, a BAR frame 3309 is transmitted the RIFS time after the transmission of an aggregation frame 3304 in the first embodiment. During this period, the frame generation/transmission processing unit 104 changes the transmission rate from the second transmission rate, at which the aggregation frame 3304 has been transmitted, to the first transmission rate. The frame generation/transmission processing unit 104 transmits the BAR frame 3309 at the first transmission rate.

The frame generation/transmission processing unit 104 transmits each of BAR frames 3316, 3323, and 3330 at the first transmission rate the RIFS time after the transmission of a corresponding one of aggregation frames 3311, 3318, and 3325 at the second transmission rate.

Note that an HTP burst frame in this modification is comprised of three PHY frames with the RIFS times set therebetween. That is, in this modification, an HTP burst frame 3352 transmitted from a terminal A 3201 has the BAR frame 3323 behind the HTP burst frame 352 shown in FIG. 2 with the RIFS time set therebetween. An HTP burst frame 3351 transmitted from a terminal B 3202 has the BAR frame 3316 behind the HTP burst frame 351 shown in FIG. 2 with the RIFS time set therebetween.

Assume that if the terminal B 3202 is designed to execute the setup of the RD scheme by association or management frame exchange, the terminal knows that the terminal A 3201 will transmit three PHY frames with the RIFS times set therebetween after the first aggregation frame 3304.

Alternatively, when the terminal A 3201 is to operate as a base station, if the RD scheme is to be used, information indicating that the terminal A 3201 will transmit three PHY frames with the RIFS times set therebetween after the first aggregation frame 3304 may be written in a beacon frame transmitted from the terminal A 3201.

In this case, the reception processing unit 105 of the terminal A 3201 waits for three PHY frames with the RIFS times set between the respective PHY frames after step 11 in FIG. 3. In addition, the reception processing unit 105 of the terminal A 3201 waits for three PHY frames with the RIFS times set between the respective PHY frames after step 103 in FIG. 4. As described above, control frames including BAR frames are transmitted at a low transmission rate, and data frames are transmitted at a high transmission rate. Transmission at a low transmission rate can suppress the occurrence of transmission errors due to noise and the like. Transmission at a high transmission rate makes it possible to perform high-speed transmission. This makes it possible to satisfy both the requirement to suppress responders from issuing retransmission requests due to failures of reception of control frames including BAR frames and the requirement to realize high-speed transmission of data frames.

Second Embodiment

Figure 13:
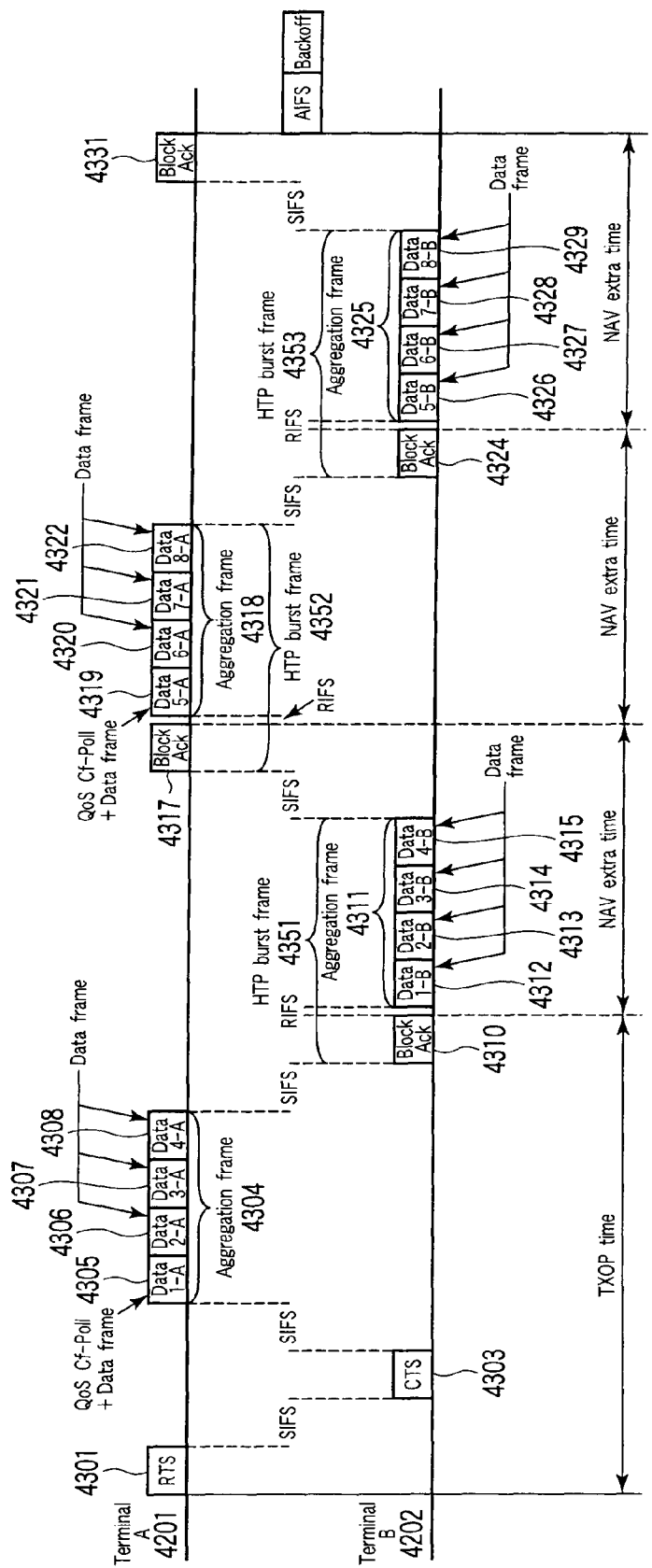
FIG. 13 is a timing chart according to the second embodiment.

FIG. 13 is a timing chart in the second embodiment. Note that a terminal A 4201 operates in accordance with the flowchart associated with the operation of the terminal A 201 in the first embodiment shown in FIG. 3, and a terminal B 4202 operates in accordance with the flowchart associated with the operation of the terminal B 202 in the first embodiment shown in FIG. 4.

The first embodiment has exemplified the case wherein the length of the time from the completion of the transmission of each of the RTS frame 301 transmitted from the terminal A 201 and the CTS frame 303 transmitted from the terminal B 202 to the end of the TXOP allocation period in the RD scheme which is started by the terminal A 201 is written as the value of NAV in each frame.

In this embodiment, the value of NAV to be written in an RTS frame from a sender is the value of the time from the first aggregation frame transmitted by the sender to the completion of the transmission of a BlockAck frame returned by a receiver in response to the aggregation frame. An arrangement will be described below, in which the self terminal transmits a BlockAck frame and then transmits an aggregation frame of data frames the RIFS time after the BlockAck frame, and an NAV time 4361 is prolonged by the value of NAV written in a BlockAck frame every time the BlockAck frame is received with respect to the aggregation frame.

(2-1-1. Transmission of RTS Frame from Terminal A)

Steps 1 and 2 in FIG. 3 remain unchanged.

The length of the NAV time 4361 determined in step 3 is, unlike the first embodiment, the time from the start of the transmission of an RTS frame 4301 to the completion of the reception of a BlockAck frame 4310 transmitted by the terminal B 4202.

Steps 4 to 6 remain unchanged.

(2-1-2. Reception of RTS Frame and Transmission of CTS Frame by Terminal B)

Steps 4101 and 4102 in FIG. 4 remain unchanged.

(2-1-3. Reception of CTS Frame and Transmission of Aggregation Frame by Terminal A)

Steps 7 to 11 in FIG. 3 remain unchanged.

(2-1-4. Reception of Aggregation Frame and Transmission of HTP Burst Frame by Terminal B)

Steps 103 and 104 in FIG. 4 remain unchanged.

In step 105, a frame generation/transmission processing unit 104 writes, as the value of NAV in the BlockAck frame 4310, the value obtained by adding the RIFS time, the time taken for the transmission of an aggregation frame 4311, the SIFS time, and the time taken for the next transmission of a BlockAck frame 4317 from the terminal A 4201. This value of NAV indicates the length of the time from the completion of the transmission of the BlockAck frame 4310 to the completion of the next transmission of the BlockAck frame 4317 from the terminal A 4201.

Steps 106 to 109 remain unchanged.

When the reception of the BlockAck frame 4310 is complete, a terminal C 203 inhibits itself from performing communication by using the band used for the bi-directional communication between the terminal A 4201 and the terminal B 4202 for only the time indicated by the value of NAV written in the BlockAck frame 4310.

Subsequently, the length of the time from the end time of a band reservation defined by the value of NAV in the RTS frame 4301 to the end time of a band reservation defined by the value of NAV written in the BlockAck frame 4310 is set as an NAV extra time 4362.

(2-1-5. Reception of HTP Burst Frame and Transmission of HTP Burst Frame by Terminal A)

Steps 12 and 13 in FIG. 3 remain unchanged.

In step 14, the frame generation/transmission processing unit 104 writes, as the value of NAV in the BlockAck frame 4317, the value obtained by adding the RIFS time, the time taken for the transmission of an aggregation frame 4318, the SIFS time, and the time taken for the next transmission of a BlockAck frame 4324 from the terminal B 4202. This value of NAV indicates the length of the time from the completion of the transmission of the BlockAck frame 4317 to the completion of the next transmission of the BlockAck frame 4324 from the terminal B 4202.

Steps 15 to 18 remain unchanged.

In this case, when the reception of the BlockAck frame 4317 is complete, the terminal C 203 inhibits itself from performing communication by using the band used for the bi-directional communication between the terminal A 4201 and the terminal B 4202 for only the time indicated by the value of NAV written in the BlockAck frame 4317.

Subsequently, the length of the time from the end time of a band reservation defined by the value of NAV in the BlockAck frame 4310 to the end time of a band reservation defined by the value of NAV written in the BlockAck frame 4317 is set as an NAV extra time 4363.

(2-1-6. Reception of HTP Burst Frame and Transmission of HTP Burst Frame by Terminal B)

Steps 110 and 111 remain unchanged.

In step 112, the frame generation/transmission processing unit 104 writes, as the value of NAV in the BlockAck frame 4324, the value obtained by adding the RIFS time, the time taken for the transmission of the aggregation frame 325, the SIFS time, and the time taken for the next transmission of the BlockAck frame 4331 from the terminal A 4201. This value of NAV indicates the length of the time from the completion of the transmission of the BlockAck frame 4324 to the completion of the next transmission of a BlockAck frame 4331 from the terminal A 4201.

Steps 113 to 116 remain unchanged.

When the reception of the BlockAck frame 4324 is complete, the terminal C 203 inhibits itself from performing communication by using the band used for the bi-directional communication between the terminal A 4201 and the terminal B 4202 for only the time indicated by the value of NAV written in the BlockAck frame 4324.

Subsequently, the length of the time from the end time of a band reservation defined by the value of NAV in the BlockAck frame 4317 to the end time of a band reservation defined by the value of NAV written in the BlockAck frame 4324 is set as an NAV extra time 4364.

(2-1-7. Reception of HTP Burst Frame and Transmission of BlockAck Frame by Terminal A)

Steps 19 and 20 in FIG. 3 remain unchanged.

In step 21, the frame generation/transmission processing unit 104 writes 0 as the value of NAV. This value of NAV indicates the release of the band reservation, i.e., the end of the NAV time 4361. Step 22 remains unchanged.

As described above, in this embodiment, the initially set NAV time can be prolonged by the NAV extra time at a time.

Note that in this embodiment, the value of NAV needs to be shorter than the predetermined maximum limit (TXOP limit) of the NAV time.

When the value of NAV of only a terminal A 4201 is to be monitored so as not to exceed the TXOP limit, for example, the following operation is performed. A TXOP allocation limit time is written in a QoS control field of a Data 1-A 4319 as a QoS Cf-Poll+Data frame transmitted by the terminal A 4201. The terminal B 4202 determines the amount of data to be transmitted by itself as the upper limit of the value obtained by adding the time taken for the transmission of an aggregation frame of data frames, the SIFS time, and the time taken for the transmission of a BlockAck frame. If the sum of the value of NAV written in the BlockAck frame 4317 and the TXOP allocation limit time is longer than the length of the time from the completion of the transmission of the BlockAck frame 4317 to the TXOP limit, the TXOP allocation limit time is shortened and adjusted such that the value obtained by adding the time taken for the transmission of an HTP burst frame 4353 from the terminal B 4202, the SIFS time, and the time taken for the transmission of the BlockAck frame 4331 becomes shorter than the remaining time to the TXOP limit. Alternatively, only when the value obtained by adding the value of NAV written in the BlockAck frame 4317 and the TXOP allocation limit time is longer than the length of the time from the completion of the transmission of the BlockAck frame 4317 to the TXOP limit, the terminal A 4021 may transmit an HTP burst frame 4352.

When a terminal B 4202 is to monitor the value of NAV so as to prevent it from exceeding the TXOP limit, for example, the following operation is performed. The terminal A 4201 and the terminal B 4202 each reduce the data amount of an aggregation frame of HTP burst frames such that the value obtained by adding the time taken for the transmission of the HTP burst frame from the self terminal, the SIFS time, and the time taken for the transmission of a BlockAck frame with respect to each data frame included in the HTP burst frame becomes shorter than the remaining time to the TXOP limit.

Third Embodiment

Figure 14:
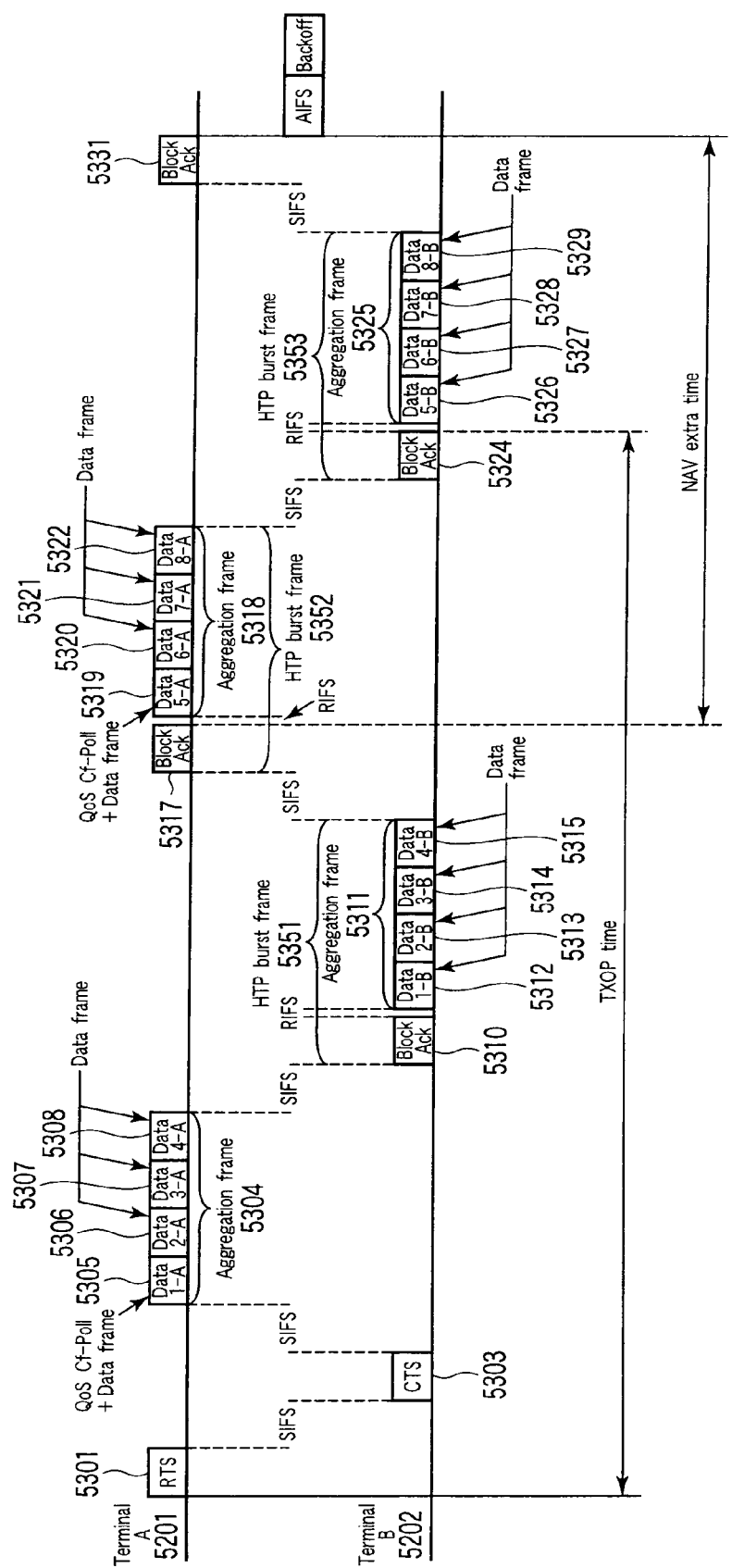
FIG. 14 is a timing chart according to the third embodiment.

FIG. 14 is a timing chart according to the third embodiment. Note that a terminal A 5201 operates in accordance with the flowchart associated with the operation of the terminal A 201 in the first embodiment shown in FIG. 3, and a terminal B 5202 operates in accordance with the flowchart associated with the operation of the terminal B 202 in the first embodiment shown in FIG. 4.

This embodiment will exemplify an arrangement in which the value of NAV to be written in an RTS frame 5301 from the terminal A 5201 is the value of the length of the time taken for the completion of the transmission of a BlockAck frame 5324 to be returned after the reception of an HTP burst frame 5352 by the terminal B 5202.

(3-1-1. Transmission of RTS Frame from Terminal A)

Steps 1 and 2 remain unchanged.

Unlike in the first embodiment, the length of an NAV time 5361 determined in step 3 is equal to the sum of 5×SIFS time, the time taken for the transmission of a CTS frame 5303, the time taken for the transmission of an aggregation frame 5304 from the terminal A 5201, the time taken for the transmission of an HTP burst frame 5351 from the terminal B 5202, the time taken for the transmission of the HTP burst frame 5352 from the terminal A 5201, and the time taken for the transmission of the BlockAck frame 5324 from the terminal B 5202. This value is written as the value of NAV in the RTS frame 5301. This value of NAV indicates the length of the time from the completion of the transmission of the RTS frame 5301 to the completion of the transmission of the second BlockAck frame 5324 from the terminal B 5202.

Steps 4 to 6 in FIG. 3 remain unchanged.

(3-1-2. Reception of RTS Frame and Transmission of CTS Frame by Terminal B)

Steps 101 and 102 remain unchanged.

(3-1-3. Reception of CTS Frame and Transmission of Aggregation Frame by Terminal A)

Steps 7 to 11 remain unchanged.

(3-1-4. Reception of Aggregation Frame and Transmission of HTP Burst Frame by Terminal B)

Steps 103 to 109 remain unchanged.

(3-1-5. Reception of HTP Burst Frame and Transmission of HTP Burst Frame by Terminal A)

Steps 12 and 13 remain unchanged.

In step 14, a frame generation/transmission processing unit 104 writes, as the value of NAV in a BlockAck frame 5317, the value obtained by adding the RIFS time, 2×SIFS time, the time taken for the transmission of an aggregation frame 5318, the time taken for the transmission of an HTP burst frame 5353, and the time taken for the transmission of a BlockAck frame 5331. This value of NAV indicates the length of the time from the completion of the transmission of the BlockAck frame 5317 to the completion of the next transmission of the BlockAck frame 5331 from the terminal A 5201.

Steps 15 to 18 remain unchanged.

When the reception of the BlockAck frame 5317 is complete, a terminal C 5203 and a terminal D 5204 each inhibit itself from performing communication by using the band used for the bi-directional communication between the terminal A 5201 and the terminal B 5202 for only the time indicated by the value of NAV written in the BlockAck frame 5317.

Subsequently, the length of the time from the end time of a band reservation defined by the value of NAV in an RTS frame 5301 to the end time of a band reservation defined by the value of NAV written in the BlockAck frame 5317 is an NAV extra time 5362.

(3-1-6. Reception of HTP Burst Frame and Transmission of HTP Burst Frame by Terminal B)

Steps 110 and 111 remain unchanged.

In step 112, the frame generation/transmission processing unit 104 writes, as the value of NAV in the BlockAck frame 5324, the value obtained by adding the RIFS time, the time taken for the transmission of the aggregation frame 5325, the SIFS time, and the time taken for the next transmission of the BlockAck frame 5324 from the terminal A 5331. This value of NAV indicates the length of the time from the completion of the transmission of the BlockAck frame 5324 to the completion of the next transmission of the BlockAck frame 5331 from the terminal A 5201, and indicates the remaining time to the end time of a band reservation defined by the value of NAV written in the BlockAck frame 5317.

Steps 113 to 116 remain unchanged.

(3-1-7. Reception of HTP Burst Frame and Transmission of BlockAck Frame by Terminal A)

Steps 19 and 20 remain unchanged.

In step 21, the frame generation/transmission processing unit 104 writes 0 as the value of NAV. Step 22 remains unchanged.

As described above, both the terminal A 5201 and the terminal B 5202 notify that NAV is prolonged, until the end of NAV started by RTS-CTS exchange. This makes it possible to reliably notify even a terminal which can receive only transmission waves from the terminal A 5201 or a terminal which can receive only transmission waves from the terminal B 5202 of the prolongation of NAV.

Fourth Embodiment

Figure 15:
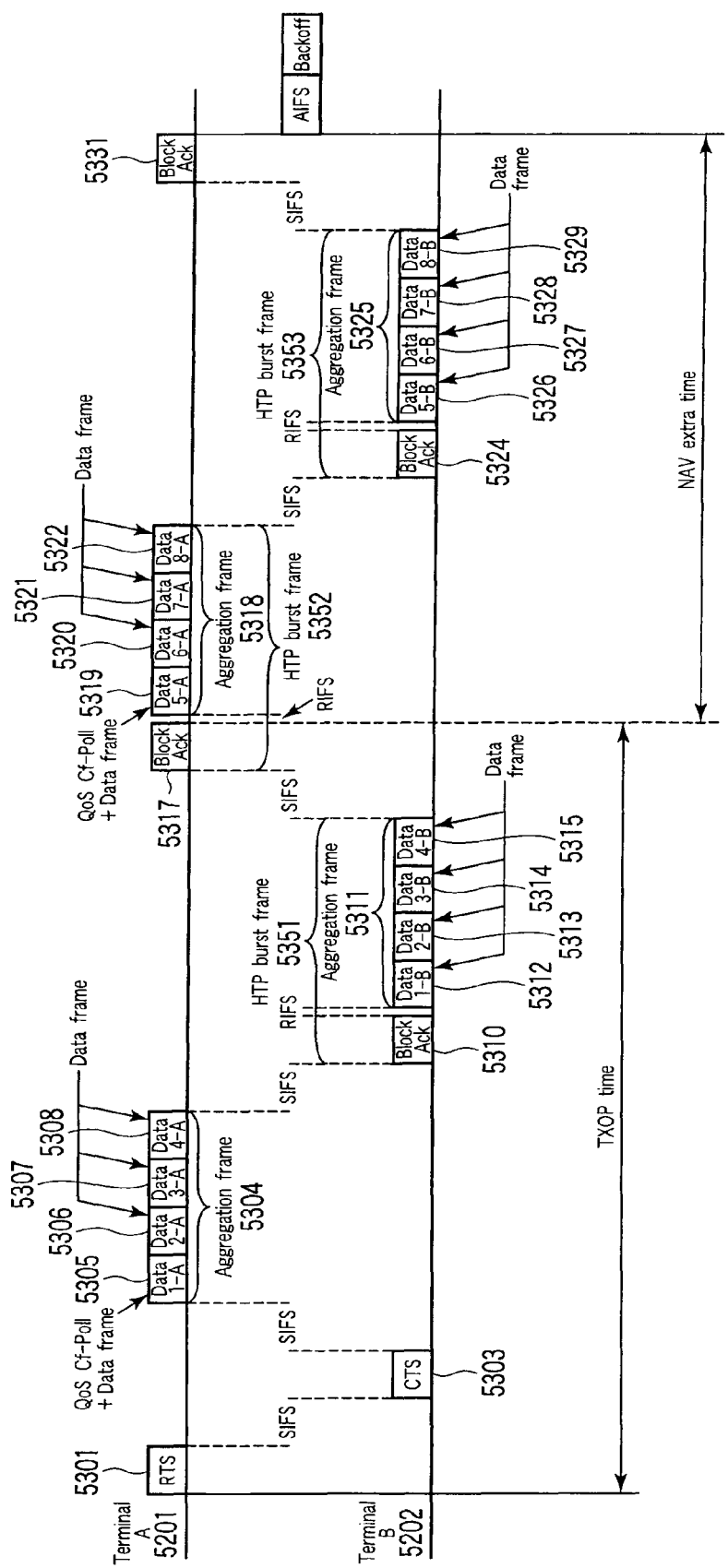
FIG. 15 is a flowchart associated with the operation of a terminal B according to the fourth embodiment.

FIG. 15 is a timing chart according to the fourth embodiment.

Note that a base station A 6201 operates in accordance with the flowchart associated with the operation of the terminal A 201 in the first embodiment shown in FIG. 3, and a terminal B 6202 operates in accordance with the flowchart associated with the operation of the terminal B 202 in the first embodiment shown in FIG. 4.

Figure 16:
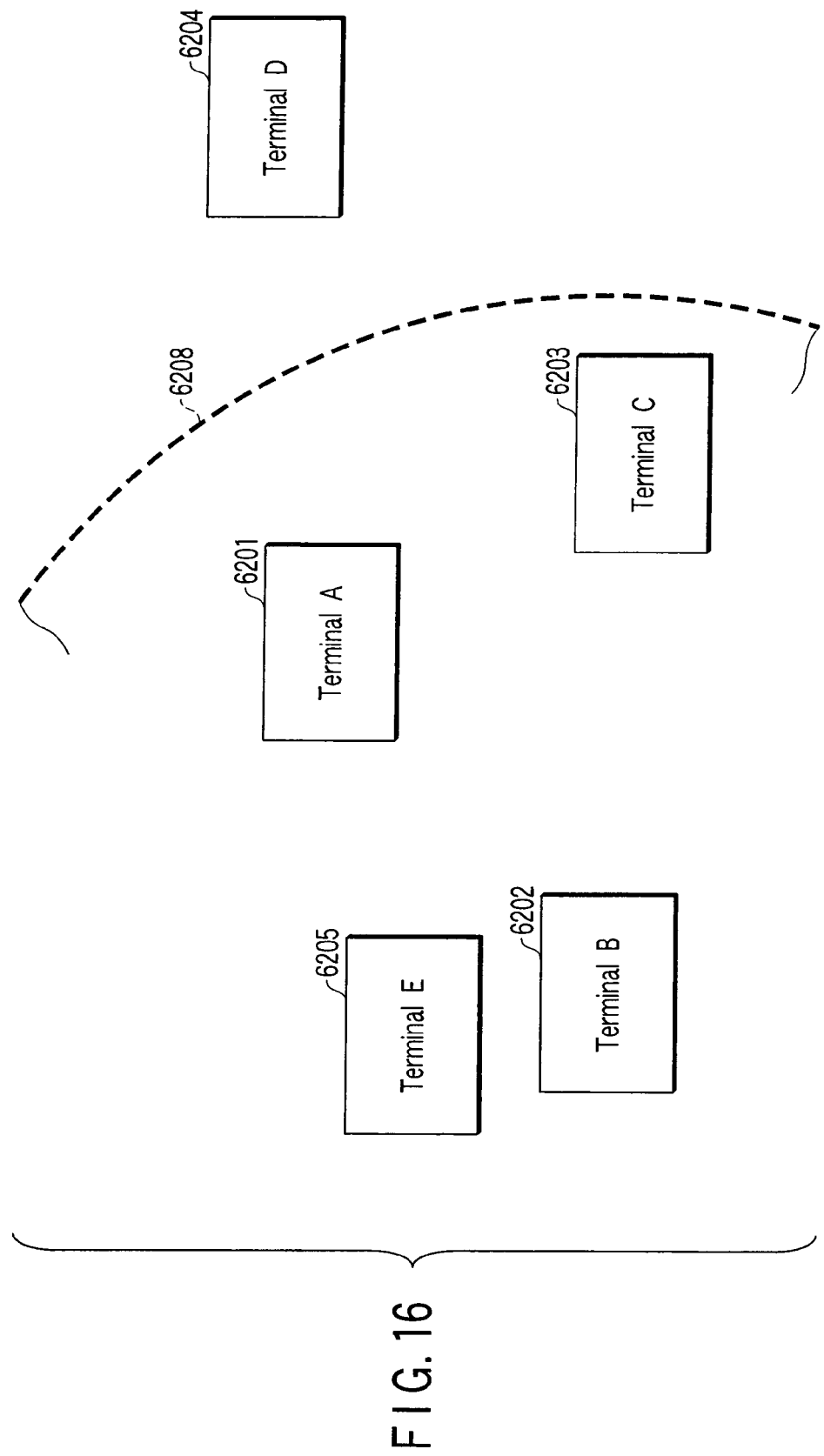
FIG. 16 is a view showing the positional relationship between terminals in the fourth embodiment.

In this embodiment, as shown in FIG. 16, assume that in this bi-directional communication, a wireless communication system to which the terminal A 6201 and the terminal B 6202 belong includes a terminal C 6203, terminal D 6204, and terminal E 6205 to which transmission data are not addressed, in addition to the terminal A 6201 and the terminal B 6202.

Assume that the terminal C 6203, terminal D 6204, and terminal E 6205 can receive transmission waves from the terminal A 6201 when the terminal A 6201 and the terminal B 6202 start bi-directional communication. That is, there is no hidden terminal with respect to the terminal A 6201, i.e., no terminal which cannot receive transmission waves from the terminal A 6201.

(4-1-1. Transmission of RTS Frame from Terminal A)

Steps 1 and 2 remain unchanged.

The length of an NAV time 6361 determined in step 3 differs from that of the first embodiment. The value obtained by adding the 4×SIFS time, the time taken for the transmission of an CTS frame 6303, the time taken for the transmission of an Aggregation frame 6304 and a BlockAck frame 6317 transmitted by the terminal 6201, and the time taken for the transmission of an HTP burst frame 6351 is written as the value of NAV in a RTS frame 6301. This value of NAV indicates the length of the time from the completion of the transmission of the RTS frame 6301 to the completion of the next transmission of the BlockAck frame 6317 from the terminal A 6201.

Steps 4 to 6 remain unchanged.

(4-1-2. Reception of RTS Frame and Transmission of CTS Frame by Terminal B)

Steps 101 and 102 in FIG. 4 remain unchanged.

(4-1-3. Reception of CTS Frame and Transmission of Aggregation Frame by Terminal A)

Steps 7 to 11 in FIG. 3 remain unchanged.

(4-1-4. Reception of Aggregation Frame and Transmission of HTP Burst Frame by Terminal B)

Steps 103 to 109 in FIG. 4 remain unchanged.

(4-1-5. Reception of HTP Burst Frame and Transmission of HTP burst Frame by Terminal A)

Steps 12 and 13 in FIG. 3 remain unchanged.

In step 14, a frame generation/transmission processing unit 104 writes, as the value of NAV in a BlockAck frame 6317, the value obtained by adding the RIFS time, 2×SIFS time, the time taken for the transmission of an aggregation frame 6318, the TXOP allocation time written in Data 5-A 6319, and the time taken for the transmission of a BlockAck frame 6331. This value of NAV indicates the length of the time from the completion of the transmission of the BlockAck frame 6317 to the completion of the transmission of the BlockAck frame 6331 from the terminal A 6201.

Steps 15 to 18 in FIG. 3 remain unchanged.

When the reception of the BlockAck frame 6317 is complete, the terminal C 6203, the terminal D 6204, and the terminal E 6205 each inhibit itself from performing communication by using the band used for bi-directional communication between the terminal A 6201 and the terminal B 6202 for only the time indicated by the value of NAV written in the BlockAck frame 6317.

Assume that the length of the time from the end time of a band reservation defined by the value of NAV in an RTS frame 4301 to the end time of a band reservation defined by the value of NAV written in the BlockAck frame 6317 is an NAV extra time 6362.

(4-1-6. Reception of HTP Burst Frame and Transmission of HTP Burst Frame by Terminal B)

Steps 110 to 116 in FIG. 4 remain unchanged.

(4-1-7. Reception of HTP Burst Frame and Transmission of BlockAck Frame by Terminal A)

Steps 19 to 22 in FIG. 3 remain unchanged.

As described above, the base station A 6201 transmits the BlockAck frame 6317 for prolonging the NAV by the time when the NAV started by RTS-CTS exchange ends.

The NAV time defined in advance continues until all the terminal C 6203, terminal D 6204, and terminal E 6205 can receive transmission waves from the base station A 6201, and the base station A 6201 completes the transmission of the BlockAck frame 6317 and notifies all the terminals of the prolongation of the NAV. Even in a system including the base station A 6201, therefore, the NAV time can be prolonged without any interruption.

Note that when the NAV is to be prolonged, the base station A 6201 makes an adjustment to prevent the end time of the NAV extra time from exceeding TXOP limit.

In this embodiment, the base station A 6201 is referred to as a base station. However, the base station A 6201 may be a terminal on the assumption that there is no hidden terminal.

Fifth Embodiment

Figure 18:
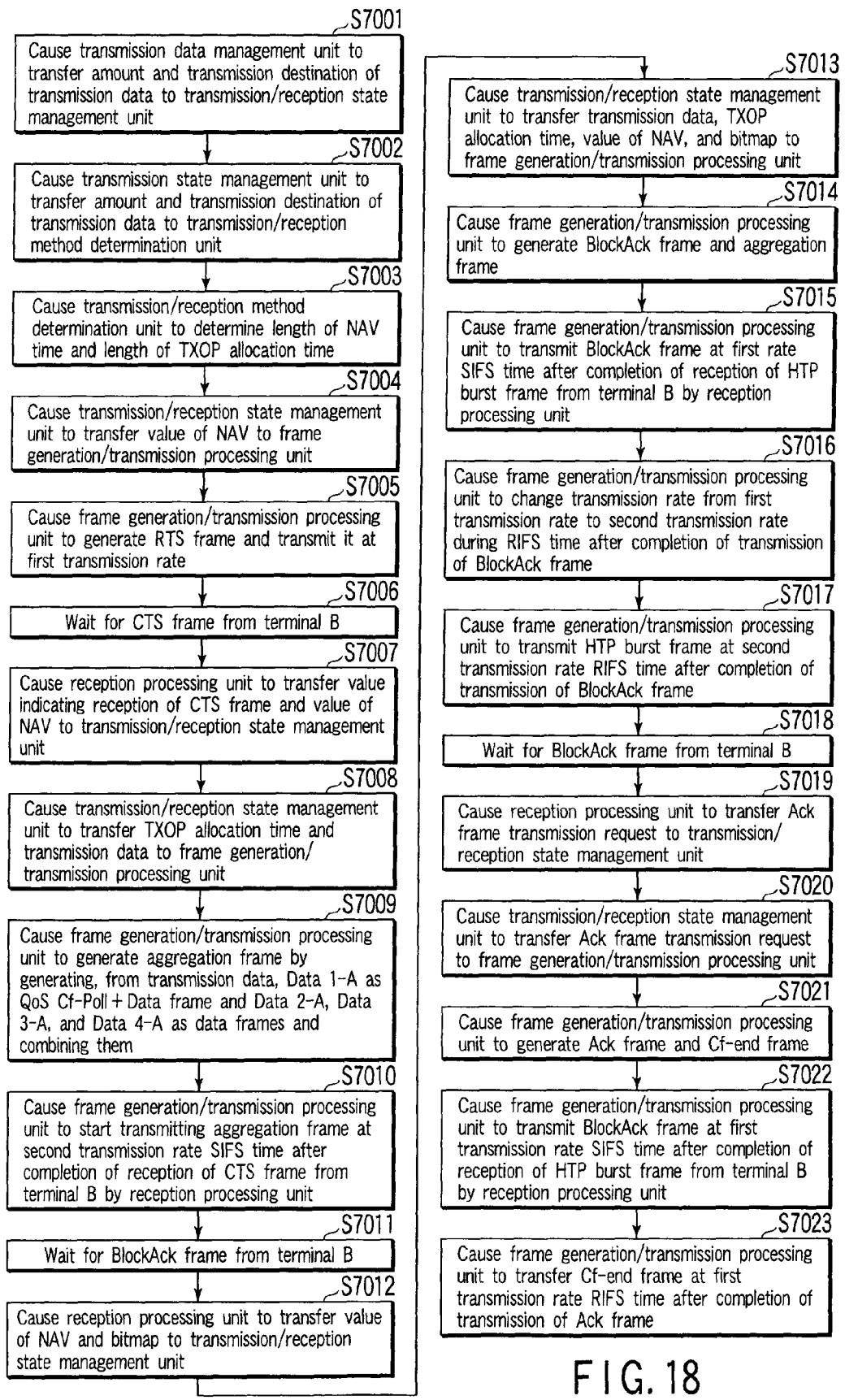
FIG. 18 is a flowchart associated with the operation of a terminal A in the fifth embodiment.
Figure 19:
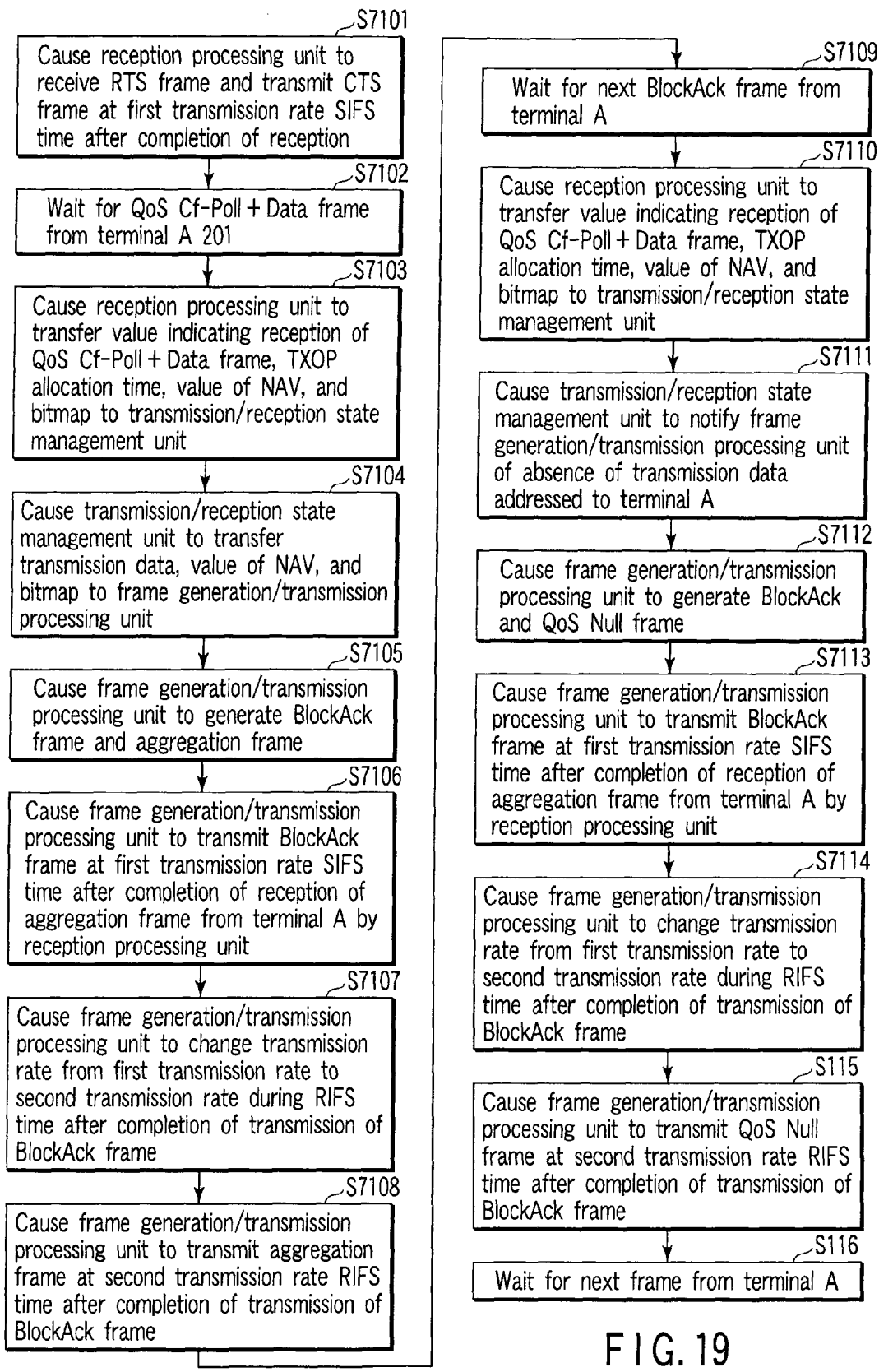
FIG. 19 is a flowchart associated with the operation of a terminal B in the fifth embodiment.

FIG. 17 is a timing chart according to the fifth embodiment. FIG. 18 is a flowchart associated with the operation of a terminal A 7201. FIG. 19 is a flowchart associated with the operation of a terminal B 7202.

Assume that the terminal A 7201 is located at the same position as that of the terminal A 201 in FIG. 5, and the terminal B 7202 is located at the same position as that of the terminal B 202 in FIG. 5.

In this embodiment, the arrangement of the first embodiment is changed such that when the terminal B 7202 does not spend the entire TXOP allocation time allocated by the terminal A 7201, the start of bi-directional communication is quickened by the unspent time.

(5-1-1. Transmission of RTS Frame from Terminal A)

Steps 7001 to 7006 in FIG. 18 are the same as steps 1 to 6 in FIG. 3.

(5-1-2. Reception of RTS Frame and Transmission of CTS Frame by Terminal B)

Steps 7101 and 7102 in FIG. 19 are the same as steps 101 and 102 in FIG. 4.

(5-1-3. Reception of CTS Frame and Transmission of Aggregation Frame by Terminal A)

Steps 7007 to 7011 in FIG. 18 are the same as steps 7 to 11 in FIG. 3.

(5-1-4. Reception of Aggregation Frame and Transmission of HTP Burst Frame by Terminal B)

Steps 7103 and 7104 in FIG. 19 are the same as steps 103 and 104 in FIG. 4.

In step 7105, a frame generation/transmission processing unit 104 generates Data 1-B 7312, Data 2-B 7313, and Data 3-B 7314 from transmission data.

It should be noted that the TXOP allocation time is equal to the sum of the RIFS time, the SIFS time, the time taken for the transmission of a BlockAck frame, and the time taken for the transmission of four data frames, but the terminal B 7202 generates only three data frames, i.e., the Data 1-B 7312, Data 2-B 7313, and Data 3-B 7314. For example, this is a case wherein the terminal B 7202 does not have transmission data addressed to the terminal A 7201 which is large enough in amount to generate four data frames in a transmission queue 106.

The frame generation/transmission processing unit 104 generates an aggregation frame 7311 by combining the Data 1-B 7312, Data 2-B 7313, and Data 3-B frame 7314.

The frame generation/transmission processing unit 104 writes, as the value of NAV in a BlockAck frame 7310, the value obtained by adding the RIFS time, the time taken for the transmission of the aggregation frame 7311 including three data frames (i.e., the time taken for the transmission of three data frames), the SIFS time, and the time taken for the next transmission of a BlockAck frame 7317 from the terminal A 7201. This value of NAV indicates the length of the time from the completion of the transmission of the BlockAck frame 7310 to the completion of the transmission of the BlockAck frame 7317 from the terminal A 7201.

Steps 7106 to 7109 in FIG. 19 are the same as steps 106 to 109 in FIG. 4.

In this case, even if a terminal C 7204 receives the BlockAck frame 7310, the terminal does not perform communication by using the corresponding transmission band until the end of an NAV time 7361 defined by RTS CTS frame exchange or the reception of a Cf-end frame 7332 (to be described later) regardless of the value of NAV written in the BlockAck frame 7310.

(5-1-5. Reception of HTP Burst Frame and Transmission of HTP Burst Frame by Terminal A)

Steps 7012 to 7018 in FIG. 18 are the same as steps 12 to 18 in FIG. 3.

In this case, if the value of NAV written in the BlockAck frame 7310 transmitted from the terminal B 7202 is shorter than the remaining time to the end time of the NAV time 7361 equivalent to the TXOP allocation time, the terminal A 7201 knows that the TXOP allocation time written in Data 1-A 7305 remains unspent by the corresponding amount.

(5-1-6. Reception of HTP Burst Frame and Transmission of HTP Burst Frame by Terminal B)

Steps 7101 to 7110 in FIG. 19 are the same as steps 101 to 110 in FIG. 4.

In step 7111, a transmission/reception state management unit 108 prepares data frames to be retransmitted by determining from the bitmap in the BlockAck frame 7317 whether there are any data frames to be retransmitted, and then performs processing of extracting new transmission data from the transmission queue 106. In this case, since there is no transmission data addressed to the terminal A 7201 in the transmission queue 106, the transmission/reception state management unit 108 transfers a bitmap for notifying acknowledgement to the frame generation/transmission processing unit 104, and notifies that there is no transmission data addressed to the terminal A 7201.

In step 7112, the frame generation/transmission processing unit 104 generates a BlockAck frame 7324 with respect to Data 5-A 7319, Data 7-A 7320, Data 6-A 7321, and Data 8-A 7322 transmitted from the terminal A 7201 by using the bitmap. The frame generation/transmission processing unit 104 has been notified that there is no transmission data addressed to the terminal A 7201, and hence generates a QoS Null frame 7326 for notifying the terminal A 7201 that there is no transmission data addressed to the terminal A 7201. The frame generation/transmission processing unit 104 writes, as the value of NAV in the BlockAck frame 7324, the value obtained by adding the RIFS time, the time taken for the transmission of the QoS Null frame 7326, the SIFS time, and the time taken for the next transmission of the Ack frame 7331 from the terminal A 7201. This value of NAV indicates the length of the time from the completion of the transmission of the BlockAck frame 7324 to the completion of the transmission of a Ack frame 7331 from the terminal A 7201.

The frame generation/transmission processing unit 104 writes, as the value of NAV in the QoS Null frame 7326, the value obtained by subtracting the RIFS time and the time taken for the transmission of the QoS Null frame 7326 from the value of NAV written in the BlockAck frame 7324. This value of NAV indicates the length of the time from the completion of the transmission of the QoS Null frame 7326 to the completion of the next transmission of the Ack frame 7331 from the terminal A 7201.

Steps 7113 to 7116 in FIG. 19 are the same as steps 113 to 116 in FIG. 4 except that the transmission aggregation frame is replaced with a QoS Null frame.

(5-1-7. Reception of HTP Burst Frame and Transmission of BlockAck Frame by Terminal A)

The reception processing unit 105 of the terminal A 7201 which has received two PHY frames with the RIFS time set therebetween, i.e., an HTP burst frame 7353, transfers a transmission request for the BlockAck frame 7331 to the transmission/reception state management unit 108 when normally receiving the QoS Null frame 7326 (step 7019 in FIG. 18).

The transmission/reception state management unit 108 transfers the transmission request for the Ack frame 7331 to the frame generation/transmission processing unit 104 (step 7020 in FIG. 18).

The frame generation/transmission processing unit 104 generates the Ack frame 7331 with respect to the QoS Null frame 7326 transmitted from the terminal B 7202 in accordance with the received transmission request. The frame generation/transmission processing unit 104 generates the Cf-end frame 7332 for forced termination of the NAV time (step 7021 in FIG. 18).

The frame generation/transmission processing unit 104 starts transmitting a generated HTP burst frame 7354 the SIFS time after the completion of the reception of the HTP burst frame 7353 transmitted from the terminal B 7202 by a reception processing unit 105.

The transmission of the HTP burst frame 7354 will be described in detail. First of all, the transmission of the Ack frame 7331 is started (step 22 in FIG. 18). Assume that the transmission rate of the Ack frame 7331 is the first transmission rate.

The frame generation/transmission processing unit 104 transmits the Cf-end frame 7332 at the first transmission rate, which is the same as the transmission rate of the Ack frame 7331, the RIFS time after the completion of the transmission of the Ack frame 7331 (step 23 in FIG. 18).

A terminal C 7203 receives the Cf-end frame 7332 to know that the band reservation for the terminal A 7201 is released and the band can be used.

When this bi-directional communication is to be further performed or communication with another terminal is performed, the above processing is performed again from the sequence of "1-1-1" after the lapse of the AIFS+Backoff time.

As described above, in this embodiment, if the terminal B 7202 cannot spend the entire TXOP allocation time allocated by the terminal A 7201, the start of bi-directional communication can be quickened by the unspent time. In addition, the terminal B 7202 can be notified that there is no transmission data addressed to the terminal A 7201.

This makes it possible to quickly terminate bi-directional communication without making the unspent time in the terminal B 7202 become a wasteful time during which no transmission/reception is performed.

According to this embodiment, in step 116, the QoS Null frame 7326 is transmitted. However, if the terminal A 7201 can be notified through any frame that the transmission queue 106 of the terminal B 7202 has no transmission data addressed to the terminal A 7201, the QoS Null frame 7326 can be replaced by another kind of frame. For example, an agreement can be made such that when the value of NAV written in the BlockAck frame 7324 is 0, the terminal A 7201 regards that the terminal B 7202 does not have any transmission data addressed to the terminal A 7201.

In addition, in order to guarantee the reception of the Cf-end frame 7332 for a terminal which conforms to only the IEEE 802.11a/b/g/e specifications, the Ack frame 7331 and the Cf-end frame 7332 may be transmitted at an interval of the SIFS time instead of being transmitted as HTP burst frames at an interval of the RIFS time.

Alternatively, the above arrangement may be modified to transmit the Cf-end frame 7332 the SIFS time after the completion of the reception of the HTP burst frame 7353 from the terminal B 7202 by the reception processing unit 105 without transmitting the Ack frame 7331. In this case, assume that the terminal B 7202 regards that the HTP burst frame has been transmitted, and bi-directional communication is terminated when the Cf-end frame 7332 is received. In this case, there is no need to transmit the Ack frame 7331 with respect to the QoS Null frame 7326, and the Cf-end frame 7332 is singly transmitted instead of the HTP burst frame 7354.

According to this embodiment, the transmission rate is changed from the first transmission rate to the second transmission rate during the RIFS time after the completion of the transmission of the Ack frame 7331 from the terminal A 7201. However, the Cf-end frame 7332 may be transmitted at the first transmission rate.

Sixth Embodiment

Figure 20:
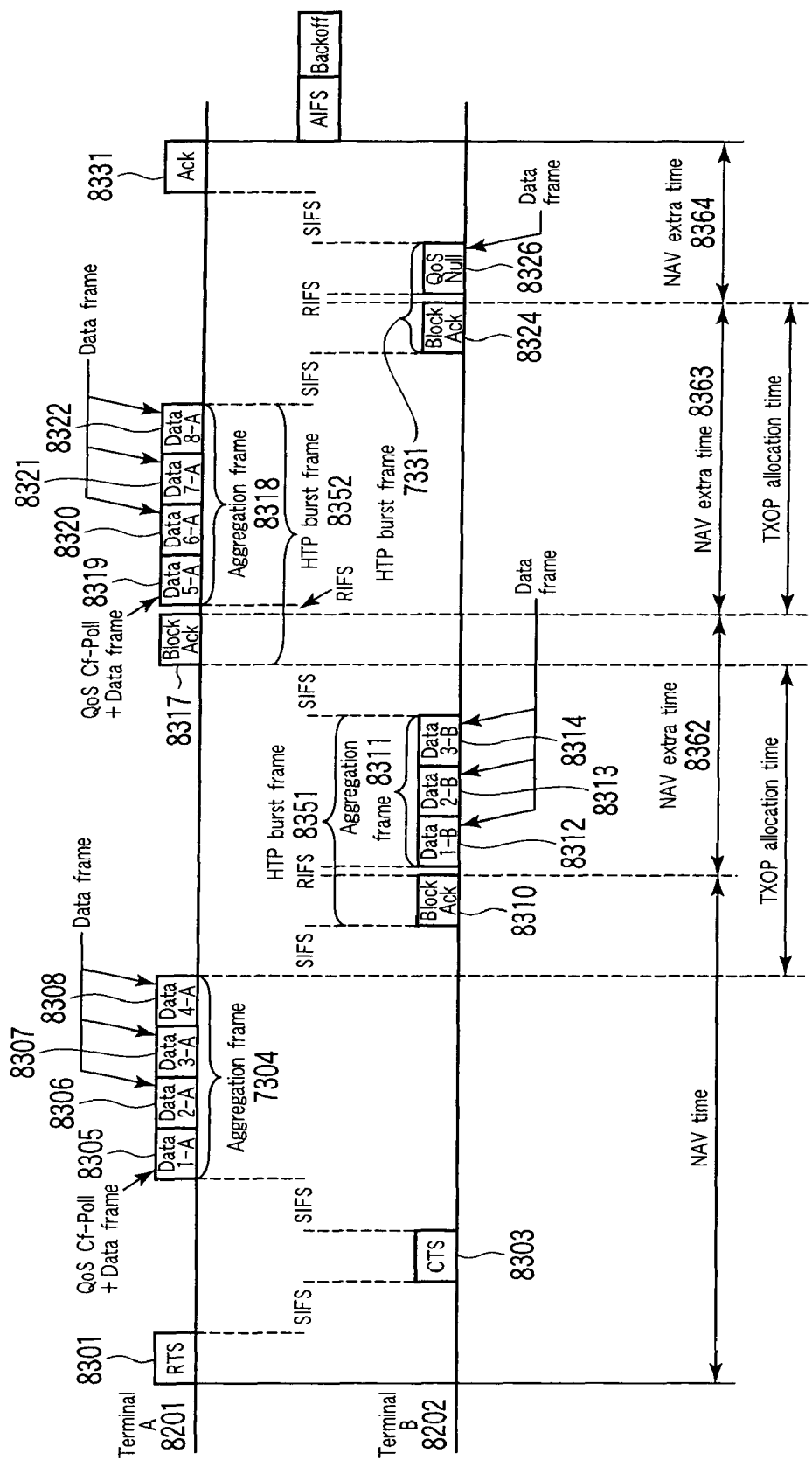
FIG. 20 is a timing chart according to the sixth embodiment.
Figure 21:
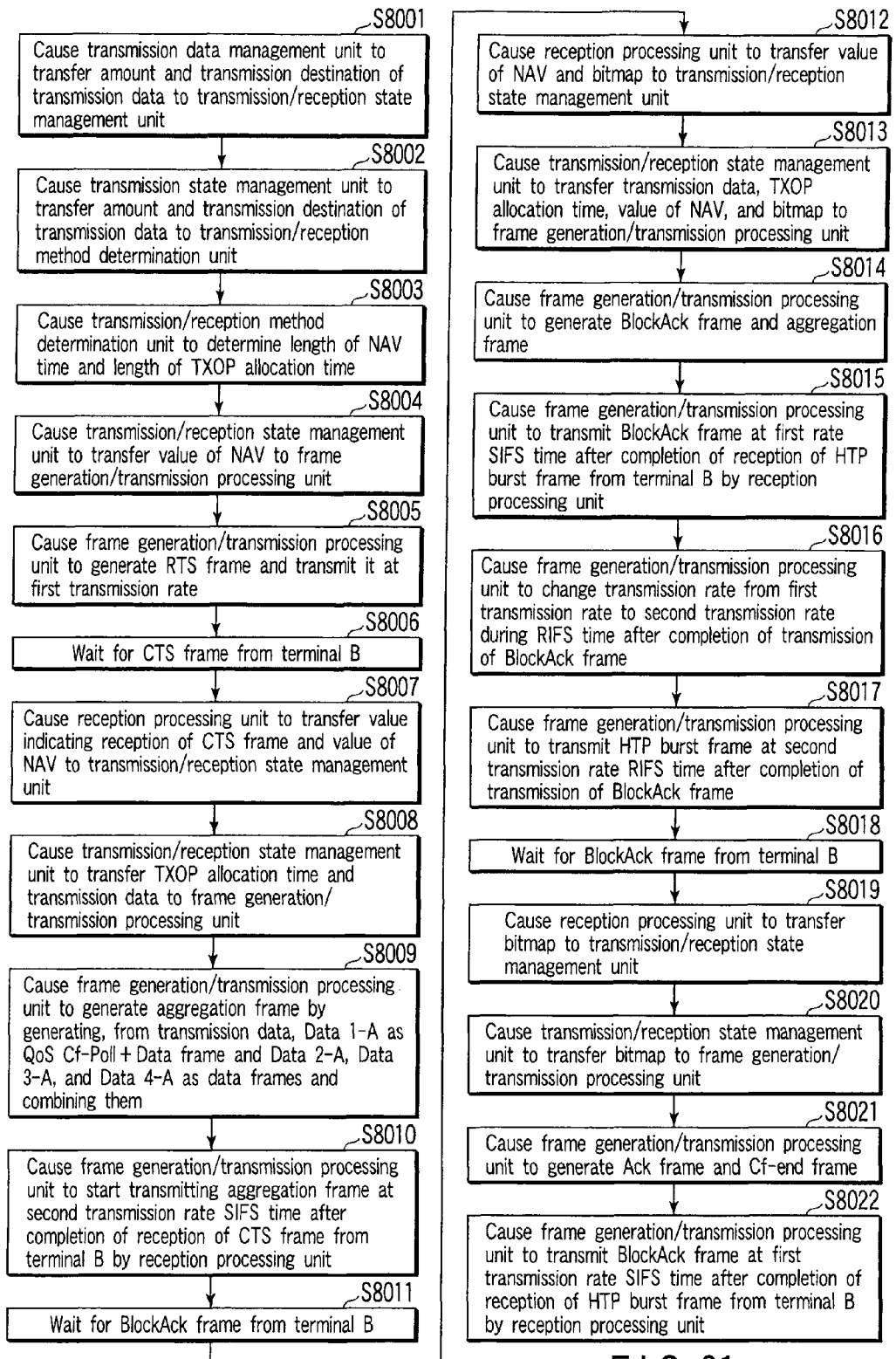
FIG. 21 is a flowchart associated with the operation of a terminal A in the sixth embodiment.

FIG. 20 is a timing chart according to the sixth embodiment. FIG. 21 is a flowchart associated with the operation of a terminal A 8201.

Assume that a terminal B 8202 operates in accordance with the flowchart of the operation of the terminal B 7202 in the fifth embodiment.

Assume also that the terminal A 8201 is located at the same position as that of the terminal A 201 in FIG. 5, and the terminal B 8202 is located at the same position as that of the terminal B 202 in FIG. 5.

In this embodiment, the arrangement of the second embodiment is changed such that when the terminal B 8202 does not spend the entire TXOP allocation time allocated by the terminal A 8201, the start of bi-directional communication is quickened by the unspent time.

(6-1-1. Transmission of RTS Frame from Terminal A)

Steps 8001 and 8002 in FIG. 21 are the same as steps 7001 and 7002 in FIG. 18.

The length of an NAV time 8361 determined in step 8003 is the same as in the second embodiment.

Steps 8004 to 8006 in FIG. 21 are the same as steps 7004 to 7006 in FIG. 18.

(6-1-2. Reception of RTS Frame and Transmission of CTS Frame by Terminal B)

Steps 7101 and 7102 in FIG. 19 remain unchanged.

(6-1-3. Reception of CTS Frame and Transmission of Aggregation Frame by Terminal A)

Steps 8007 to 8011 in FIG. 21 are the same as steps 7008 to 7011 in FIG. 18.

(6-1-4. Reception of Aggregation Frame and Transmission of HTP Burst Frame by Terminal B)

Steps 7103 and 7104 in FIG. 19 remain unchanged.

In step 7105, the frame generation/transmission processing unit 104 generates Data 1-B 8312, Data 2-B 8313, and Data 3-B 8314 from transmission data.

It should be noted that the TXOP allocation time is equal to the sum of the RIFS time, the SIFS time, the time taken for the transmission of a BlockAck frame, and the time taken for the transmission of four data frames, but the terminal B 8202 generates only three data frames, i.e., the Data 1-B 8312, Data 2-B 8313, and Data 3-B 8314. For example, this is a case wherein the terminal B 8202 does not have transmission data addressed to the terminal A 8201 which is large enough in amount to generate four data frames in a transmission queue 106.

A frame generation/transmission processing unit 104 generates an aggregation frame 8311 by combining the Data 1-B 8312, Data 2-B 8313, and Data 3-B 8314.

The frame generation/transmission processing unit 104 writes, as the value of NAV in a BlockAck frame 8310, the value obtained by adding the RIFS time, the time taken for the transmission of the aggregation frame 8311 (i.e., the time taken for the transmission of three data frames), the SIFS time, and the time taken for the next transmission of a BlockAck frame 8317 from the terminal A 8201. This value of NAV indicates the length of the time from the completion of the transmission of the BlockAck frame 8310 to the completion of the next transmission of the BlockAck frame 8317 from the terminal A 8201.

The frame generation/transmission processing unit 104 writes the value obtained by subtracting the RIFS time and the time taken for the transmission of an aggregation frame 8311 from the value of NAV written in the BlockAck frame 8310, as the value of NAV, in each of the Data 1-B 8312, the Data 2-B 8313, the Data 3-B 8314, and Data 4-B 8315. This value of NAV indicates the length of the time from the completion of the transmission of the aggregation frame 8311 to the completion of the transmission of the BlockAck frame 8317 from the terminal A 8201.

Steps 7106 to 7109 in FIG. 19 remain unchanged.

Upon receiving the BlockAck frame 8310, a terminal C 8203 inhibits itself from performing communication by using the band used for the bi-directional communication between the terminal A 8201 and the terminal B 8202 for the time indicated by the value of NAV written in the BlockAck frame 8310 after the completion of the reception of the BlockAck frame 8310. That is, the band reservation is prolonged for the terminal A 8201 with respect to the terminal C 8203.

(6-1-5. Reception of HTP Burst Frame and Transmission of HTP Burst Frame by Terminal A)

Steps 8012 to 8018 in FIG. 21 are the same as steps 7012 to 7018 in FIG. 18.

If the value of NAV written in the BlockAck frame 8310 transmitted from the terminal B 8202 is shorter than the remaining time to the end of the TXOP allocation time written in Data 1-A 8305, the terminal A 8201 knows that the TXOP allocation time written in a BlockAck frame 8305 is left unspent by the corresponding amount.

(6-1-6. Reception of HTP Burst Frame and Transmission of HTP Burst Frame by Terminal B)

Steps 7110 and 7111 in FIG. 19 remain unchanged.

In step 7112, the frame generation/transmission processing unit 104 generates a BlockAck frame 8324 with respect to Data 5-A 8319, Data 6-A 8320, Data 7-A 8321, and Data 8-A 8322 transmitted from the terminal A 8201 by using a bitmap. The frame generation/transmission processing unit 104 generates a QoS Null frame 8326.

The frame generation/transmission processing unit 104 writes, as the value of NAV in the Ack frame 8324, the value obtained by adding the RIFS time, the time taken for the transmission of the QoS Null frame 8326, the SIFS time, and the time taken for the next transmission of the Ack frame 8331 from the terminal A 8201. This value of NAV indicates the length of the time from the completion of the transmission of the BlockAck frame 8324 to the completion of the transmission of an Ack frame 8331 from the terminal A 8201.

The frame generation/transmission processing unit 104 writes, as the value of NAV in the QoS Null frame 8326, the value obtained by subtracting the RIFS time and the time taken for the transmission of the QoS Null frame 8326 from the value of NAV written in the BlockAck frame 8324. This value of NAV indicates the length of the time from the completion of the transmission of the QoS Null frame 8326 to the completion of the transmission of the Ack frame 8331 from the terminal A 8201.

Steps 7113 to 7115 in FIG. 19 remain unchanged.

In addition, a description of step 7116 will be omitted because it remains unchanged except that the frame to be transmitted is replaced by the QoS Null frame 8326.

(6-1-7. Reception of HTP Burst Frame and Transmission of Ack Frame by Terminal A)

Since steps 8019 and 8020 in FIG. 21 are the same as steps 7019 and 7020 in FIG. 18, a description thereof will be omitted.

The frame generation/transmission processing unit 104 generates the Ack frame 8331 with respect to the QoS Null frame 8326 transmitted from the terminal B 8202 by using a received bitmap (step 8021 in FIG. 20).

The frame generation/transmission processing unit 104 transmits the generated Ack frame 8331 the SIFS time after the completion of the reception of an HTP burst Frame 8353 from the terminal B 8202 by the reception processing unit 105 (step 22 in FIG. 20).

According to this embodiment, there is no need to transmit a Cf-end frame 8332 because an NAV extra time 8364 expires when the transmission of the Ack frame 8331 is complete.

When this bi-directional communication is to be further performed, the above processing is performed again from the sequence of "1-1-1-" after the lapse of the AIFS+Backoff time.

As described above, according to this embodiment, even in the second embodiment, when the terminal B 8202 does not spend the entire TXOP allocation time allocated by the terminal A 8201, the start of bi-directional communication can be quickened by the unspent time.

As a consequence, the end of bi-directional communication can be quickened by the time unspent by the terminal B 8202.

Seventh Embodiment

FIG. 22 is a timing chart according to the seventh embodiment.

Assume that a base station A 9201 operates in accordance with the flowchart of the operation of the terminal A 7201 in the fifth embodiment shown in FIG. 18, and a terminal B 9202 operates in accordance with the flowchart of the operation of the terminal B 7202 in the fifth embodiment shown in FIG. 19. Assume also that the base station A 9201 is located at the same position as that of the terminal A 201 in FIG. 5, and the terminal B 9202 is located at the same position as that of the terminal B 202 in FIG. 5.

In this embodiment, the arrangement of the fourth embodiment is changed such that when the terminal B 9202 does not spend the entire TXOP allocation time allocated by the base station A 9201, the start of bi-directional communication is quickened by the unspent time.

(7-1-1. Transmission of RTS Frame from Terminal A)

Steps 7001 and 7002 in FIG. 18 remain unchanged.

The length of an NAV time 9361 determined in step 3 is the same as that in the fourth embodiment.

Steps 7004 to 7006 remain unchanged.

(7-1-2. Reception of RTS Frame and Transmission of CTS Frame by Terminal B)

Steps 7101 and 7102 in FIG. 19 remain unchanged.

(7-1-3. Reception of CTS Frame and Transmission of Aggregation Frame by Terminal A)

Steps 7007 to 7011 in FIG. 18 remain unchanged.

(7-1-4. Reception of Aggregation Frame and Transmission of HTP Burst Frame by Terminal B)

Steps 7103 to 7109 in FIG. 19 remain unchanged.

(7-1-5. Reception of HTP Burst Frame and Transmission of HTP Burst Frame by Terminal A)

Steps 7012 and 7013 in FIG. 18 remain unchanged.

In step 7014, a frame generation/transmission processing unit 104 writes, as the value of NAV in a BlockAck frame 9317, the value obtained by adding the RIFS time, 2×SIFS time, the time taken for the transmission of an aggregation frame 9318, the TXOP allocation time written in Data 5-A 9319, and the time taken for the transmission of a BlockAck frame 9331, thereby prolonging the band reservation.

Steps 7015 to 7018 in FIG. 18 remain unchanged.

(7-1-6. Reception of HTP Burst Frame and Transmission of HTP Burst Frame by Terminal B)

Steps 7110 to 7115 in FIG. 19 remain unchanged.

A description of step 7116 will also be omitted because it remains unchanged except that the frame to be transmitted is replaced by a QoS Null frame 9326 as in the fifth or sixth embodiment.

(7-1-7. Reception of HTP Burst Frame and Transmission of Ack Frame by Terminal A)

Steps 7019 to 7024 in FIG. 18 remain unchanged.

Note that in this embodiment, since an NAV extra time 9364 defined by the BlockAck frame 9317 continues when the transmission of the Ack frame 9331 is complete, a Cf-end frame 9332 must be transmitted.

As described above, according to this embodiment, even in the fourth embodiment, when the terminal B 9202 does not spend the entire TXOP allocation time allocated by the terminal A 9201, the start of bi-directional communication can be quickened by the unspent time.

As a consequence, the end of bi-directional communication can be quickened by the time unspent by the terminal B 9202.

Eighth Embodiment

The following description will be made with reference to the timing chart according to the fifth embodiment shown in FIG. 17. Assume, however, that the BlockAck frame 7317 is replaced by a CTS-Self frame 7317.

When a terminal A 7201 cannot normally receive an HTP burst frame 7351 transmitted from a terminal B 7202, one of the following four states is set. This embodiment will exemplify the manner of recovery from each of such states in the fifth embodiment.

(1) When a carrier sense unit 109 does not detect Busy in association with reception power in carrier sense processing even after the lapse of the SIFS+1-slot time since the completion of the transmission of an aggregation frame 7304 with which a QoS Cf-Poll+Data frame 7305 is combined:

After it is monitored whether Busy is detected in association with reception power by the time when the SIFS+1-slot time elapses since the completion of the transmission of the aggregation frame 7304, the aggregation frame 7304 with which the QoS Cf-Poll+Data frame 7305 is combined is retransmitted. Alternatively, a BlockAckRequest frame may be transmitted. These operations are the same as those defined in IEEE 802.11e.

(2) When the carrier sense unit 109 does not detect Busy in association with reception power in carrier sense processing the RIFS time after a BlockAck frame 7310 is normally received:

After the terminal A 7201 completes the transmission of a first aggregation frame 7304, it is known in advance by management frame exchange or the like that each terminal will transmit two PHY frames with the RIFS time set therebetween.

For this reason, even if the carrier sense unit 109 of the terminal A 7201 is Idle in carrier sense processing the RIFS time after the completion of the reception of a BlockAck frame 7310, i.e., the first PHY frame, the terminal B 7202 should have transmitted some frame (an aggregation frame 7311 in this case) as the second PHY frame.

In this case, according to a recovery method, as in the prior art, a frame to be retransmitted is transmitted a PIFS time (SIFS+1 slot) after the reception of the BlockAck frame 7310 as the first PHY frame by the terminal A 7201.

In this case, however, the frame retransmitted from the terminal A 7201 collides with some frame transmitted from the terminal B 7202.

This may be prevented by a technique of inhibiting the terminal A 7201 from performing transmission for only the TXOP allocation time allocated to the terminal B 7202. According to this embodiment, in this case, the length of an aggregation frame transmitted from the terminal B 7202, the SIFS time, and the time taken for the transmission of a Block-Ack frame can be known from the value of NAV which is written by the terminal B 7202 in the BlockAck frame 7310 after the terminal A 7201 receives the BlockAck frame 7310. For this reason, the CTS-Self frame 7317 is transmitted after the lapse of the time indicated by the value of NAV written in the BlockAck frame 7310. Aggregation frames 7318 are transmitted the RIFS time after this transmission. That is, the CTS-Self frame 7317 is transmitted as part of the HTP burst frame 7352.

(3) When the carrier sense unit 109 detects Busy in association with reception power in carrier sense processing the RIFS time after the normal reception of a BlockAck frame 7310:

If the carrier sense unit 109 of the terminal A 7201 is Busy in carrier sense processing the RIFS time after the completion of the reception of the BlockAck frame 7314, i.e., the first PHY frame, it is regarded that when the carrier sense unit 109 shifts from Busy to Idle, the transmission of some frame (the aggregation frame 7311 in this case) transmitted from the terminal B 7202 as the second PHY frame is complete.

In this case, therefore, after the carrier sense unit 109 of the terminal A 7201 becomes Busy the RIFS time after the completion of the reception of the BlockAck frame 7310, i.e., the first PHY frame, the transmission of the CTS-Self frame 7317 is started the PIFS time after the carrier sense unit 109 becomes Idle. A data frame or an aggregation frame is transmitted the RIFS time after the completion of the above transmission. That is, the CTS-Self frame 7317 is transmitted as part of the HTP burst frame 7352.

(4) When the carrier sense unit 109 detects Busy in association with reception power in carrier sense processing the SIFS time after the completion of the transmission of an aggregation frame 7304 with which a QoS Cf-Poll+Data frame 7305 is combined, but the received frame cannot be normally read:

In this case, Busy is detected for only a time corresponding to the transmission of the BlockAck frame 7310 after the lapse of the SIFS time since the completion of the transmission of an aggregation frame 7304 in accordance with an HTP burst frame 7351. Idle is then detected for only the RIFS time, and Busy is detected again. Since it is regarded that the time point when Idle is detected next corresponds to the time point when the transmission of the HTP burst frame 7351 is complete, the transmission of the CTS-Self frame 7317 is started after the lapse of the PIFS time, and Aggregation frames 7318 are transmitted the RIFS time after the completion of the above transmission. That is, the CTS-Self frame 7317 is transmitted as part of the HTP burst frame 7352.

This recovery operation prevents a frame for recovery operation transmitted from the terminal A 7201 from colliding with an HTP burst frame transmitted from the terminal B 7202 in the RD scheme.

In addition, if the terminal B 7202 does not spend the entire TXOP allocation time allocated by the terminal A 7201, and the terminal A 7201 can receive the BlockAck frame 7310, the start of bi-directional communication is quickened by the unspent time.

Assume that a recovery technique like that in this embodiment is combined with the fifth, sixth, and seventh embodiments. In this case, even if the NAV set by RTS-CTS frame exchange or a BlockAck frame expires at the same time as the NAV set by the BlockAck frame 7314 from the terminal B 7202, since the CTS-Self frame 7317 is transmitted before or immediately after the NAV, there is no chance that the NAV has expired. This makes it possible to prevent frames transmitted from the terminal A 7201 and terminals other than the terminal B 7202 from colliding with each other.

Ninth Embodiment

The ninth embodiment will be described below with reference to the timing chart according to the third embodiment shown in FIG. 14. Note, however, that the BlockAck frame 5317 is replaced by a CTS-Self frame 5317.

The ninth embodiment will exemplify recovery operation in the third embodiment for case (2) described in the eighth embodiment.

Note that recovery operation for cases (1), (3), and (4) in the eighth embodiment remains unchanged. (2) When the carrier sense unit 109 does not detect Busy in association with reception power in carrier sense processing the RIFS time after the normal reception of a BlockAck frame 5310:

It is known in advance by management frame exchange or the like that each terminal will transmit two PHY frames with the RIFS time set therebetween after the completion of the transmission of a first aggregation frame 5304 from a terminal A 5201.

Even if, therefore, a carrier sense unit 109 of the terminal A 5201 detects Idle in association with reception power in carrier sense processing the RIFS time after the completion of the reception of a BlockAck frame 5310, i.e., the first PHY frame, a terminal B 5202 should have transmitted some frame (an aggregation frame 5311 in this case) as the second PHY frame.

According to a recovery method like that in the prior art, the terminal A 5201 transmits a frame to be retransmitted the PIFS time (SIFS+1 slot) after the reception of a BlockAck frame 5310 as the first PHY frame by the terminal A 5201.

With this operation, however, the frame retransmitted from the terminal A 5201 collides with some frame transmitted from the terminal B 5202.

In order to prevent this, in this case, after the terminal A 5201 receives a BlockAck frame 5310, a data frame or an aggregation frame is transmitted after the lapse of the RIFS time since the completion of the transmission of the CTS-Self frame 5317 after the end of the TXOP allocation time allocated to the terminal B 5202 by the terminal A 5201. That is, the CTS-Self frame 5317 is transmitted as the HTP burst frame 5352 for data frames.

Performing such recovery makes it possible to prevent a frame for recovery operation transmitted from the terminal A 5201 from colliding with the HTP burst frame transmitted from the terminal B 5202 in the RD scheme.

If the terminal B 5202 does not spend the entire TXOP allocation time allocated by the terminal A 5201, and the terminal A 5201 can detect Busy in association with reception power, the start of bi-directional communication can be quickened by the unspent time.

Assume that a recovery technique like that in this embodiment is combined with the fifth embodiment. In this case, even if the NAV set by RTS-CTS frame exchange or a Block- Ack frame expires at the same time as the NAV set by the BlockAck frame 5314 from the terminal B 5202, there is no chance that the NAV has expired before the CTS-Self frame 5317 is transmitted. This makes it possible to prevent frames transmitted from the terminal A 5201 and terminals other than the terminal B 5202 from colliding with each other.

10th Embodiment

The arrangement of an HTP burst frame in each embodiment of the present invention and receiving operation at the time of reception of an HTP burst frame will be described in detail.

Figure 23A:
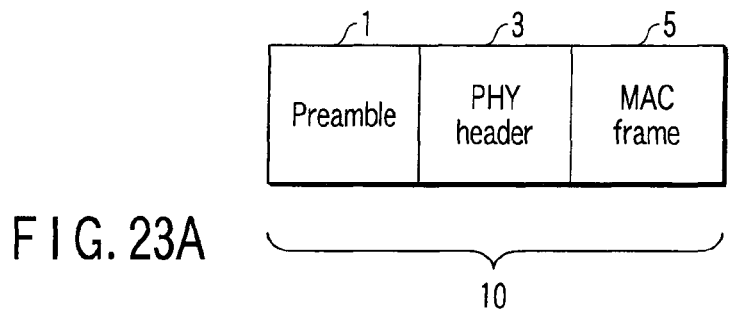
FIGS. 23A to 23D are views showing a frame arrangement in the 10th embodiment.
Figure 23B:
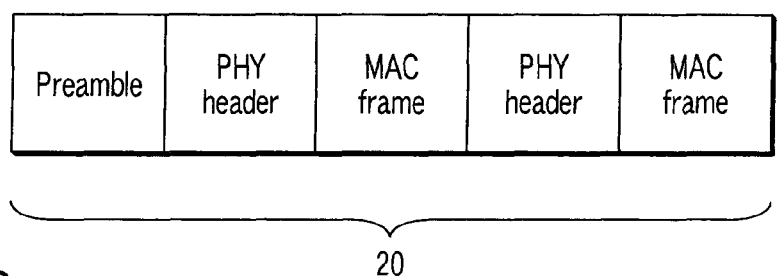
Figure 23C:
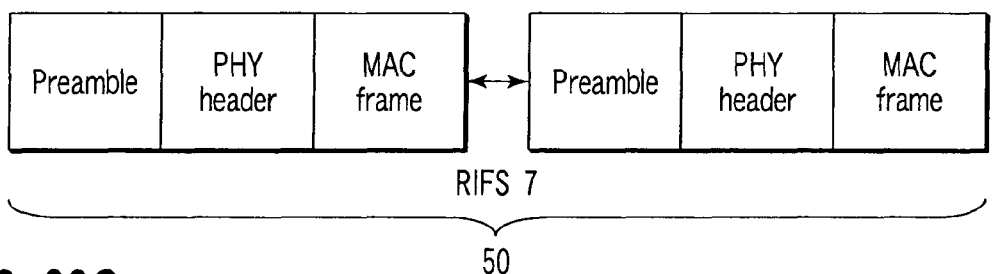
Figure 23D:
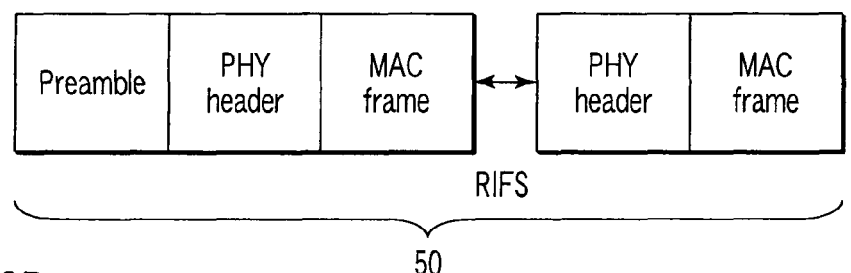

FIGS. 23A and 23B each show the arrangement of a PHY frame. FIGS. 23C and 23D each show the arrangement of an HTP burst frame.

As shown in FIG. 23A, frames are transmitted/received between the respective terminals in each embodiment of the present invention, with a frame arrangement in which a PHY header 3 in which information necessary such as a transmission rate and a transmission frame length which are necessary for the control of the PHY layer at the time of data transmission/reception is added before a MAC frame 5 such as a data frame or BlockAck frame which is transmitted from the MAC layer to the PHY layer, and a preamble 1 necessary for temporal synchronization at the time of reception at the PHY layer is attached before the PHY header 3.

In each embodiment of the present invention, a frame having the arrangement shown in FIG. 23A and a frame having the arrangement shown in FIG. 23B (aggregation frame 20) in which a plurality of PHY headers 3 and a plurality of MAC frames 5 are alternately combined behind the frame shown in FIG. 23A are referred to as PHY frames 10. When aggregation is to be performed at the MAC layer, MAC frames 5 are aggregated without any PHY header 3 to form an aggregation frame.

An HTP burst frame has a frame arrangement like that shown in FIG. 23C, and is transmitted as a burst by an HTP burst scheme as one of aggregation schemes, in which the RIFS interval is set between the PHY frames 10 described with reference to FIG. 23A or 23B, with the preambles 1 and the PHY headers 3 being attached to the PHY frames 10. This burst transmission is called an HTP burst frame in each embodiment of the present invention. Alternatively, a method of combining PHY frames with a preamble being omitted after the RIFS, as shown in FIG. 23D, may be used.

In an HTP burst frame 50, an RIFS time 7 is set between the PHY frames 10. The RIFS time 7 is an interval (2 µs) greatly shorter than the SIFS time (16 µs in IEEE 802.11a) which is the minimum time interval in the conventional IEEE 802.11 specifications. For this reason, in order to reduce reception processing at the PHY layer, it is necessary to notify, before transmission, the PHY layer whether data are transmitted at intervals of the RIFS time 7 or the SIFS time as in the prior art. If the preamble 1 is omitted as shown in FIG. 23D, in particular, when the PHY layer does not recognize that a PHY header comes after the lapse of 2 µs, no data can be received because temporal synchronization cannot be established.

According to each embodiment of the present invention, in the RD scheme, an initiator terminal and a responder terminal make an agreement, by management frame exchange such as association before bi-directional data transmission/reception in the RD scheme, that all aggregation frames after the first aggregation frame transmitted from the initiator terminal are communicated as aggregation frames based on the HTP burst scheme, each comprised of the two PHY frames 10 such that one BlockAck frame is attached to the head of each aggregation frame, and one PHY frame 10 is aggregated at an interval of the RIFS time 7. Therefore, when transmission/reception is started in the RD scheme, the MAC layer can know that it is necessary to perform reception with the RIFS time 7. This makes it possible to instruct the PHY layer whether to perform reception processing with the RIFS time 7.

According to the above agreement, it is agreed that three or more PHY frames 10 are used instead of two PHY frames 10. In addition, assume that only the maximum number of PHY frames 10 is agreed. In this case, indicating whether to perform transmission with the RIFS after the reception of the PHY frame 10 makes it possible to prepare for continuous reception processing with the RIFS time 7 without any instruction from the MAC layer.

In addition, if it is known that two PHY frames are not to be transmitted at intervals of the RIFS after the communication based on the RD scheme at the MAC layer as in the case of a BlockAck frame, Ack frame, or Cf-end frame in each embodiment of the present invention, the PHY layer is notified after the reception of the frame that there is no need to perform reception with the RIFS time 7, and the reception mode of the PHY layer can be restored to the normal state.

According to the HTP burst scheme in which burst transmission is performed at intervals of the RIFS, a special situation in which data reception is performed at intervals of RIFS and a normal reception method can be controlled from the MAC layer as needed. In addition, using a PHY header makes it possible to perform control at only the PHY layer and omit notifying operation from the MAC layer.

11th Embodiment

In the first embodiment, the initiator terminal based on the RD scheme performs bi-directional data transmission/reception processing with one responder terminal. In contrast to this, this embodiment will exemplify a method in which when a band reservation using the NAV in an RTS frame and the NAV in a CTS frame, which has been described in the first embodiment, is performed in a time corresponding to the TXOP allocation time which is the total transmission period, and transmission/reception processing based on a combination of the RD scheme and the HTP burst scheme is performed, even if there are plurality of responder terminals, transmission/reception processing based on the combination of the RD scheme and the HTP burst scheme is performed.

Since this embodiment differs from the first embodiment only in that there are a plurality of responder terminals, and data are transmitted to different destinations, only portions different from the first embodiment will be mainly described below.

FIG. 24 is a timing chart for explaining a transmission/reception method in a case wherein when transmission/reception based on the combination of the RD scheme and the HTP burst scheme is to be performed, there are a plurality of responder terminals.

In this embodiment, a terminal A 1501 as an initiator terminal based on the RD scheme transmits, to a terminal B 1502 as the first responder terminal, an RTS frame 1504 in which the TXOP time used for the RD scheme is written as the value of NAV. Upon receiving the RTS frame 1504, the terminal B 1502 writes, in a CTS frame 1505, the value obtained by subtracting the SIFS time and the time taken for the transmission of the CTS frame 1505 from the value of NAV written in the RTS frame 1504, and returns the frame to the terminal A1501. The terminal A 1501 then transmits an aggregation frame obtained by aggregating transmission data addressed to the terminal B 1502, i.e., Data 1-A, Data 2-A, Data 3-A, and Data A-4, with a QoS Cf-Poll+Data frame being attached to the head of the aggregation frame. In response to this frame, the terminal B 1502 returns an HTP burst frame 1509 having a BlockAck frame 1508 attached to its head to the terminal A 1501. Transmitting/receiving operation up to this point of time is the same as that in the first embodiment.

Upon receiving the HTP burst frame 1509, the terminal A 1501 switches to the RD scheme with a terminal C 1503 when transmitting a BlockAck frame with respect to the HTP burst frame 1509, unlike in the first embodiment. The terminal A 1501 generates a BlockAck frame 1510 as a BlockAck frame with respect to data in the HTP burst frame 1509 transmitted from the terminal B 1502 to the terminal A 1501, i.e., Data 1-B, Data 2-B, Data 3-B, and Data 4-B. An HTP burst frame 1511 is generated by aggregating transmission data from the terminal A 1501 to the terminal C 1503, i.e., Data 5-A, Data 6-A, Data 7-A, and Data 8-A, behind the RIFS of the BlockAck frame 1510, and is transmitted to the terminal B 1502 and the terminal C 1503. In this embodiment, frames addressed to two terminals, i.e., the BlockAck frame 1510 addressed to the terminal B 1502 and the transmission data addressed to the terminal C 1503, i.e., Data 5-A, Data 6-A, Data 7-A, and Data 8-A, are combined in the HTP burst frame 1511. In addition, the transmission data addressed to the terminal C 1503, i.e., Data 5-A, is a frame of a QoS Cf-Poll+Data type, and part of the TXOP time is allocated to the terminal C 1503.

Upon receiving the HTP burst frame 1511, the terminal B 1502 checks the acknowledgement status of data transmitted from the self station in accordance with the BlockAck frame 1510. Upon receiving the HTP burst frame 1511, the terminal C 1503 knows, from a QoS Cf-Poll+Data frame 1512 the RIFS time after the BlockAck frame 1510, that the TXOP time is allocated to the self station. The terminal C 1503 then generates a BlockAck frame 1513 with respect to the data in the HTP burst frame 1511, i.e., Data 5-A, Data 6-A, Data 7-A, and Data 8-A, generates an HTP burst frame 1514 by aggregating transmission data to the terminal A 1501, i.e., Data 1-C, Data 2-C, Data 3-C, and Data 4-C, after the RIFS of the BlockAck frame 1513, and returns the frame to the terminal A 1501. Upon receiving the HTP burst frame 1514, the terminal A 1501 generates a BlockAck frame 1515 with respect to the transmission data in the HTP burst frame 1514 to the terminal A 1501, i.e., Data 1-C, Data 2-C, Data 3-C, and Data 4-C, and returns the frame the SIFS time after the reception of the HTP burst frame 1514, thereby terminating the transmission/reception processing between the terminal B 1502 and the terminal C 1503 in the RD scheme.

At this point of time, an NAV setting method and a transmission rate for a BlockAck frame in an HTP burst frame used in this case are the same as those in the first embodiment.

The above method in this embodiment, i.e., the method of receiving an aggregation frame in which a QoS Cf-Poll+Data frame is aggregated, and transmitting an HTP burst frame obtained by setting the RIFS interval between a BlockAck frame after the SIFS and a frame obtained by aggregating a plurality of transmission data, is the same as that in other embodiments. Therefore, all the transmission/reception methods in other embodiments can be applied to transmission/reception processing between a plurality of terminals based on the RD scheme according to this embodiment. In addition, recovery operation can be performed in the same manner.

Bi-directional communication between a plurality of terminals based on the RD scheme can be performed by using the transmission/reception method according to this embodiment, and the transmission success probability of BlockAck frames can be made higher than that of transmission data during bi-directional communication between a plurality of terminals. In addition, transmitting a BlockAck frame through a PHY frame different from that for transmission data makes it possible to prolong a band reservation period by using the BlockAck frame. That is, this embodiment can efficiently perform bi-directional communication between a plurality of terminals while keeping the same effects as those described in other embodiments.

12th Embodiment

The 12th embodiment is the same as the 11th embodiment except that when bi-directional communication is performed with a plurality of terminals, a multi-poll frame for simultaneously allocating transmission periods to a plurality of terminals, and hence only portions different from the 11th embodiment will be described.

FIG. 25 is a timing chart for explaining a method of performing bi-directional communication of transmission data from a self station and transmission data from a plurality of terminals by allocating transmission periods to the plurality of terminals through an MMP (Multiple receiver aggregate multi-poll) frame.

A terminal A 1601 as a terminal which starts bi-directional communication with a plurality of terminals in this embodiment transmits an HTP burst frame 1606 obtained by aggregating transmission data to a terminal B 1602, i.e., Data 1-A, Data 2-A, Data 3-A, and Data 4-A, into one PHY frame, with an MMP frame 1604 attached to the head of the frame after the RIFS, and connecting transmission data addressed to a terminal C 1603, i.e., Data 5-A, Data 6-A, Data 7-A, and Data 8-A, to the PHY frame after the RIFS.

An offset period 1607 for the terminal B 1602 and a TXOP time 1608 allocated to the terminal B 1602 are written, as transmission periods allocated to the terminal B 1602, in the MMP frame 1604. An offset period 1609 for the terminal C 1603 and a TXOP time 1610 allocated to the terminal C 1603 are written, as transmission periods allocated to the terminal C 1603, in the MMP frame 1604. The value of NAV for a band reservation in a bi-directional communication period 1605 started by the MMP frame 1604 is written in the MMP frame 1604.

Upon receiving the HTP burst frame 1606 having the MMP frame 1604 combined with its head, the terminal B 1602 extracts the offset period 1607 for the terminal B 1602 which is written in the MMP frame 1604, and sets a timer for the offset period 1607 by using the transmission/reception state management unit 108 of the terminal B 1602. The terminal B 1602 then receives the transmission data in the HTP burst frame 1606 addressed to the terminal B 1602, i.e., the Data 1-A, Data 2-A, Data 3-A, and Data 4-A, and generates a BlockAck frame 1611.

When the timer for the offset period 1607 with respect to the terminal B 1602 which has been set by the transmission/reception state management unit 108 expires after the terminal B 1602 receives the HTP burst frame 1606, the TXOP time 1608 allocated to the terminal B 1602 starts. At this time, the terminal B 1602 generates the BlockAck frame 1611, and generates an HTP burst frame 1612 by aggregating transmission data to the terminal A 1601, i.e., Data 1-B, Data 2-B, Data 3-B, and Data 4-B, after the RIFS of the BlockAck frame 1611. The terminal B 1602 then transmits the HTP burst frame 1612 to the terminal A 1601. The terminal B 1602 receives a BlockAck frame 1613 from the terminal A 1601 the SIFS time after the transmission of the HTP burst frame 1612. Note, however, that the number of data to be aggregated to form the HTP burst frame 1612 is adjusted so as not to exceed the TXOP time 1608 allocated to the terminal B 1602. As shown in FIG. 25, since the HTP burst frame 1612 has the RIFS period set between the BlockAck frame 1611 and the transmission data to the terminal A 1601, i.e., the Data 1-B, Data 2-B, Data 3-B, and Data 4-B, the transmission rate can be changed and the NAV can be notified as in other embodiments.

Upon receiving the HTP burst frame 1606, the terminal C 1603 extracts the offset period 1609 for the terminal C 1603 which is written in the MMP frame 1604, and sets a timer for the offset period 1607 by using a transmission/reception state management unit 108 of the terminal C 1603 in the same manner as the terminal B 1602. The terminal C 1603 then receives the transmission data in the HTP burst frame 1606 addressed to the terminal C 1603, i.e., the Data 5-A, Data 6-A, Data 7-A, and Data 8-A, and generates a BlockAck frame. When the timer for the offset period 1609 with respect to the terminal C 1603, which has been set by the transmission/reception state management unit 108 of the terminal C 1603, expires, the TXOP time 1610 allocated to the terminal C 1603 starts, and the terminal C 1603 generates a BlockAck frame 1614. The terminal C 1603 generates an HTP burst frame 1615 by aggregating transmission data to the terminal A 1601, i.e., Data 1 C, Data 2-C, Data 3-C, and Data 4-C, the RIFS time after the BlockAck frame 1614, and transmits the HTP burst frame to the terminal A 1601. The terminal C 1603 then receives BlockAck frame 1616 from the terminal A 1601 the SIFS time after the transmission of the HTP burst frame 1615, and terminates the bi-directional communication period 1605 started by the BlockAck frame 1614.

Note, however, the TXOP time 1610 allocated to the terminal C 1603 starts after the end of the TXOP time 1608 allocated to the terminal B 1602.

Assume that if the number of data stored in the transmission queue of the terminal B 1602 was small, and the terminal B 1602 could not spend all the TXOP time 1608 allocated to the terminal B 1602, the terminal A 1601 which allocated the TXOP time received one PHY frame the RIFS time after the reception of a BlockAck frame, thereby indicating the completion of the communication in the allocated TXOP time as in other embodiments, as shown in FIG. 25. In this case, the unspent TXOP time may be used for the transmission of data addressed from the terminal A 1601 to another terminal. Note, however, that the unspent TXOP time is to be used before the start time of the TXOP time 1610 allocated to the terminal C 1603.

By using the communication method according to this embodiment, the transmission success probability of Block-Ack frames can be made higher than that of transmission data in the communication method using a multi-poll frame for allocating transmission periods to a plurality of terminals at once. In addition, transmitting a BlockAck frame through a PHY frame different from transmission data makes it possible to notify a band reservation period again by using a BlockAck frame. Furthermore, writing, in a BlockAck frame, a period which is used by a terminal to which the TXOP time has been allocated makes it possible to notify a period which is not used within the allocated TXOP time, thereby effectively using the period which is not used by the terminal to which the TXOP time is allocated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus which performs bi-directional communication with an initiator, wherein an allocation period for data transmission is allocated from the initiator, comprising:

means for generating a first physical frame including an acknowledgement frame with respect to a plurality of data frames received from the initiator, and generating a second physical frame in which a plurality of transmission data frames addressed to the initiator are aggregated; and means for transmitting the first physical frame at a first transmission rate and the second physical frame at a second transmission rate, during the allocation period.

2. The wireless communication apparatus according to claim 1, wherein the first physical frame and the second physical frame are separated by a reduced interframe space (RIFS).

3. The wireless communication apparatus according to claim 1, further comprising:

means for executing RTS-CTS frame exchange after which the bi-directional communication is initiated.

4. The wireless communication apparatus according to claim 1, wherein the first transmission rate and the second transmission rate differ in a probability of transmission error.

5. The wireless communication apparatus according to claim 4, wherein the first transmission rate is lower than the second transmission rate.

6. The wireless communication apparatus according to claim 1, wherein the first physical frame contains a value of a first band reservation period and the second transmission rate includes a transmission rate higher than the first transmission rate, so that terminals that support the first transmission rate but do not support the second transmission rate are capable of receiving the first physical frame and setting a second band reservation period by referral to the value of the first band reservation period.

7. The wireless communication apparatus according to claim 1, further comprising:

means for detecting that the bi-directional communication is initiated; and means for waiting for two physical frames with a reduced interframe space (RIFS) period set therebetween in a standby state, when the initiation of the bi-directional communication is detected.

8. The wireless communication apparatus according to claim 1, further comprising:

means for receiving an acknowledgement request frame following the data received from the initiator, wherein the acknowledgement request frame is transmitted at a lower transmission rate than that of the data.

9. The wireless communication apparatus according to claim 1, further comprising:

means for prolonging a first network allocation vector (NAV) by a second NAV during a transmission opportunity period, wherein the first physical frame contains a value of the second NAV and the second transmission rate includes a transmission rate higher than the first transmission rate, so that terminals that support the first transmission rate but do not support the second transmission rate are capable of receiving the first physical frame and setting a third NAV by referral to the value of the second NAV.

10. The wireless communication apparatus according to claim 9, wherein the value indicates a length of time necessary for transmitting the transmission data addressed to the initiator and receiving an acknowledgement frame sent from the initiator with respect to the transmission data.

11. The wireless communication apparatus according to claim 9, wherein the initiator includes:
 means for generating a third physical frame including an acknowledgement frame with respect to a plurality of data frames received from a responder, and generating a fourth physical frame in which a plurality of transmission data frames addressed to the responder are aggregated; and
 means for transmitting the third physical frame at a third transmission rate and the fourth physical frame at a fourth transmission rate; and
 means for prolonging the first NAV by a fourth NAV during a transmission opportunity period, wherein the third physical frame contains a value of the fourth NAV and the fourth transmission rate includes a transmission rate higher than the third transmission rate, so that the terminals that support the third transmission rate but do not support the fourth transmission rate are capable of receiving the third physical frame and setting the third NAV by referral to both the value of the fourth NAV and the value of the second NAV.

12. The wireless communication apparatus according to claim 1, wherein the first physical frame includes a duration field which indicates, as a value of a network allocation vector (NAV), a length of time necessary for transmitting the transmission data addressed to the initiator and receiving an acknowledgement frame sent from the initiator with respect to the transmission data, wherein the length of time is shorter than the allocated period.

13. The wireless communication apparatus according to claim 1, further comprising:
 means for transmitting, after transmitting the first physical frame, a null frame for notifying that there is no transmission data addressed to the initiator during the allocated period.

14. The wireless communication apparatus according to claim 1, wherein the first physical frame contains a value of a remaining period of the allocation period and the second transmission rate includes a transmission rate higher than the first transmission rate, so that terminals that support the first transmission rate but do not support the second transmission rate are capable of receiving the first physical frame and reconfirming a rest period of the allocation period.

15. A wireless communication method for performing bi-directional communication with an initiator, wherein an allocation period for data transmission is allocated from the initiator, comprising:
 generating a first physical frame including an acknowledgement frame with respect to a plurality of data frames received from the initiator, and generating a second physical frame in which a plurality of transmission data frames addressed to the initiator are aggregated; and
 transmitting the first physical frame at a first transmission rate and the second physical frame at a second transmission rate, during the allocation period.

16. The wireless communication method according to claim 15, wherein the first physical frame and the second physical frame are separated by a reduced interframe space (RIFS).

17. The wireless communication method according to claim 15, further comprising:
 executing RTS-CTS frame exchange after which the bi-directional communication is initiated.

18. The wireless communication method according to claim 15, wherein the first transmission rate and the second transmission rate differ in a probability of transmission error.

19. The wireless communication method according to claim 18, wherein the first transmission rate is lower than the second transmission rate.

20. The wireless communication method according to claim 15, wherein the first physical frame contains a value of a first band reservation period and the second transmission rate includes a transmission rate higher than the first transmission rate, so that terminals that support the first transmission rate but do not support the second transmission rate are capable of receiving the first physical frame and setting a second band reservation period by referral to the value of the first band reservation period.

21. The wireless communication method according to claim 15, further comprising:
 detecting that the bi-directional communication is initiated; and
 waiting for two physical frames with a reduced interframe space (RIFS) period set therebetween in a standby state, when the initiation of the bi-directional communication is detected.

22. The wireless communication method according to claim 15, further comprising:
 receiving an acknowledgement request frame following the data received from the initiator, wherein the acknowledgement request frame is transmitted at a lower transmission rate than that of the data.

23. The wireless communication method according to claim 15, further comprising:
 prolonging a first network allocation vector (NAV) by a second NAV during a transmission opportunity period, wherein
 the first physical frame contains a value of the second NAV and the second transmission rate includes a transmission rate higher than the first transmission rate, so that terminals that support the first transmission rate but do not support the second transmission rate are capable of receiving the first physical frame and setting a third NAV by referral to the value of the second NAV.

24. The wireless communication method according to claim 23, wherein the value indicates a length of time necessary for transmitting the transmission data addressed to the initiator and receiving an acknowledgement frame sent from the initiator with respect to the transmission data.

25. The wireless communication method according to claim 23, further comprising:
 generating a third physical frame including an acknowledgement frame with respect to a plurality of data frames received from a responder, and generating a fourth physical frame in which a plurality of transmission data frames addressed to the responder are aggregated; and
 transmitting the third physical frame at a third transmission rate and the fourth physical frame at a fourth transmission rate; and
 prolonging the first NAV by a fourth NAV during a transmission opportunity period, wherein
 the third physical frame contains a value of the fourth NAV and the fourth transmission rate includes a transmission rate higher than the third transmission rate, so that the terminals that support the third transmission rate but do not support the fourth transmission rate are capable of receiving the third physical frame and setting the third NAV by referral to both the value of the fourth NAV and the value of the second NAV.

26. The wireless communication method according to claim 15, wherein the first physical frame includes a duration field which indicates, as a value of a network allocation vector (NAV), a length of time necessary for transmitting the transmission data addressed to the initiator and receiving an acknowledgement frame sent from the initiator with respect to the transmission data, wherein the length of time is shorter than the allocated period.

27. The wireless communication method according to claim 15, further comprising:

transmitting, after transmitting the first physical frame, a null frame for notifying that there is no transmission data addressed to the initiator during the allocated period.

28. The wireless communication method according to claim 15, wherein the first physical frame contains a value of remaining period of the allocation period and the second transmission rate includes a transmission rate higher than the first transmission rate, so that terminals that support the first transmission rate but do not support the second transmission rate are capable of receiving the first physical frame and reconfirming a rest period of the allocation period.

* * * * *